(12) United States Patent
Kawaura et al.

(10) Patent No.: US 8,140,218 B2
(45) Date of Patent: Mar. 20, 2012

(54) DETECTION DEVICE FOR SIDE COLLISION OF VEHICLE AND PASSENGER PROTECTION SYSTEM HAVING THE SAME

(75) Inventors: Masanori Kawaura, Nukata-gun (JP); Norio Sanma, Okazaki (JP); Toshihito Nonaka, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 756 days.

(21) Appl. No.: 12/290,737

(22) Filed: Nov. 3, 2008

(65) Prior Publication Data

US 2009/0143933 A1 Jun. 4, 2009

(30) Foreign Application Priority Data

| Nov. 7, 2007 | (JP) | 2007-289204 |
| Nov. 22, 2007 | (JP) | 2007-303042 |
| Nov. 29, 2007 | (JP) | 2007-309314 |
| Feb. 14, 2008 | (JP) | 2008-033547 |
| Apr. 4, 2008 | (JP) | 2008-098519 |

(51) Int. Cl.
   *B60R 21/0136* (2006.01)
(52) U.S. Cl. ........ 701/36; 701/30.4
(58) Field of Classification Search ........ 701/29, 701/36, 45–48, 30.4; 702/182–185; 280/734–735, 280/274
See application file for complete search history.

(56) References Cited

U.S. PATENT DOCUMENTS

| 5,281,780 A | 1/1994 | Haland |
| 5,435,409 A | 7/1995 | Meyer et al. |
| 5,707,076 A | 1/1998 | Takahashi |
| 5,934,703 A * | 8/1999 | Mimura et al. ........ 280/734 |
| RE36,427 E | 12/1999 | Gioutsos |
| 6,587,048 B1 | 7/2003 | Bomya |
| 7,597,352 B2 * | 10/2009 | Ootani et al. ........ 280/735 |
| 2007/0023224 A1 | 2/2007 | Aoki et al. |
| 2007/0084128 A1 | 4/2007 | Recknagel et al. |
| 2007/0246333 A1 | 10/2007 | Kawaura et al. |
| 2008/0029329 A1 | 2/2008 | Aoki et al. |
| 2008/0030312 A1 | 2/2008 | Aoki |

FOREIGN PATENT DOCUMENTS

| DE | 43 00 653 | 7/1993 |
| DE | 101 20 457 | 10/2002 |
| GB | 2 289 448 | 11/1995 |

(Continued)

OTHER PUBLICATIONS

Office action dated Nov. 2, 2009 in corresponding Japanese Application No. 2008-033547.

(Continued)

*Primary Examiner* — Yonel Beaulieu
(74) *Attorney, Agent, or Firm* — Harness, Dickey & Pierce, PLC

(57) ABSTRACT

A detection device for side collision of a vehicle includes: an outer plate of a vehicle side door; an inner plate of the side door arranged separately from the outer plate; a reinforcing member arranged between the outer plate and the inner plate and having a bending rigidity higher than a bending rigidity of the outer plate; a detection subject member provided by at least one of the inner plate and a member fixed to the inner plate; a sensor detecting a separate distance between the detection subject member and the reinforcing member; and a determination element determining that the vehicle collides with an object based on an output value of the sensor.

70 Claims, 23 Drawing Sheets

FOREIGN PATENT DOCUMENTS

| | | |
|---|---|---|
| JP | 05-139244 | 6/1993 |
| JP | 05-093735 | 7/1993 |
| JP | 5-246301 | 9/1993 |
| JP | 7-181198 | 7/1995 |
| JP | 07-186878 | 7/1995 |
| JP | 08-113108 | 5/1996 |
| JP | 09-058400 | 3/1997 |
| JP | 2007-033271 | 2/2007 |
| JP | 2007/55319 | 3/2007 |
| JP | 2007-112213 | 5/2007 |
| JP | 2007-292593 | 11/2007 |
| JP | 2008-037180 | 2/2008 |
| JP | 2008-037181 | 2/2008 |
| WO | WO 2007/114870 | 10/2007 |

OTHER PUBLICATIONS

Office action dated Mar. 23, 2009 in German Application No. 10 2008 054319.5.

Office action dated Sep. 10, 2009 in corresponding Japanese Application No. 2007-289204.

Office action dated Oct. 15, 2009 in corresponding Japanese Application No. 2007-309314.

Office Action dated Oct. 10, 2011 in corresponding German Application No. 10 2008 054 319.5.

* cited by examiner

DETECTION DEVICE FOR SIDE COLLISION OF VEHICLE AND PASSENGER PROTECTION SYSTEM HAVING THE SAME

CROSS REFERENCE TO RELATED APPLICATIONS

This application is based on Japanese Patent Applications No. 2007-289204 filed on Nov. 7, 2007, No. 2007-303042 filed on Nov. 22, 2007, No. 2007-309314 filed on Nov. 29, 2007, No. 2008-33547 filed on Feb. 14, 2008, and No. 2008-98519 filed on Apr. 4, 2008, the disclosures of which are incorporated herein by reference.

FIELD OF THE INVENTION

The present invention relates to a detection device for side collision of a vehicle that detects that an object has collided with a side door and a passenger protection system using the same.

BACKGROUND OF THE INVENTION

As a conventional detection device for side collision of a vehicle is proposed a detection device disclosed in, for example, JP-A-H05-93735 (patent document 1, which corresponds to U.S. Pat. No. 5,281,820). When the detection device for side collision of a vehicle, which is disclosed in the patent document 1, detects the deformation of a reinforcing member arranged in the interior of a side door, the detection device determines that collision requiring the protection of a passenger occurs. Here, an outer plate is very low in bending rigidity, so that the outer plate is easily deformed by a small impact. For this reason, for example, in a case where when a side door is opened, the side door is bumped against an electric pole or the like to deform an outer plate or in a case where an outer plate is deformed by a small impact while a vehicle is running, an air bag or the like does not need to be developed. In other words, when the air bag or the like is developed by detecting the deformation of the outer plate, the air bag is developed also in the above-mentioned cases. Thus, according to the construction of the patent document 1, even when an outer plate is deformed, if an impact is such a small level of impact that does not deform an reinforcing member, it is determined that a vehicle does not collide with an object. Thus, it is possible to detect only collision requiring the protection of a passenger and to develop an air bag or the like only in the case of the collision.

To know the extent to which the above-mentioned reinforcing member is brought close to the interior of a vehicle compartment (that is, to a passenger side) when the vehicle undergoes collision such as side collision becomes a guideline at the time of determining the degree of seriousness of the collision. However, although the detection device for side collision of a vehicle described in the patent document 1 can detect whether or not the reinforcing member is deformed, the detection device cannot clearly find the extent to which the reinforcing member is actually brought close to the interior of the vehicle compartment by the deformation of the reinforcing member. For example, even when the reinforcing member is deformed, the direction in which the reinforcing member is deformed is not always pointed inside the vehicle compartment. Moreover, for example, even when the reinforcing member is deformed inward of the vehicle compartment, if the vehicle compartment is moved in a direction in which the reinforcing member is deformed to an extent equal to or more than the deformation of the reinforcing member, the reinforcing member is not brought closer to the vehicle compartment.

Further, the detection device for side collision of a vehicle described in the patent document 1 detects collision only when a portion, which has a sensor arranged thereon, of the reinforcing member or a portion, which is closest to the sensor, of the reinforcing member is deformed, so that the detection range of the sensor becomes very narrow or a pinpoint of detection. Thus, the detection device has the problem of detecting only collision at a specified position. If it is intended to make a detection device detect collision in a wide range, a very large number of sensors need to be fixed to the reinforcing member, which causes the problem of increasing a space for arranging the sensors and the problem of complicating the arrangement of the sensors.

Still further, in the detection device for side collision of a vehicle, described in the patent document 1, as for the structure of fixing a detection sensor to a side door, the detection sensor is fixed to an inner plate side via a support member fixed to the inner plate in such a way as to be close to the reinforcing member. The detection sensor is arranged on the inner plate side with respect to the reinforcing member, and when an object collides with the side door, the reinforcing member is deformed to the inner plate side, so that the detection sensor receives an impact caused by the deformation of the reinforcing member, thereby being operated. With this, the detection device for side collision of a vehicle can detect that an object collides with the vehicle on the basis of a detection signal sent by the detection sensor. Here, an impact sensor or an electric coil is used as the detection sensor.

However, a space for opening or closing the door glass of the side door in the up and down direction is interposed between the reinforcing member and the inner plate. A stay for fixing and driving up and down the door glass is disposed on the lower side of the door glass, and when the door glass is opened or closed, the stay is moved up and down. Thus, it is difficult to arrange the detection sensor in a range in which the door glass and the stay are moved up and down according to the method described in the patent document 1. When the detection sensor is arranged at a position in which the detection sensor does not interfere in terms of space with the stay, a position in which the detection sensor is arranged is limited to positions in the front direction and in the rear direction of the vehicle of the side door, which presents the problem of making it difficult to detect collision in a wide range in the front and rear direction of the vehicle of the side door.

Further, the above-mentioned detection device for side collision of a vehicle detects collision only when the position of the reinforcing member having the sensor arranged thereon is displaced, so that the range of detection of the collision becomes very narrow. Thus, there is presented a problem that the detection device can detect only collision at a specified position.

Still further, as another conventional detection device for side collision of a vehicle is proposed a detection device disclosed in, for example, JP-A-H07-186878 (patent document 2). The detection device for side collision of a vehicle disclosed in the patent document 2 is constructed of: two cantilever beams; and plural sensors for detecting side collision. The two cantilever beams are arranged between the outer plate and the inner plate of the side door in parallel in the front and rear direction of the vehicle in a state where their fixing end portions are fixed to the inner plate. The sensors for detecting side collision are sensors turned on when they are pressed, and the sensors are arranged at specified intervals on the outer plate of the side door of the cantilever beams. When an object collides with the side door, the outer plate is depressed to the inner plate side to press the sensors for detecting side collision, which are arranged on the cantilever beams, whereby the sensors for detecting side collision are turned on. In this manner, it is possible to detect that the object collides with the vehicle.

However, the conventional detection device for side collision of a vehicle employs a complex mechanical construction having two cantilever beams, so that the conventional detection device becomes very large in size, which presents a problem in the space for arranging the detection device. In particular, a recent vehicle has other equipment such as a speaker and a power window mechanism arranged in the interior of the side door thereof, so that it is very important to ensure a space in the interior of the side door.

SUMMARY OF THE INVENTION

The present invention has been made in view of these circumstances. One object of the present invention is to provide such a detection device for side collision of a vehicle that can detect the degree of seriousness of collision. Alternatively, another object of the present invention is to provide such a detection device for side collision of a vehicle that can detect collision in a wide range and reduce a space for arranging the device and facilitate the arrangement of the device. Further, still another object of the present invention is to provide such a passenger protection system for a vehicle that uses the detection device for side collision of a vehicle. Still further, still another object of the present invention is to provide such a detection device for side collision of a vehicle that can detect collision in a wide range with high accuracy. Still further, still another object of the present invention is to provide such a detection device for side collision of a vehicle that can detect side collision without arranging a sensor in the interior of a side door.

According to a first aspect of the present disclosure, a detection device for side collision of a vehicle includes: an outer plate of a side door mounted in the vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the inner plate and a member fixed to the inner plate; a sensor detecting a separate distance between the detection subject member and the reinforcing member; and a determination element determining that the vehicle collides with an object based on an output value of the sensor.

In this manner, it is determined on the basis of the separate distance between the inner plate and the reinforcing member or the separate distance between the member fixed to the inner plate and the reinforcing member that the vehicle collides with the other object. Thus, it is possible to make a correct collision determination corresponding to the degree of seriousness of the collision.

According to a second aspect of the present disclosure, a detection device for side collision of a vehicle includes: an outer plate of a side door mounted in the vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the inner plate and an inner plate-shaped member fixed to the inner plate, and having a portion made of metal or ferromagnetic material; a coil fixed to the reinforcing member, spaced apart from the detection subject member, producing a magnetic field, and having an inductance variable in accordance with a separate distance between the coil and the detection subject member; and a determination element determining that the vehicle collides with an object based on the inductance of the coil.

A range in which side collision can be detected by the above-mentioned device can be made wider as compared with a range in which side collision can be detected by a conventional device. A space for arranging the detection device can be reduced and the arrangement of the detection device can be facilitated. Further, even when the outer plate is deformed, if an impact is such a small level of impact that does not deform the reinforcing member, the separate distance between the coil and the member to be detected is not varied by the impact. Thus, it is possible to determine that the vehicle does not collide with any object and hence to prevent a passenger protection device from being activated. On the other hand, when such a large level of impact that deforms the reinforcing member to vary the separate distance between the coil and the member to be detected is applied to the vehicle, it can be thought that there is brought about a state where a passenger needs to be protected. In this case, the inductance of the coil is surely varied and hence collision can be detected.

According to a third aspect of the present disclosure, a detection device for side collision of a vehicle includes: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the reinforcing member and a reinforcing-member-side plate-shaped member fixed to the reinforcing member, and having a portion made of metal or ferromagnetic material; a coil fixed to the inner plate, spaced apart from the detection subject member, producing a magnetic field, and having an inductance variable in accordance with a distance between the coil and the detection subject member; and a determination element determining that the vehicle collides with an object based on the inductance of the coil.

A range in which side collision can be detected by the above-mentioned device can be made wider as compared with a range in which side collision can be detected by a conventional device. A space for arranging the detection device can be reduced and the arrangement of the detection device can be facilitated. Further, even when the outer plate is deformed, if an impact is such a small level of impact that does not deform the reinforcing member, the separate distance between the coil and the member to be detected is not varied by the impact. Thus, it is possible to determine that the vehicle does not collide with any object and hence to prevent a passenger protection device from being activated. On the other hand, when such a large level of impact that deforms the reinforcing member to vary the separate distance between the coil and the member to be detected is applied to the vehicle, it can be thought that there is brought about a state where a passenger needs to be protected. In this case, the inductance of the coil is surely varied and hence collision can be detected.

According to a fourth aspect of the present disclosure, a passenger protection system for a vehicle includes: the above-mentioned detection device for side collision of a vehicle; and a passenger protection device functioning when collision occurs, and protecting a passenger of the vehicle from an impact caused by the collision. The passenger protection device functions based on a determination of the detection device for side collision of a vehicle.

The above-mentioned system determines that the vehicle collides with other object on the basis of the separate distance between the inner plate and the reinforcing member or the separate distance between the member fixed to the inner plate and the reinforcing member, so that the system can make a correct side collision determination according to the degree of seriousness of the collision. Further, the result of the collision determination can be used as a trigger when the passenger protection device is activated.

According to a fifth aspect of the present disclosure, a detection device for side collision of a vehicle includes: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a distance sensor detecting a separate distance between a detection subject member and the reinforcing member, wherein the detection subject member is provided by one of the inner plate and an inner member fixed to the inner plate; a position sensor detecting a position of a door glass of the side door or a position of a stay for moving up and down the door glass, wherein the door glass is inserted between the reinforcing member and the detection subject member; and a determination element determining that the vehicle collides with an object based on an output value of the distance sensor and an output value of the position sensor.

This detection device for side collision of a vehicle makes the collision determination in consideration of the position of the door glass or the stay that is detected by the position sensor, so that the detection device can prevent an error from being caused by the collision determination. Here, by switching the determination method according to the position of the door glass or the stay, the effect of the stay can be reliably eliminated when the collision determination is made. In particular, the collision determination can be made at a high speed. Further, the position of the stay is detected by the position sensor and the determination method of collision is switched on the basis of the detected position of the stay. Thus, even when the distance sensor is arranged at a position in which the stay can be positioned between the reinforcing member and the inner plate side member depending on a state where the door glass is opened or closed, the collision determination can be correctly made. Thus, the distance sensor can be arranged in a wide range without being limited by the position of the stay.

According to a sixth aspect of the present disclosure, a detection device for side collision of a vehicle includes: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a distance sensor detecting a separate distance between a detection subject member and the reinforcing member, wherein the detection subject member is provided by one of the inner plate and an inner member fixed to the inner plate; a determination element determining that the vehicle collides with an object based on an output value of the distance sensor; and a stay for moving up and down a door glass of the side door. At least one of the reinforcing member and the detection subject member has a metal body or a magnetic body. The distance sensor is a coil, which is fixed to one of the reinforcing member and the detection subject member, generates a magnetic field, and detects a magnetic flux variable with the separate distance between the detection subject member and the reinforcing member. A width of the coil in an up-down direction of the vehicle is larger than a width of the stay in the up-down direction of the vehicle. The determination element determines that the vehicle collides with an object based on the magnetic flux detected by the coil.

According to the above-mentioned aspect, by setting the width in the up and down direction of the vehicle of the coil larger than the width in the up and down direction of the vehicle of the stay, even when the stay is positioned between the coil and the inner plate side member depending on the state where the door glass is opened or closed, the effect that the stay has on the magnetic flux can be reduced. With this, even when the stay is positioned between the coil and the inner plate side member, it is also possible to use a determination method for detecting the separate distance between the coil and the inner plate side member on the basis of the magnetic flux.

According to a seventh aspect of the present disclosure, a detection device for side collision of a vehicle includes: an outer plate of a side door; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate, wherein a first detection subject member is provided by one of the inner plate and the reinforcing member and is made of a ferromagnetic material; a first coil positioned between the inner plate and the reinforcing member, fixed to the other of the inner plate and the reinforcing member, spaced apart from the first detection subject member, generating a magnetic field in a direction in which the inner plate and the reinforcing member are opposite to each other, and having an inductance variable with a separate distance between the first coil and the first detection subject member, wherein a second detection subject member is provided by one of the outer plate and the inner plate and is made of a ferromagnetic material; a second coil positioned between the outer plate and the inner plate, fixed to the other of the outer plate and the inner plate, spaced apart from the second detection subject member, generating a magnetic field in a direction in which the outer plate and the inner plate are opposite to each other, and having an inductance variable with a separate distance between the second coil and the second detection subject member; and a determination element determining that the vehicle collides with an object based on a variation of the inductance of the first coil and a variation of the inductance of the second coil.

When the separate distance between the first member to be detected and the first coil and the separate distance between the second member to be detected and the second coil become short in the above-mentioned detection device for side collision of a vehicle, the inductance of the first coil and the inductance of the second coil are varied according to the respective separate distances. Thus, the range in which the side collision can be detected becomes a range corresponding to the size of the first coil or the size of the second coil. However, as the size of the coil becomes larger, the sensitivity of detection of the collision by the coil becomes lower. Thus, the detection device needs to be able to detect the side collision in a wide range without lowering the sensitivity of detection by the coil. Hence, the detection device includes plural coils. With this, the detection device can detect the side collision in a wide range and with high accuracy.

According to an eighth aspect of the present disclosure, a detection device for side collision of a vehicle includes: an outer plate of a side door; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate, wherein a first detection subject member is provided by one of the inner plate and the reinforcing member and is made of a ferromagnetic material; a plurality of first coils positioned between the inner plate and the reinforcing member, fixed to the other of the inner plate and the reinforcing member, spaced apart from the first detection subject member, and generating a magnetic field in a direction in which the inner plate and the reinforcing member are opposite to each other, wherein each of the plurality of first coils has an inductance variable with a separate distance between a respective first coil and the first detection subject member; and a determination element determining that the vehicle collides with an object based on a variation of the inductance of each of the plurality of first coils.

The above-mentioned detection device for side collision of a vehicle includes the plurality of first coils. With this, the detection device can detect the side collision in a wide range and with high accuracy.

According to a ninth aspect of the present disclosure, a detection device for side collision of a vehicle includes: an outer plate of a side door; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate, wherein a second detection subject member is provided by one of the outer plate and the inner plate and is made of a ferromagnetic material; a plurality of second coils positioned between the outer plate and the inner plate, fixed to the other of the outer plate and the inner plate, spaced apart from the second detection subject member, and generating a magnetic field in a direction in which the outer plate and the inner plate are opposite to each other, wherein each of the plurality of second coils has an inductance variable with a separate distance between a respective second coil and the second detection subject member; and a determination element determining that the vehicle collides with an object based on a variation of the inductance of each of the plurality of second coils.

The above-mentioned detection device for side collision of a vehicle includes the plurality of second coils. With this, the detection device can detect the side collision in a wide range and with high accuracy.

According to a tenth aspect of the present disclosure, a detection device for side collision of a vehicle includes: a side door arranged on a side of the vehicle; a vehicle body member arranged on the side door in a front direction of the vehicle or in a rear direction of the vehicle; a gap detection sensor arranged on the side door or on the vehicle body member, and detecting a gap between an end face of the side door and the vehicle body member, wherein the end face is arranged on the side door in the front direction or in the rear direction of the vehicle; and a determination element-determining that an object collides with the side of the vehicle based on the gap detected by the gap detection sensor.

According to the above-mentioned detection device, the gap detection sensor detects the gap in the front direction or in the rear direction of the vehicle, and the determination element determines that the object collides with the side of the vehicle on the basis of the gap. In short, the detection device can surely detect that the object collides with the side of the vehicle. Here, the gap detection sensor is arranged on the outside face of the side door or on the vehicle body. In other words, unlike the detection device in the related art, the gap detection sensor of the present invention is not arranged in the interior of the side door (space between the outer plate and the inner plate). In this manner, the detection device of the present invention does not have the sensor arranged in the interior of the side door in which a space needs to be ensured, but the detection device can reliably detect that the object collides with the side door.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Hereinafter, various embodiments of a detection device for side collision of a vehicle will be described, and then a passenger protection system for a vehicle using the same will be described.

First Embodiment

A detection device for side collision of a vehicle of a first embodiment will be described with reference to FIG. 1 to FIG. 7. The first embodiment is a mode in which a planar coil 21 is fixed directly to a reinforcing member 13 (which is also called a door beam in some case) and a mode in which a change in a separate distance between the planar coil 21 and an inner plate 12 is detected.

Figure 1:
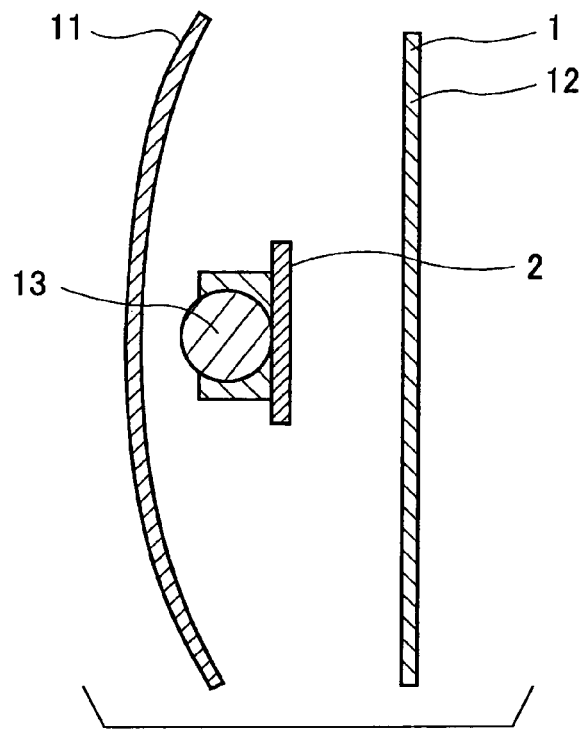
FIG. 1 is a sectional view when a side door in a first embodiment is cut vertically to the left and right direction of the vehicle.
Figure 2:
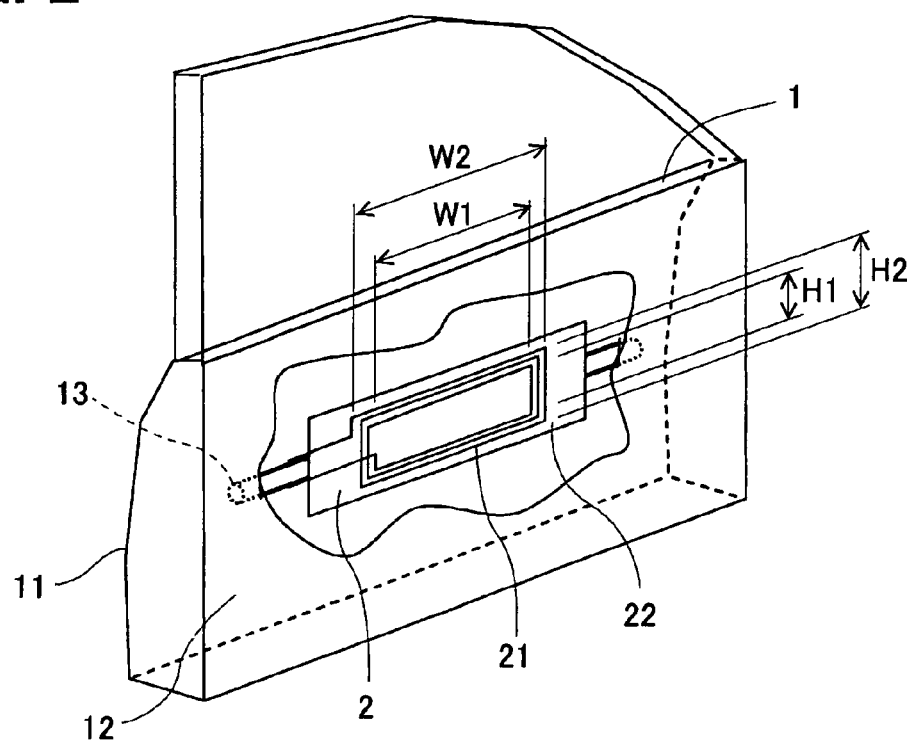
FIG. 2 is a perspective view when the side door is viewed from inside a vehicle compartment and a view to show the side door in a state in which a portion of an inner plate is removed.
Figure 3:
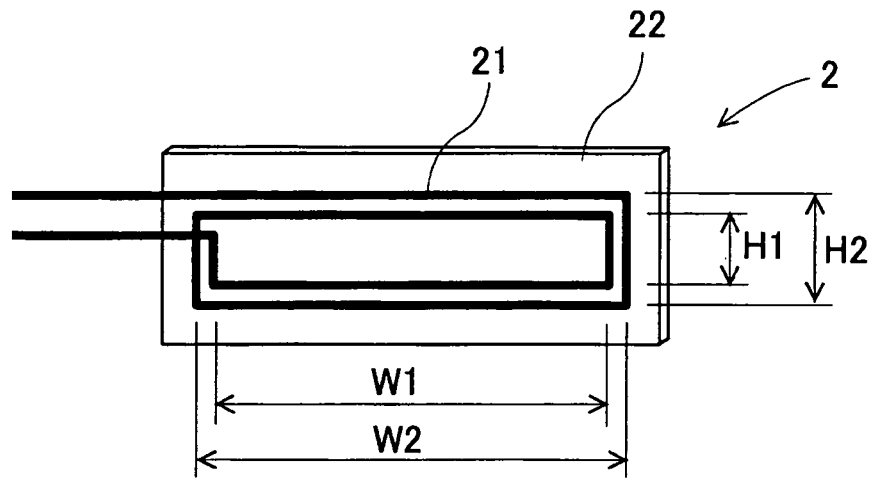
FIG. 3 is a side view to show a coil member.
Figure 4:
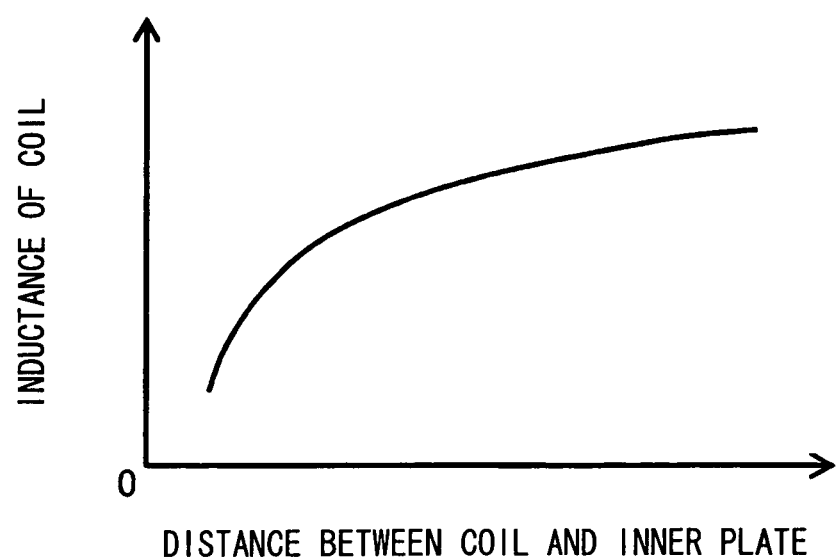
FIG. 4 is a graph to show the relationship of the inductance of a planar coil to a separate distance between an inner plate (inside plate-shaped member) and a reinforcing member.
Figure 5:
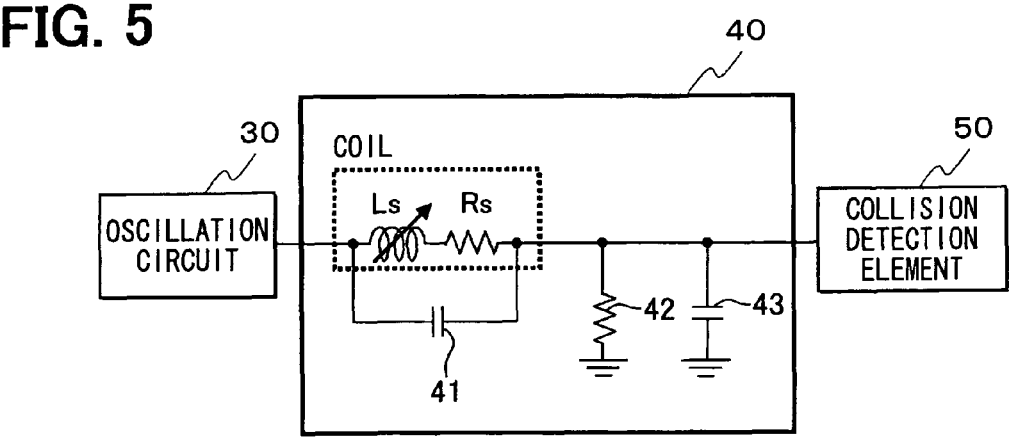
FIG. 5 is a circuit construction diagram to show a detection device for side collision of a vehicle.
Figure 6:
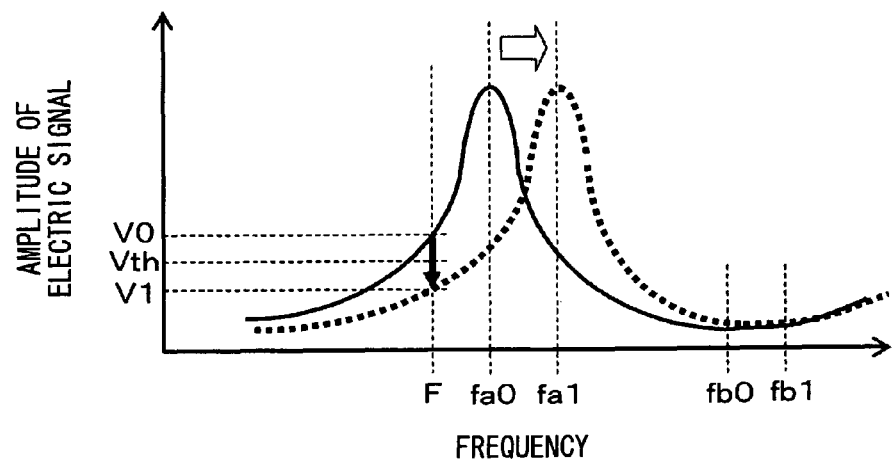
FIG. 6 is a graph to show the frequency characteristics of an LC resonance circuit.
Figure 7:
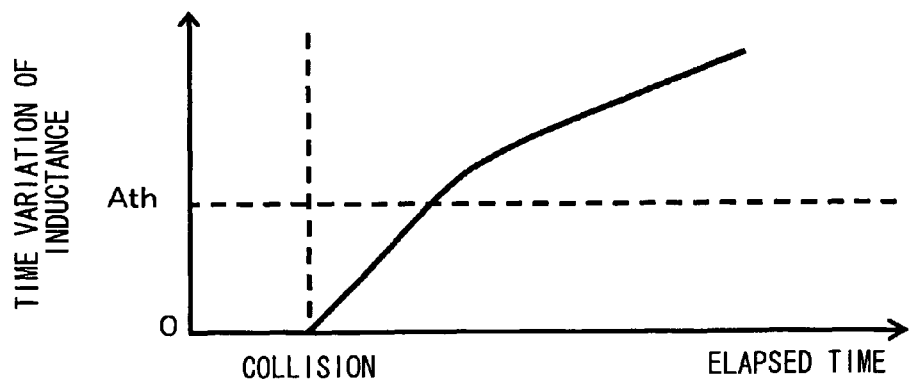
FIG. 7 is a graph to show the absolute value of the quantity of a variation per unit time (time differential value) in amplitude outputted from the LC resonance circuit with respect to the time that elapses after collision occurs.

FIG. 1 is a section view when a side door 1 is cut vertically to the left and right direction of a vehicle. Here, for the sake of convenience, the upper and lower portions of the side door 21 are omitted in FIG. 1. FIG. 2 is a perspective view when the side door 1 is viewed from inside a vehicle compartment and is a diagram to show the side door 1 in a state where a portion of the inner plate 12 is removed for the sake of description. FIG. 3 is a side view to show a coil member 2. FIG. 4 is a graph to show the relationship of the inductance Ls of the planar coil 21 to the separate distance between the inner plate 12 and the planar coil 21. FIG. 5 is a circuit construction diagram to show a detection device for side collision of a vehicle. FIG. 6 is a graph to show the frequency characteristics of an LC resonance circuit 40. FIG. 7 is a graph to show the absolute value of a variation per unit time (time differential value) of amplitude V1 outputted from the LC resonance circuit 40 with respect to the time that lapses after collision occurs.

As shown in FIG. 1 and FIG. 2, the side door 1 has: an outer plate 11 positioned outside the vehicle; and the inner plate 12 that is arranged inside the vehicle compartment so as to be separate from and opposite to the outer plate 11 and which is made of a ferromagnetic material or metal. Moreover, the side door 1 has the reinforcing member 13 that is formed in the shape of a circular cylinder and which is arranged nearly in the center in the left and right direction of the vehicle between the outer plate 11 and the inner plate 12 and nearly in the center in the up and down direction of the vehicle so as to extend in the front and rear direction of the vehicle. In other words, the reinforcing member 13 is arranged separately from and opposite to the inner plate 12. This reinforcing member 13 has higher bending rigidity than at least the bending rigidity of the outer plate 11. In short, when an object collides with the outer plate 11, even if the outer plate 11 having lower bending rigidity is deformed, the reinforcing member 13 can prevent the whole of the side door 1 from being deformed. Here, in the first embodiment, the inner plate 12 becomes a member to be detected.

The coil member 2, as shown in FIG. 3, is formed in the shape of a plane as a whole. This coil member 2 is constructed of a planar coil 21 and a pair of films 22. The planar coil 21 is formed by pattern printing a conductive material such as copper on the same planar shape so as to wind a plurality of turns. The wound pattern shape of the planar coil 21 is nearly shaped like a rectangle. In particular, it is assumed that a width in a longitudinal direction and a width in a lateral direction at the innermost periphery of the planar coil 21 are W1 and H1, respectively. Moreover, it is assumed that a width in the longitudinal direction and a width in the lateral direction at the outermost periphery of the planar coil 21 are W2 and H2, respectively.

The pair of films 22 sandwich the planar coil 21 from both sides to cover the planar coil 21, thereby preventing the planar coil 21 from being exposed outside. This film 22 is formed of a flexible material such as PET (polyethylene terephthalate) or PEN (polyethylene naphthalate) in the shape of a thin film. In short, the film 22 is freely bent. Moreover, the planar coil 21 itself is also freely bent and deformed. Thus, the entire coil member 2 can be bent and deformed and has very high flexibility. In short, at least the coil member 2 is higher in flexibility than the reinforcing member 13 (usually constructed of iron), so that even if the reinforcing member 13 is bent, the coil member 2 can be bent without being broken.

This coil member 2, as shown in FIG. 1 and FIG. 2, is fixed to the reinforcing member 13 so as to be opposite to the inner plate 12 on the inner plate 12 side of the reinforcing member 13. In other words, the coil member 2 is interposed between the inner plate 12 and the reinforcing member 13. The coil member 2 is arranged in such a way that the normal direction of the coil member 2, that is, the coil axial direction of the planar coil 21 coincides with a direction in which the inner plate 12 and the reinforcing member 13 are opposite to each other. Thus, when the planar coil 21 is supplied with current, a magnetic field is produced in the direction in which the inner plate 12 and the reinforcing member 13 are opposite to each other.

Describing in more detail, the coil member 2 is arranged in such a way that the longitudinal direction of the planar coil 21 coincides with a horizontal direction. Moreover, the reinforcing member 13 is also arranged in such a way that its longitudinal direction coincides with the horizontal direction. Thus, the longitudinal direction of the planar coil 21 nearly coincides with the longitudinal direction of the reinforcing member 13, and the planar coil 21 is formed in the shape along the shape of the reinforcing member 13. Here, the width W1 in the horizontal direction at the innermost periphery of the planar coil 21 is set larger than the width H1 in the vertical direction at the innermost periphery of the planar coil 21. Further, the width W2 in the horizontal direction at the outermost periphery of the planar coil 21 is set larger than the width H2 in the vertical direction at the outermost periphery of the planar coil 21. Thus, naturally, a middle value "(W1+ W2)/2" of the width W2 in the horizontal direction at the outermost periphery of the planar coil 21 and the width W1 in the horizontal direction at the innermost periphery of the planar coil 21 is set larger than a middle value "(H1+H2)/2" of the width H2 in the vertical direction at the outermost periphery of the planar coil 21 and the width H1 in the vertical direction at the innermost periphery of the planar coil 21.

Here, when an object collides with the outer plate 11 of the side door 1, the outer plate 11 is deformed inside the vehicle compartment. When the collision is large, the object deforms the reinforcing member 13 inside the vehicle compartment. In other words, the separate distance between the inner plate 12 and the reinforcing member 13 is made shorter. Then, an eddy current is made to flow through the inner plate 12 by the magnetic field produced by the planar coil 21 to produce a magnetic field in the inner plate 12 (when an eddy current is produced in the inner plate 12 before the collision occurs, the eddy current flowing through the inner plate 12 is increased by the separate distance between the inner plate 12 and the reinforcing member 13 being made shorter, whereby the magnetic field produced in the inner plate 12 is increased). In short, as the separate distance between the inner plate 12 and the reinforcing member 13 is made shorter, the magnetic field produced by the eddy current to interlink the planar coil 21 is increased. Then, as shown in FIG. 4, as the separate distance between the inner plate 12 and the planar coil 21 is decreased, the inductance Ls of the planar coil 21 is decreased. This is because the effect that "the magnetic field produced by the planar coil 21 is partially canceled by the magnetic field produced by the inner plate 12" is made stronger as the distance is decreased. In this manner, the inductance of the planar coil 21 is varied in response to the separate distance between the inner plate 12 and the planar coil 21. Here, even when the object collides with the outer plate 11 of the side door 1, if the reinforcing member 13 is not deformed, the inductance Ls of the planar coil 21 is not varied.

Moreover, the detection device for side collision of a vehicle, as shown in FIG. 5, includes an oscillation circuit 30, the LC resonance circuit 40 having the planar coil 21 as a portion thereof, and a collision determination circuit 50.

The oscillation circuit 30 is a circuit for outputting an AC voltage. The oscillation frequency of this AC voltage is assumed to be F. This oscillation frequency F is made a frequency lower than a series resonance frequency fa0 in the LC resonance circuit 40 in a state where the separate distance between the inner plate 12 and the planar coil 21 is maximum (a state where an object does not collide with the outer plate 11).

The LC resonance circuit 40 constructs a so-called series parallel LC resonance circuit 40. Specifically, the LC resonance circuit 40 is constructed of: a planar coil 21 having one end connected to the oscillation circuit 30 and having the other end connected to the collision determination circuit 50 to be described later; a first capacitor 41 connected parallel to the planar coil 21; a second resistance 42 having one end connected to the other end of the planar coil 21 and having the other end connected to the ground; and a second capacitor 43 having one end connected to the other end of the planar coil 21 and having the other end connected to the ground.

The planar coil 21 corresponds to a series circuit of the inductance Ls and a resistance value Rs. This inductance Ls, as described above, is varied along with the separate distance between the inner plate 12 and the planar coil 21. Moreover, it is assumed that: the capacitance of the first capacitor 41 is Cs; the resistance value of the second resistance 42 is Ro; and the capacitance of the second capacitor 43 is Co.

Here, the frequency characteristics of the LC resonance circuit 40 will be described with reference to FIG. 6. Here, in FIG. 6, a solid line shows the frequency characteristics of the LC resonance circuit 40 in a state where the reinforcing member 13 is not deformed, that is, in a state where the separate distance between the inner plate 12 and the planar coil 21 is not varied, whereas a broken line shows the frequency characteristics of the LC resonance circuit 40 in a state where the reinforcing member 13 is deformed by collision to decrease the separate distance between the inner plate 12 and the planar coil 21.

As shown in FIG. 6, in the frequency characteristics of the LC resonance circuit 40, amplitude becomes maximum at series resonance frequencies fa0, fa1 and becomes minimum at parallel resonance frequencies fb0, fb1. The series resonance frequencies fa0, fa1 and the parallel resonance frequencies fb0, fb1 are determined by the inductance Ls of the planar coil 21 and the capacitances Cs, Co of the capacitor and are expressed by the following equations (1), (2).

$$fa = \frac{1}{2\pi\sqrt{Ls \times (Cs + Co)}}$$ (mathematical equation 1)

$$fb = \frac{1}{2\pi\sqrt{Ls \times Cs}}$$ (mathematical equation 2)

As described above, when the reinforcing member 13 is deformed by the collision and the separate distance between the inner plate 12 and the planar coil 21 is made shorter, the inductance Ls is made smaller. Then, the series resonance frequencies fa1 when the reinforcing member 13 is deformed by the collision is made higher than the series resonance frequencies fa0 when the reinforcing member 13 is not deformed. Moreover, the parallel resonance frequencies fb1 when the reinforcing member 13 is deformed by the collision is also made higher than the parallel resonance frequencies fb0 when the reinforcing member 13 is not deformed. In other words, as shown in FIG. 6, the frequency characteristics, shown by a broken line, when the reinforcing member 13 is deformed by the collision is shifted to the right in FIG. 6 as a whole with respect to the frequency characteristics, shown by a solid line, when the reinforcing member 13 is not deformed.

Then, this LC resonance circuit 40 outputs a periodic electric signal such that the AC voltage applied by the oscillation circuit 30 has amplitude converted according to the frequency characteristics of the LC resonance circuit 40. Specifically, the periodic electric signal outputted by the LC resonance circuit 40 is produced by converting the AC voltage applied by the oscillation circuit 30 to the amplitude of the frequency characteristics of the LC resonance circuit 40 at an oscillation frequency F oscillated by the oscillation circuit 30.

Here, the oscillation frequency F of the AC voltage oscillated by the oscillation circuit 30, as described above, is set lower than the series resonance frequency fa0 of the LC resonance circuit 40 when the reinforcing member 13 is not deformed. Moreover, the resonance frequencies fa, fb are varied so as to become higher as the reinforcing member 13 is more deformed to make the separate distance between the inner plate 12 and the planar coil 21 shorter. In other words, the oscillation frequency F is set in the following manner: that is, when the separate distance between the inner plate 12 and the planar coil 21 is made shorter by the deformation of the reinforcing member 13, which is caused by the collision of the collision object, the oscillation frequency F is shifted from a frequency band in which the resonance frequencies fa, fb of the LC resonance circuit 40 is varied.

In short, the amplitude of the frequency characteristics of the LC resonance circuit 40 at the oscillation frequency F is made largest when the reinforcing member 13 is not deformed. Then, as the reinforcing member 13 is more deformed to make the separate distance between the inner plate 12 and the reinforcing member 13 shorter, the amplitude is made smaller. In this manner, the amplitude of the periodic electric signal outputted by the LC resonance circuit 40 is varied according to the separate distance between the inner plate 12 and the planar coil 21. That is, the amplitude of the periodic electric signal outputted by the LC resonance circuit 40 is varied so as to become smaller as the separate distance between the inner plate 12 and the planar coil 21 is made shorter. In short, the LC resonance circuit 40 produces and outputs the periodic electric signal according to the inductance Ls of the planar coil 21.

The collision determination section 50 firstly stores an amplitude threshold value Vth (corresponding to a third threshold value) for determining whether or not an object collides with the outer plate 11 to bring the reinforcing member 13 into a deformed state and an amplitude time variation threshold value Ath (corresponding to a fourth threshold value).

This amplitude threshold value Vth is set smaller than a reference amplitude V0 of the periodic electric signal outputted from the LC resonance circuit 40 in a state where the reinforcing member 13 is not deformed. The collision determination section 50 determines whether or not an object collides with the outer plate 11 to deform the reinforcing member 13 on the basis of the amplitude V1 of the periodic electric signal outputted from the LC resonance circuit 40. Specifically, the collision determination section 50 determines whether or not the amplitude V1 of the periodic electric signal outputted from the LC resonance circuit 40 exceeds the amplitude threshold value Vth, specifically, whether or not the amplitude V1 is smaller than the amplitude threshold value Vth. When the amplitude V1 is smaller than the amplitude threshold value Vth, the collision determination section 50 determines that an object collides with the outer plate 11 to deform the reinforcing member 13.

On the other hand, even if the outer plate 11 is deformed, when where the reinforcing member 13 is not deformed, the amplitude V1 is not made smaller than the amplitude threshold value Vth. Here, the state where the reinforcing member 13 is deformed means a state where a passenger protection device needs to be activated to protect a passenger. On the other hand, even if the outer plate 11 is deformed, when the reinforcing member 13 is not deformed, the passenger protection device does not need to be activated.

Further, in addition to the above-mentioned technique for detecting collision necessary for activating the passenger protection device on the basis of whether or not the amplitude V1 exceeds the amplitude threshold value Vth, specifically, whether or not the amplitude V1 is smaller than the amplitude threshold value Vth, the collision determination section 50 detects collision necessary for activating the passenger protection device also by the following technique.

As for this technique, the absolute value of a variation per unit time in the amplitude V1 outputted from the LC resonance circuit 40, that is, the absolute value of the time differential value of the amplitude V1 will be described with reference to FIG. 7. As shown in FIG. 7, in a state where the reinforcing member 13 is not deformed, the amplitude V1 of the electric signal outputted from the LC resonance circuit 40 is constant. Thus, the quantity of a variation per unit time (time differential value) in the amplitude V1 in this case is 0 (zero). On the other hand, when an object collides with the outer plate 11 to deform the reinforcing member 13, the amplitude V1 of the electric signal outputted from the LC resonance circuit 40 is decreased. In other words, the absolute value of the quantity of a variation per unit time (time differential value) in the amplitude V1 in this case is increased. Then, the collision determination section 50 determines whether or not the absolute value of a variation per unit time (time differential value) in the amplitude V1 exceeds the amplitude time variation threshold value Ath. Specifically, when the absolute value of the quantity of a variation per unit time (time differential value) in the amplitude V1 exceeds the amplitude time variation threshold value Ath, the collision determination section 50 determines that an object collides with the outer plate 11 to deform the reinforcing member 13.

On the other hand, even if the outer plate 11 is deformed, when where the reinforcing member 13 is not deformed, the absolute value of the quantity of a variation per unit time (time differential value) in the amplitude V1 is not made larger than the amplitude time variation threshold value Ath.

In short, when the value of the amplitude V1 itself becomes smaller than the amplitude threshold value Vth, or when the absolute value of the quantity of a variation per unit time (time differential value) in the amplitude V1 exceeds the amplitude time variation threshold value Ath, the collision determination section 50 determines that an object collides with the outer plate 11 to deform the reinforcing member 13. In other words, the collision determination section 50 detects collision necessary for protecting a passenger at earlier timing of the timing when the amplitude V1 becomes smaller than the amplitude threshold value Vth and the timing when the absolute value of the quantity of a variation per unit time (time differential value) in the amplitude V1 exceeds the amplitude time variation threshold value Ath. With this, at earlier timing, the collision determination section 50 can determine whether or not collision necessary for protecting a passenger occurs.

Further, the planar coil member 2 is used as a sensor. For this reason, a space for arranging the sensor can be reduced and the sensor can be easily fixed. Moreover, a range in which side collision can be detected becomes a range in which a magnetic field is produced by the coil, that is, a range corresponding to the size of the coil. In short, a range in which side collision can be detected can be expanded. Further, high sensitivity and high-speed response can be realized by using the amplitude V1 of the electric signal outputted from the LC resonance circuit 40.

Here, the entire size of the planar coil 21 has an effect on a detection range. According to this embodiment, the width W2 in the horizontal direction at the outermost periphery of the planar coil 21 is set larger than the width H2 in the vertical direction at the outermost periphery of the planar coil 21. Thus, a reduction in the sensitivity of detection can be prevented and the detection range can be surely expanded.

Moreover, in the planar coil 21 wound a plurality of turns on the same plane, the magnetic flux is distributed more intensively on the inner turn side. That is, the effect of the shape of the inner turn of the planar coil 21 becomes larger. According to this embodiment, the width W1 in the horizontal direction at the innermost periphery of the planar coil 21 is set larger than the width H1 in the vertical direction at the innermost periphery of the planar coil 21. Thus, a range in which the sensitivity of detection is high can be made wide.

Further, a middle value of the width W2 in the horizontal direction at the outermost periphery of the planar coil 21 and the width W1 in the horizontal direction at the innermost periphery is set larger than a middle value of the width H2 in the vertical direction at the outermost periphery of the planar coil 21 and the width H1 in the vertical direction at the innermost periphery. It can be said also from this that a reduction in the sensitivity of detection can be prevented and that the detection range can be made wide.

<Modified Mode of First Embodiment>

In the first embodiment, when the amplitude V1 becomes smaller than the amplitude threshold value Vth or when the absolute value of the quantity of a variation per unit time (time differential value) of the amplitude V1 exceeds the amplitude time variation threshold value Ath, the collision determination section 50 determines that an object collides with the outer plate 11 to deform the reinforcing member 13. In addition, the collision determination section 50 may detect collision when only one of both conditions is satisfied. That is, the collision determination section 50 determines that an object collides with the outer plate 11 to deform the reinforcing member 13 only when the amplitude V1 becomes smaller than the amplitude threshold value Vth. Further, the collision determination section 50 may determine that an object collides with the outer plate 11 to deform the reinforcing member 13 only when the absolute value of the quantity of a variation per unit time (time differential value) of the amplitude V1 exceeds the amplitude time variation threshold value Ath. Here, the collision determination can be made earlier in the case of using both of the conditions for determination than in the case of using either of the conditions for determination.

Figure 8:
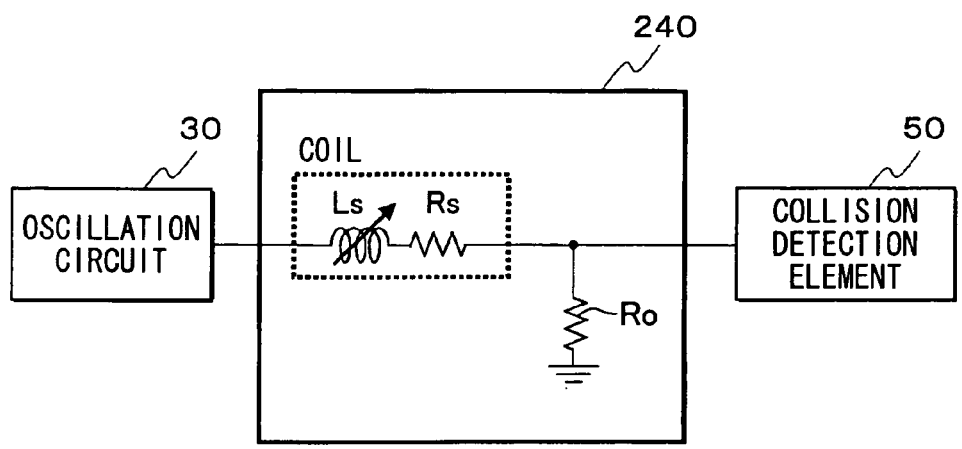
FIG. 8 is a diagram to show a detection circuit in a modified mode of the first embodiment.

Moreover, the LC resonance circuit 40 is applied as the detection circuit, but in addition, for example, a circuit 240 shown in FIG. 8 can be also applied. In this case, the collision determination is not made on the basis of the amplitude of the frequency characteristics in the LC resonance circuit 40 but a variation in the inductance Ls of the planar coil 21 is directly inputted and the collision determination is made on the basis of the variation.

Here, in this case, as in the case of using the LC resonance circuit 40 of the first embodiment, the collision determination section 50 determines that an object collides with the outer plate 11 to deform the reinforcing member 13 when the inductance Ls becomes smaller than a first threshold value or when the absolute value of the quantity of a variation per unit time (time differential value) of the inductance Ls exceeds a second threshold value. Alternatively, the collision determination section 50 may use either of both conditions for the collision determination. That is, the collision determination section 50 may determine that an object collides with the outer plate 11 to deform the reinforcing member 13 only when the inductance Ls becomes smaller than the first threshold value. Further, the collision determination section 50 may determine that an object collides with the outer plate 11 to deform the reinforcing member 13 only when the absolute value of the quantity of a variation per unit time (time differential value) of the inductance Ls exceeds the second threshold value. In these cases, just as with the first embodiment, the collision determination can be made earlier in the case of making the collision determination by using both of the conditions than in the case of making the collision determination by using only one of the conditions.

Moreover, the oscillation frequency F of the oscillation circuit 30 in the first embodiment is lower than the series resonance frequency fa0, but the oscillation frequency F of the oscillation circuit 30 can also be higher than the series resonance frequency fa0 and lower than the parallel resonance frequency fb0. In this case, the amplitude V1 is varied so as to increase with the movement of the reinforcing member 13. In other words, in this case, the collision determination is made by whether or not the amplitude V1 becomes larger than the threshold value Vth.

Further, in the first embodiment, the width W2 in the horizontal direction at the outermost periphery of the planar coil 21 is set larger than the width H2 in the vertical direction at the outermost periphery of the planar coil 21, and the width W1 in the horizontal direction at the innermost periphery of the planar coil 21 is set larger than the width H1 in the vertical direction at the innermost periphery of the planar coil 2. However, the shape of the planar coil 21 is not limited to these conditions but may be a shape satisfying only either of the conditions. In this case, the effect of each shape can be produced.

Second Embodiment

A detection device for side collision of a vehicle of a second embodiment will be described with reference to FIG. 9. The second embodiment is a mode in which the planar coil 21 is fixed to the reinforcing member 13 via a planar auxiliary plate 100 of a shielding member and in which a variation in the separate distance between the planar coil 21 and the inner plate 12 is detected.

Figure 9:
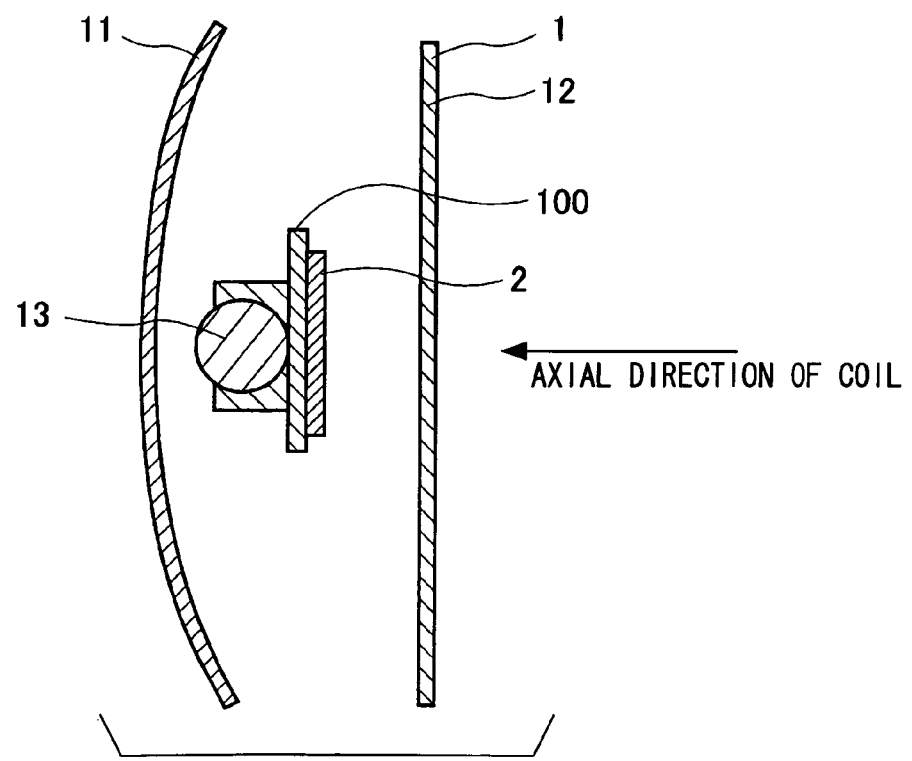
FIG. 9 is a section view when a side door in a second embodiment is cut vertically to the left and right direction of the vehicle.

FIG. 9 is a section view when the side door 1 is cut vertically to the left and right direction of the vehicle. In the first embodiment, the coil member 2 is fixed directly to the reinforcing member 13, but in second embodiment, the coil member 2 is fixed to the planar auxiliary plate 100. Here, the planar auxiliary plate 100 is formed of a rectangular plate made of metal such as iron or a ferromagnetic material. Alternatively, the planar auxiliary plate 100 may be formed of a resin film containing metal powder or a plastic plate coated with metal powder. The planar auxiliary plate 100 is fixed to the reinforcing member 13 so as to be opposite to the inner plate 12. That is, the coil member 2, the planar auxiliary plate 100, and the reinforcing member 13 are arranged at the nearly same position in the up and down direction of the vehicle.

The outside shape of the planar coil 21 of the coil member 2 is made smaller than the outside shape of the planar auxiliary plate 100. This coil member 2 is fixed to a face on the inner plate 12 side of the planar auxiliary plate 100 in such a way that the planar coil 21 does not project from the outer edge of the planar auxiliary plate 100, that is, in such a way that the planar coil 21 is inside the outer edge of the planar auxiliary plate 100 when viewed from the axial direction of the planar coil 21 (in an axial view), as shown by an arrow in FIG. 9. Further, the planar auxiliary plate 100 and the coil member 2 are integrally formed in an adjacent state (or only in a close state) so as to be arranged in the above-mentioned manner. At this time, the planar auxiliary plate 100 and the coil member 2 are integrally formed so as not to be electrically conductive to each other. For example, a film-shaped resin is interposed between the planar auxiliary plate 100 and the coil member 2. Thus, for example, when a film having a first layer to a third layer laminated in this order and having the planar coil 21 formed between the first layer film and the second layer film and having the planar auxiliary plate 100 formed between the second layer film and the third layer film is constructed in such a way that the first layer film is pressed onto the second layer film and that the second layer film is pressed onto the third layer film, the planar auxiliary plate 100 and the coil member 2 are fixed and hence further integrally formed. Here, the planar auxiliary plate 100 is interposed between the coil member 2 and the reinforcing member 13.

The collision detection in this case is made in the same manner as in the first embodiment. However, when the coil member 2 is fixed directly to the reinforcing member 13, as in the case of the first embodiment, there is a possibility that depending on the shape of the reinforcing member 13, the inductance Ls of the planar coil 21 at an early stage when the coil member 2 is mounted on the reinforcing member 13 will be varied. Thus, by fixing the coil member 2 to the planar auxiliary plate 100, it is possible to prevent or reduce such a variation in the inductance Ls of the planar coil 21 at the early stage that is caused by the shape of the reinforcing member 13.

Further, by integrally forming the coil member 2 and the planar auxiliary plate 100, the fixing state of the planar coil 21 can be made stable. As a result, the variation in the initial inductance Ls of the planar coil 21 at the early stage can be further reduced. Moreover, by integrating both members into one member, the integrated member can be easily fixed to the reinforcing member 13.

Still further, the planar auxiliary plate 100 is formed in a shape larger than the outside shape of the planar coil 21, and the planar coil 21 is fixed so as not to project from the outer edge of the planar auxiliary plate 100. When the planar coil 21 is fixed in a state where the planar coil 21 projects from the outer edge of the planar auxiliary plate 100, there is a possibility that the inductance Ls of the planar coil 21 at the early stage will be varied by a portion projecting from the planar auxiliary plate 100 of the planar coil 21. Thus, as described above, by fixing the planar coil 21 in such a way that the planar coil 21 does not project from the outer edge of the planar auxiliary plate 100, it is possible to prevent or reduce the variation in the inductance Ls of the planar coil 21 at the early stage.

Third Embodiment

Figure 11:
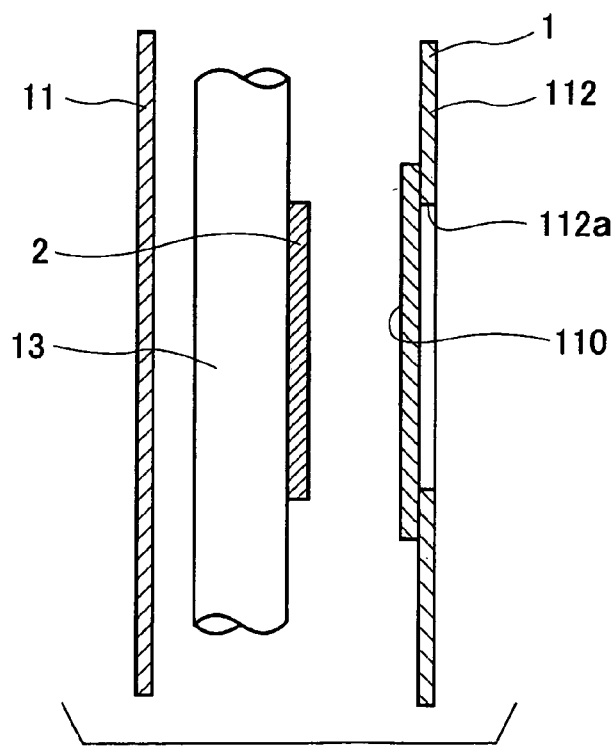
FIG. 11 is a section view when the side door is cut vertically to the front and rear direction of the vehicle.
Figure 12:
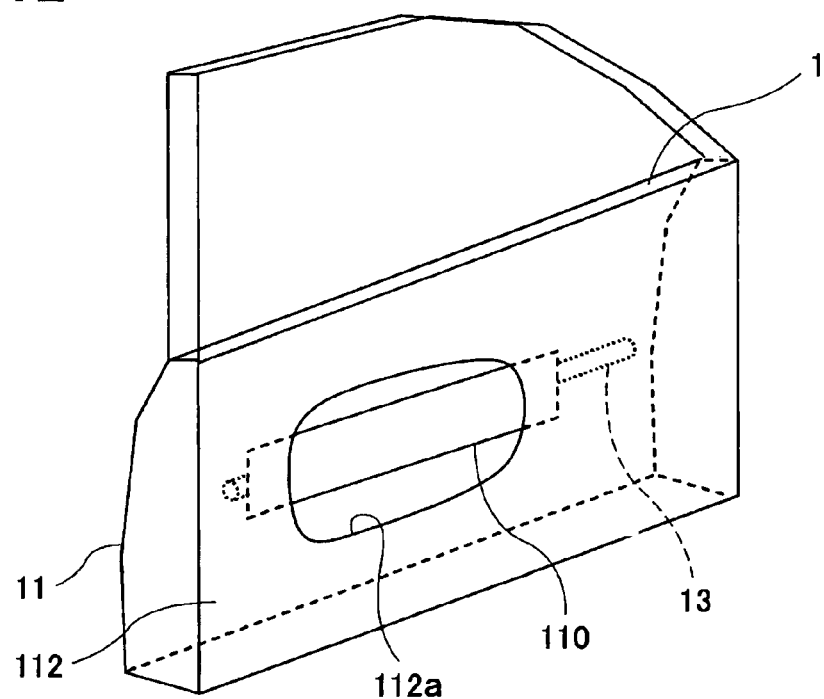
FIG. 12 is a perspective view when the side door is viewed from inside a vehicle compartment.

Next, a detection device for side collision of a vehicle of a third embodiment will be described with reference to FIG. 10 to FIG. 12. The third embodiment is a mode in which the planar coil 21 is fixed to the reinforcing member 13 and in which a variation in the separate distance between the planar coil 21 and an inside plate-shaped member 110 is detected.

Figure 10:
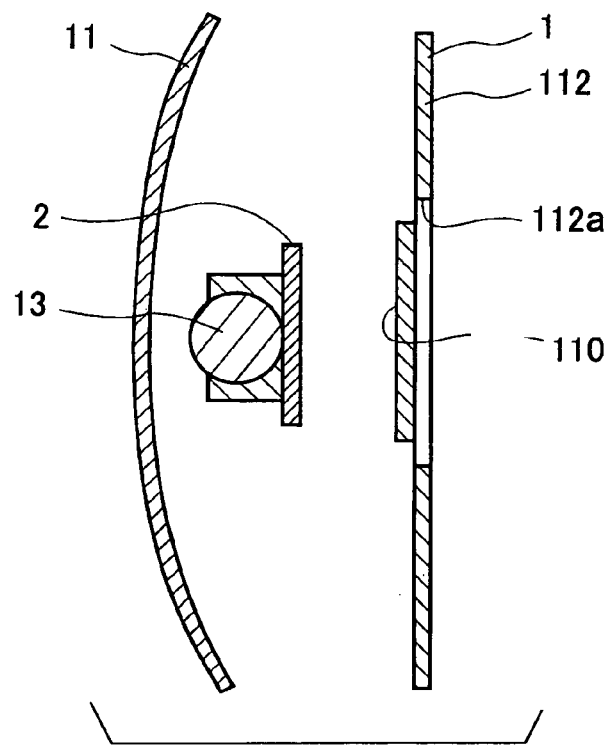
FIG. 10 is a section view when a side door in a third embodiment is cut vertically to the left and right direction of the vehicle.

FIG. 10 is a section view when the side door 1 is cut vertically to the left and right direction of the vehicle. FIG. 11 is a section view when the side door 1 is cut vertically to the front and rear direction of the vehicle. FIG. 12 is a perspective view when the side door 1 is viewed from inside the vehicle compartment of the side door 1.

In the first embodiment, the inner plate 12 is a planar plate not having a through hole, but in a third embodiment, an inner plate 112 has a through hole such as a service hole 112a. This service hole 112a is formed for the purpose of mounting or adjusting a power window mechanism and a speaker arranged in the interior of the side door 1 and of mounting or adjusting the coil member 2 fixed to the reinforcing member 13.

In this case, when the service hole 112a is arranged at a position opposite to the coil member 2, the service hole 112a can have an effect on the quantity of magnetic flux detected by the planar coil 21, that is, a variation in the inductance Ls. Then, as shown in FIG. 10 to FIG. 12, the inside plate-shaped member 110 made of metal such as iron or a ferromagnetic material or a magnetic material is fixed to the face facing outside of the vehicle of the inner plate 12 (face of the outer plate 11 side) so as to cover at least a portion of the service hole 112a and so as to be opposite to the planar coil 21. This can prevent the effect of the service hole 112a.

Here, the inside plate-shaped member 110 is formed in a shape larger than the outside shape of the planar coil 21 and is arranged so as to be opposite to the planar coil 21. With this, a variation in the inductance Ls of the planar coil 21, that is, the quantity of magnetic flux interlinking the planar coil 21 can be increased and hence the sensitivity of detection of the side collision can be improved.

<Modified Mode of Third Embodiment>

As a modified mode of the third embodiment, irrespective of whether or not the inner plate 12 has a through hole formed therein, even if the inner plate 12 is made of a non-magnetic material such as a resin module, by fixing the inside plate-shaped member 110 to the inner plate 12, a variation in the inductance Ls of the planar coil 21, that is, a variation in the quantity of magnetic flux interlinking the planar coil 21 can be surely detected. When the inner plate 12 is a resin module, the inductance Ls of the planar coil 21, that is, the quantity of magnetic flux interlinking the planar coil 21 is not varied according to the separate distance between the planar coil 21 and the inner plate 12. In this case, when the inside plate-shaped member 110 made of metal or a ferromagnetic material is used, the side collision can be surely detected.

In this regard, a distinctive portion in the second embodiment or its modified mode can be also applied to the third embodiment or its modified mode. In these cases, the effect produced by the construction of the second embodiment or its modified mode and the effect produced by the construction of the third embodiment or its modified mode can be produced.

Fourth Embodiment

Next, a detection device for side collision of a vehicle of a fourth embodiment will be described with reference to FIG. 13. The fourth embodiment is a mode in which the planar coil 21 is fixed directly to the inner plate 12 and in which a variation in the separate distance between the planar coil 21 and the reinforcing member 13 is detected.

Figure 13:
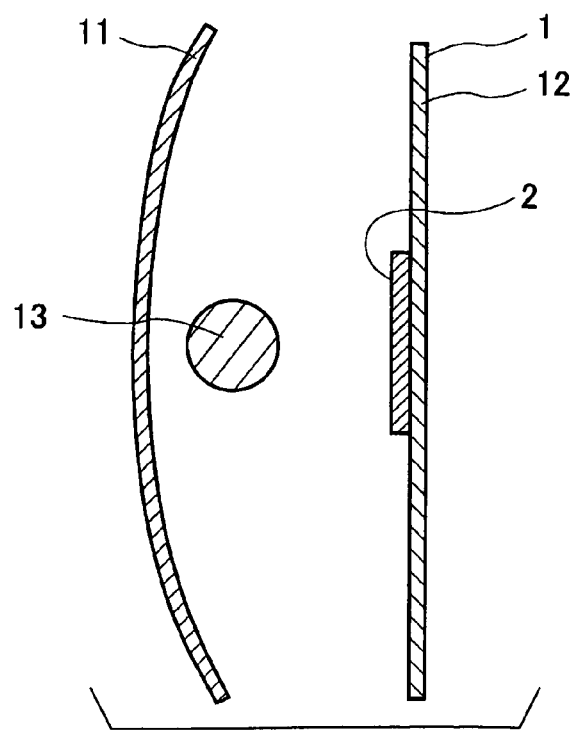
FIG. 13 is a section view when a side door in a fourth embodiment is cut vertically to the left and right direction of the vehicle.

FIG. 13 is a section view when the side door 1 is cut vertically to the left and right direction of the vehicle. In the first embodiment, the coil member 2 is fixed to the reinforcing member 13, but in the fourth embodiment, the coil member 2 is fixed to the face facing outside of the vehicle of the inner plate 12 (face on a side opposite to the outer plate 11). Specifically, the coil member 2 is fixed at a position opposite to the reinforcing member 13 of the face facing outside of the vehicle of the inner plate 12.

Here, in the fourth embodiment, the inner plate 12 does not need to be made of metal or a ferromagnetic material, but the reinforcing member 13 needs to be made of metal or a ferromagnetic material. That is, in the first embodiment, the inductance Ls of the planar coil 21 is varied according to a variation in the separate distance between the planar coil 21 and the inner plate 12, but in the fourth embodiment, the inductance Ls of the planar coil 21 is varied according to a variation in the separate distance between the planar coil 21 and the reinforcing member 13. Although the fourth embodiment is different in this point from the first embodiment, the fourth embodiment is substantially equal to the first embodiment in the detection of the side collision.

<Modified Mode of Fourth Embodiment>

Figure 14:
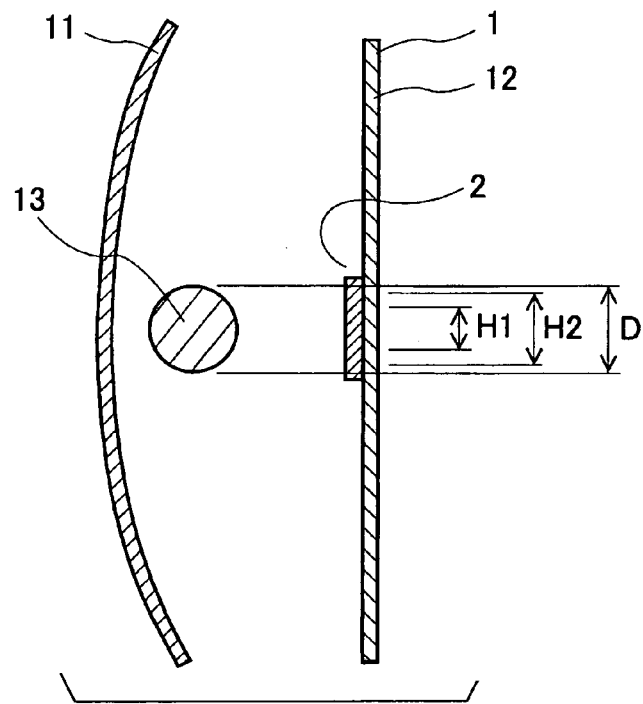
FIG. 14 is a section view when a side door in a modified mode of the fourth embodiment is cut vertically to the left and right direction of the vehicle.

Next, a detection device for side collision of a vehicle of a modified mode of the fourth embodiment will be described with reference to FIG. 14. FIG. 14 is a section view when the side door 1 is cut vertically to the left and right direction of the vehicle.

In the fourth embodiment, the relationship between the width in the vertical direction of the planar coil 21 and the width of a bar of the reinforcing member 13 is not described, but in this modified mode, the width in the vertical direction of the planar coil 21 is set smaller than the width of a bar of the reinforcing member 13. Specifically, both of the width H1 in the vertical direction at the innermost periphery of the planar coil 21 (see FIG. 3) and the width H2 in the vertical direction at the outermost periphery of the planar coil 21 (see FIG. 3) are set smaller than the width D of the bar of the reinforcing member 13. Further, the planar coil 21 is arranged in such a way that all portions in the vertical direction at the outermost periphery of the planar coil 21 are opposite to the reinforcing member 13.

Here, in the planar coil 21 wound a plurality of turns on the same plane, the magnetic flux is distributed more intensively on the inner turns. In other words, the effect of the shapes of the inner turns of the planar coil 21 becomes large. Thus, when the width H1 in the vertical direction at the innermost periphery of the planar coil 21 is set smaller than the width D of the bar of the reinforcing member 13, the sensitivity of detection can be surely increased.

Further, the width H2 in the vertical at the outermost periphery of the planar coil 21 is set smaller than the width D of the bar of the reinforcing member 13, so that the entire planar coil 21 is smaller than the width D of the bar of the reinforcing member 13. With this, the effect on a variation in the inductance can be increased by the entire planar coil 21. Thus, the sensitivity of detection can be increased.

In this regard, in this modified mode, both of the width H1 in the vertical direction at the innermost periphery of the planar coil 21 and the width H2 in the vertical direction at the outermost periphery of the planar coil 21 are set smaller than the width D of the bar of the reinforcing member 13. However, the width of the planar coil 21 is not limited to this mode but, for example, only the width H1 in the vertical direction at the innermost periphery of the planar coil 21 may be set smaller than the width D of the bar of the reinforcing member 13. In this case, the effect only by this setting of the width can be produced.

Fifth Embodiment

Next, a detection device for side collision of a vehicle of a fifth embodiment will be described with reference to FIG. 15. The fifth embodiment is a mode in which the planar coil 21 is fixed to the inner plate 12 via a planar auxiliary plate 120 (shielding member) and in which a variation in the separate distance between the planar coil 21 and the reinforcing member 13 is detected.

Figure 15:
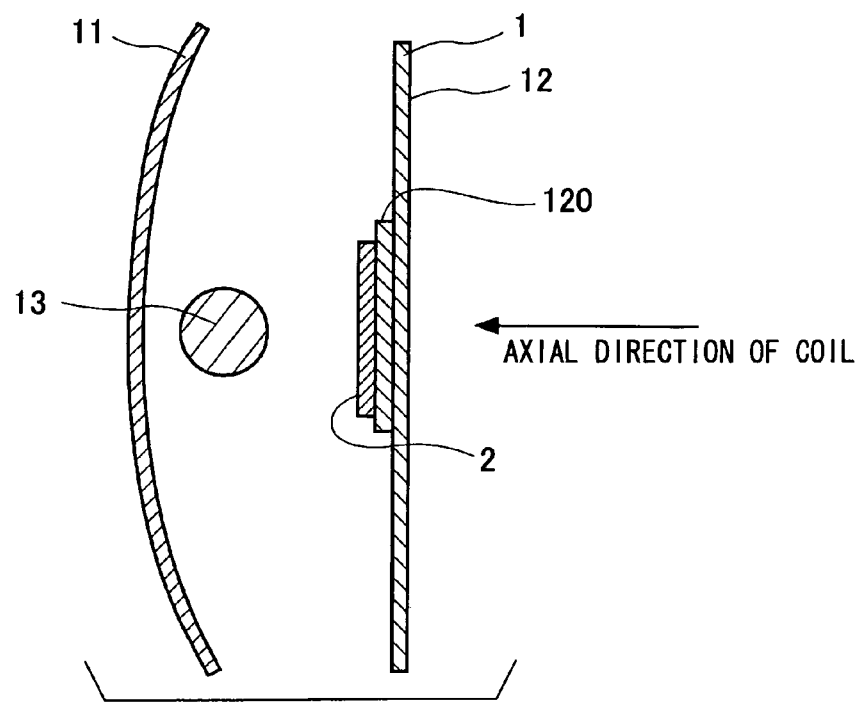
FIG. 15 is a section view when a side door in a fifth embodiment is cut vertically to the left and right direction of the vehicle.

FIG. 15 is a section view when the side door 1 is cut vertically to the left and right direction of the vehicle. In the fourth embodiment, the coil member 2 is fixed directly to the face facing outside of the vehicle of the inner plate 12, but in the fifth embodiment, the coil member 2 is fixed to the inner plate 12 via the planar auxiliary plate 120. Here, the planar auxiliary plate 120 is formed of a rectangular planar plate made of metal such as iron or a ferromagnetic material. The planar auxiliary plate 120 is fixed to the face facing outside of the vehicle of the inner plate 12 so as to be opposite to the reinforcing member 13. That is, the coil member 2, the planar auxiliary plate 120, and the reinforcing member 13 are arranged at the nearly same position in the up and down direction of the vehicle.

The outside shape of planar coil 21 of the coil member 2 is made smaller than the outside shape of the planar auxiliary plate 120. This coil member 2 is fixed to a face on the inner plate 12 side of the planar auxiliary plate 120 in such a way that the planar coil 21 does not project from the outer edge of the planar auxiliary plate 120, that is, in such a way that the planar coil 21 is inside the outer edge of the planar auxiliary plate 120 when viewed from the axial direction of the planar coil 21 (in an axial view), as shown by an arrow in FIG. 15. Further, the planar auxiliary plate 120 and the coil member 2 are integrally formed in an adjacent state (or only in a close state) so as to be in the above-mentioned arrangement relationship. At this time, the planar auxiliary plate 120 and the coil member 2 are integrally formed so as not to be electrically conductive to each other. For example, a film-shaped resin is interposed between the planar auxiliary plate 120 and the coil member 2. Thus, for example, when a film having a first layer to a third layer laminated in this order and having the planar coil 21 formed between the first layer film and the second layer film and having the planar auxiliary plate 120 formed between the second layer film and the third layer film is constructed in such a way that the first layer film is pressed onto the second layer film and that the second layer film is pressed onto the third layer film, the planar auxiliary plate 120 and the coil member 3 are fixed and hence further integrally formed. Here, the planar auxiliary plate 120 is interposed between the coil member 2 and the inner plate 12.

The collision detection in this case is made in the same manner as in the fourth embodiment. However, when the coil member 2 is fixed directly to the inner plate 12, as in the case of the fourth embodiment, there is a possibility that depending on the shape of the inner plate 12, the inductance Ls of the planar coil 21 will be varied at an early stage when the coil member 2 is mounted on the reinforcing member 13. Thus, by fixing the coil member 2 to the planar auxiliary plate 120, a variation in the inductance Ls of the planar coil 21 at the early stage, which is caused by the shape of the inner plate 12, can be prevented or reduced.

Further, by integrally forming the coil member 2 and the planar auxiliary plate 120, the fixing state of the planar coil 21 can be made stable. As a result, the variation in the inductance Ls of the planar coil 21 at the early stage can be further reduced. Moreover, by integrating both members into one member, the integrated member can be easily fixed to the inner plate 12.

Still further, the planar auxiliary plate 120 is formed in a shape larger than the outside shape of the planar coil 21, and the planar coil 21 is fixed to the planar auxiliary plate 120 so as not to project from the outer edge of the planar auxiliary plate 120. If the planar coil 21 is fixed in a state where the planar coil 21 projects from the outer edge of the planar auxiliary plate 120, there is a possibility that the inductance Ls of the planar coil 21 at the early stage will be varied by a portion projecting from the planar auxiliary plate 120 of the planar coil 21. Thus, by fixing the planar coil 21 in such a way that the planar coil 21 does not project from the outer edge of the planar auxiliary plate 120, as described above, the variation in the initial inductance Ls of the planar coil 21 at the early stage can be more stably prevented or reduced.

<Modified Mode of Fifth Embodiment>

Figure 16:
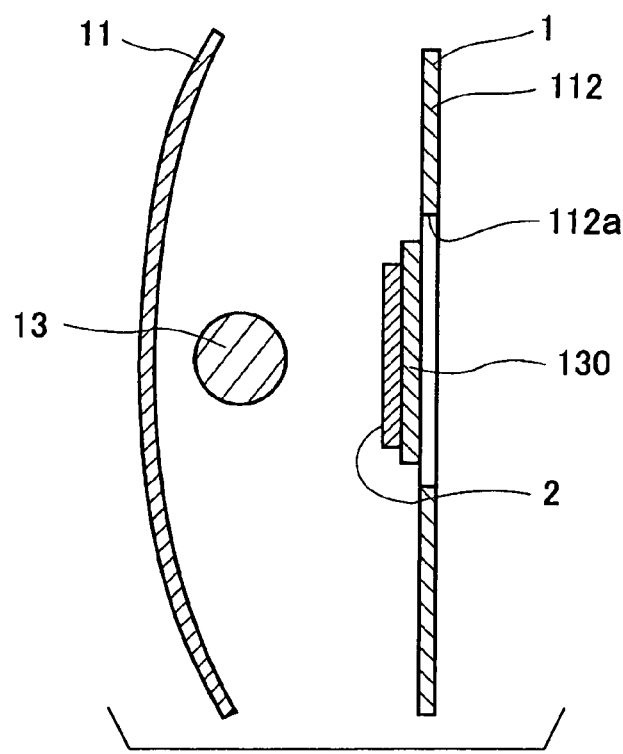
FIG. 16 is a section view when a side door in a modified mode of the fifth embodiment is cut vertically to the left and right direction of the vehicle.

Next, a detection device for side collision of a vehicle of a modified mode of the fifth embodiment will be described with reference to FIG. 12 and FIG. 16. FIG. 16 is a section view when the side door 1 is cut vertically to the left and right direction of the vehicle. In the fifth embodiment, the inner plate 12 is a planar plate not having a through hole, but in this modified mode, as shown in FIG. 12, an inner plate 112 has a through hole such as a service hole 112a. This service hole 112a is formed for the purpose of mounting or adjusting a power window mechanism and a speaker arranged in the interior of the side door 1 and of mounting or adjusting the coil member 2.

In this case, when the service hole 112a is arranged at a position where the coil member 2 is to be fixed, it is not easy to fix the coil member 2 to the inner plate 112. Thus, as shown in FIG. 16, a planar auxiliary plate 130 (shielding member) is fixed to the face facing outside of the vehicle of the inner plate 112 so as to cover at least a portion of the service hole 112a. The planar auxiliary plate 130 and the coil member 2 are integrally formed. With this, even if the service hole 112a is formed in the inner plate 112, the coil member 2 can be easily fixed to the inner plate 112.

Moreover, there is a possibility that the service hole 112a of the inner plate 112 will have an effect on a variation in the inductance Ls of the planar coil 21, thereby causing a variation in the inductance Ls. In this case, by making the planar auxiliary plate 130 of metal such as iron or a ferromagnetic material, a variation in the inductance Ls of the planar coil 21 can be prevented or reduced. Thus, even if the service hole 112a is formed in the inner plate 112, when the planar auxiliary plate 130 made of metal or a magnetic material is fixed to the inner plate 112, the side collision can be surely detected.

Sixth Embodiment

Next, a detection device for side collision of a vehicle of a sixth embodiment will be described with reference to FIG. 17. The sixth embodiment is a mode in which the planar coil 21 is fixed directly to the inner plate 12 and in which a variation in the separate distance between the planar coil 21 and a reinforcing member side plate-shaped member 140 is detected.

Figure 17:
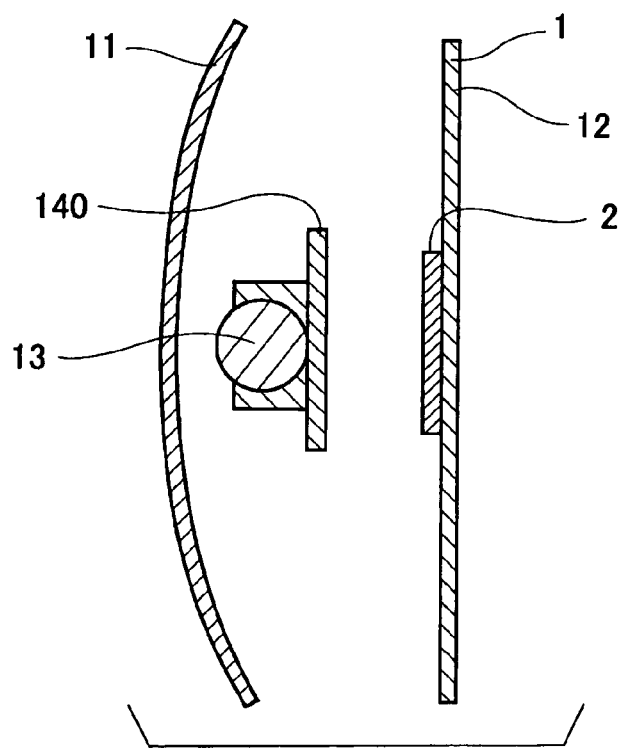
FIG. 17 is a section view when a side door in a sixth embodiment is cut vertically to the left and right direction of the vehicle.

FIG. 17 is a section view when the side door 1 is cut vertically to the left and right direction of the vehicle. In the fourth embodiment, the reinforcing member 13 does not have anything fixed thereto, and the coil member 2 produces a magnetic field between itself and the reinforcing member 13. In contrast to this, in the sixth embodiment, the reinforcing member side plate-shaped member 140 is fixed to the inner plate 12 side of the reinforcing member 13. Here, the reinforcing member side plate-shaped member 140 is formed in the shape of a rectangular plate made of metal, for example, iron or a ferromagnetic material. The reinforcing member side plate-shaped member 140 is fixed to the reinforcing member 13 so as to be opposite to the inner plate 12. Here, in the sixth embodiment, the reinforcing member 13 does not need to be made of metal or a ferromagnetic material.

The outside shape of the planar coil 21 of the coil member 2 is made smaller than the outside shape of the reinforcing member side plate-shaped member 140. That is, the reinforcing member side plate-shaped member 140 is larger than the outside diameter of the planar coil 21 at least in the up and down direction of the vehicle. Further, although not shown in the drawing, it is desired that the reinforcing member side plate-shaped member 140 is larger than the outside diameter of the planar coil 21 in the front and rear direction of the vehicle (in the front and rear direction in a state where the side door 1 is closed). This coil member 2 is fixed to a region opposite to the reinforcing member side plate-shaped member 140 of the inner plate 12 (thus, the coil member 2 and the reinforcing member side plate-shaped member 140 are arranged at nearly same positions in the up and down direction of the vehicle). In other words, the coil member 2 is interposed between the inner plate 12 and the reinforcing member side plate-shaped member 140 and produces a magnetic field in a direction in which the inner plate 12 and the reinforcing member side plate-shaped member 140 are opposite to each other.

In this case, the side collision is detected in the same way as in the fourth embodiment. However, the reinforcing member side plate-shaped member 140 has an outside shape larger than the outside shape of the planar coil 21. Thus, such a variation in the magnetic field that is caused by the deformation of the reinforcing member 13 is made larger. As a result, a variation in the inductance Ls of the planar coil 21 is made larger, that is, the sensitivity of detection is increased.

In this regard, a distinctive portion in the fifth embodiment or its modified mode can be also applied to the sixth embodiment. In this case, the effect produced by construction of the fifth embodiment or its modified mode and the effect produced by the construction of the sixth embodiment can be produced.

In this regard, in the above-mentioned embodiments, the member (planar auxiliary plates 100, 120, and 130) shaped like a planar plate (sheet) is used as the shielding member, but the member is not necessarily formed in this shape. For example, the member may be formed in the shape of a lattice, a net, or a wave. Further, it can be also thought that the shielding member is grounded (electrically connected to a vehicle body earth such as a metal reinforcing member or a door) to improve shielding property.

Figure 18:
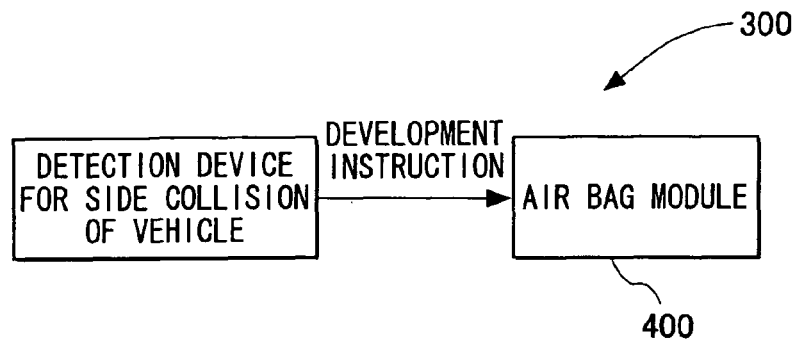
FIG. 18 is a block diagram to show the outline of a passenger protection system for a vehicle.

The detection device for side collision of a vehicle constructed in the above-mentioned manner can be used in the following manner. The general construction of a passenger protection system 300 for a vehicle is shown by a block diagram in FIG. 18. This passenger protection system for a vehicle has an air bag module 400. When collision occurs, the air bag module 400 develops an air bag to protect a vehicle passenger from the impact of the collision. Here, the detection device for side collision of a vehicle shown in FIG. 18 may be any one of the above-mentioned side collision detection devices for a vehicle. The air bag module 400 is mounted in a portion near the side face of a seat (not shown) mounted in the vehicle and is electrically connected the detection device for side collision of a vehicle. When the detection device for side collision of a vehicle determines that the vehicle collides with some object, the detection device for side collision of a vehicle outputs a development instruction to the air bag module 400. The air bag module 400 receiving the instruction develops the air bag. With this, the impact of collision applied to the passenger can be reduced.

Seventh Embodiment

Next, a detection device for side collision of a vehicle of a seventh embodiment will be described with reference to FIG. 19 to FIG. 26. The seventh embodiment is a mode in which the planar coil 21 is fixed directly to the reinforcing member 13 and in which a variation in the separate distance between the planar coil 21 and the inner plate 12 is detected.

Figure 19:
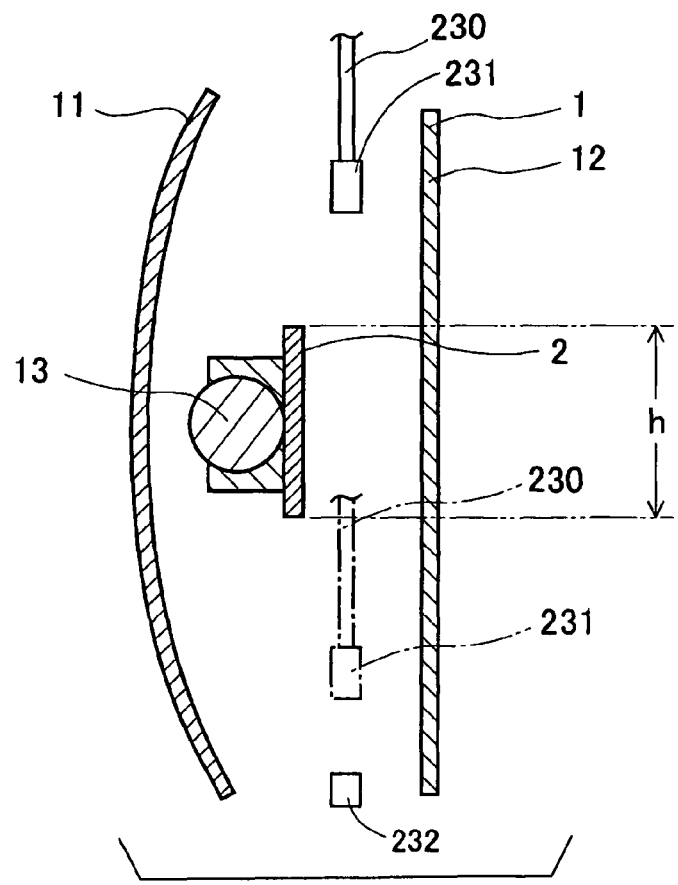
FIG. 19 is a section view (section view along a line XIX-XIX in FIG. 20) when a side door in a seventh embodiment is cut vertically to the left and right direction of the vehicle.
Figure 20:
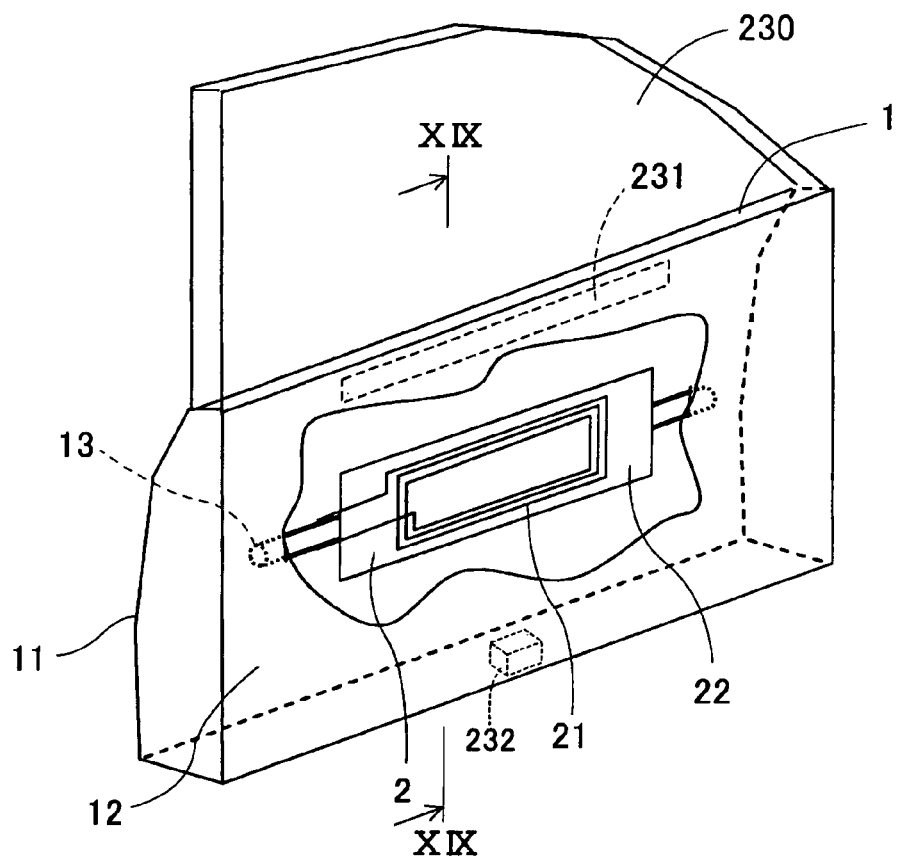
FIG. 20 is a perspective view when the side door is viewed from inside a vehicle compartment and a view to show the side door in a state in which a portion of an inner plate is removed.
Figure 21:
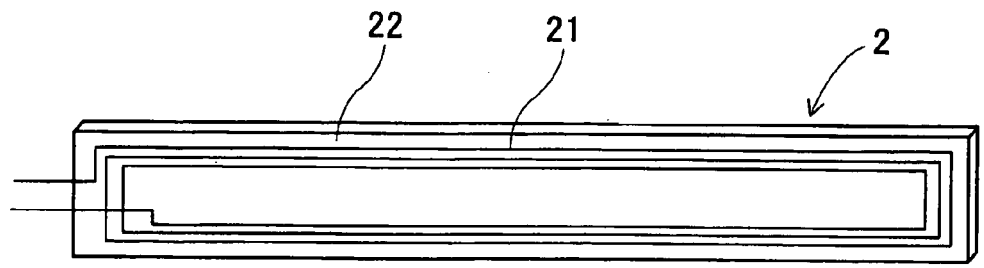
FIG. 21 is a side view to show a coil.
Figure 22:
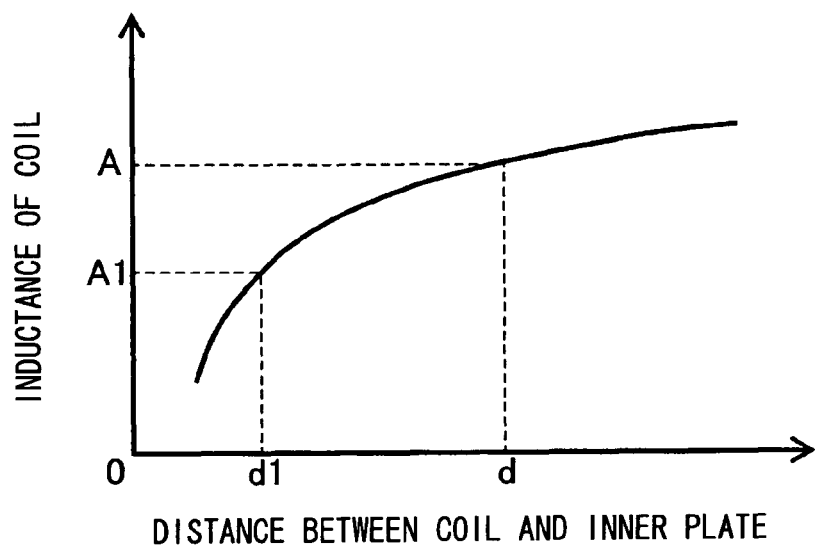
FIG. 22 is a graph to show the relationship of the inductance of a coil with respect to a separate distance between an inner plate and the coil.
Figure 23:
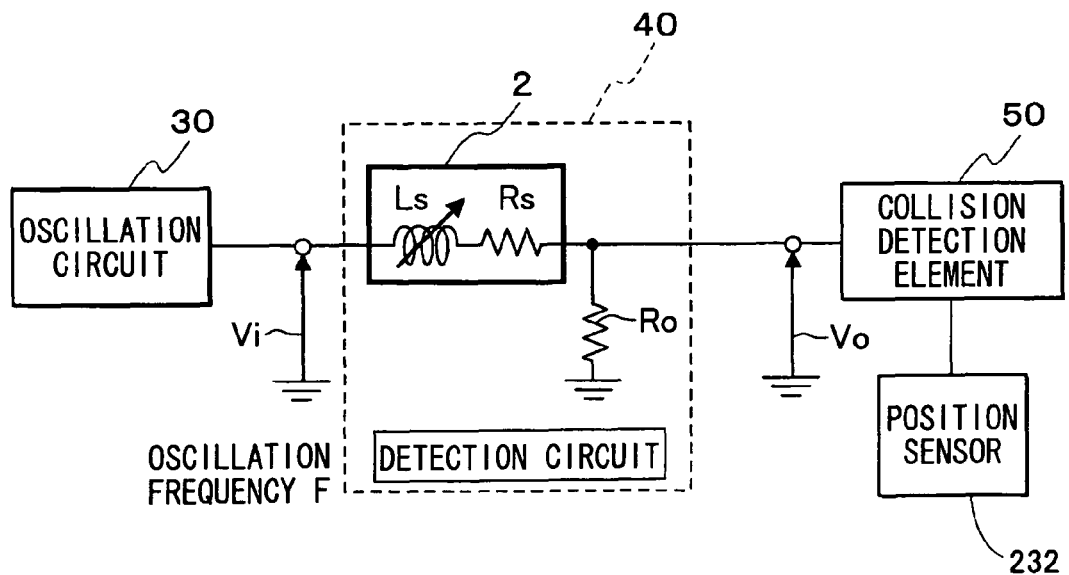
FIG. 23 is a circuit construction diagram to show a detection device for side collision of a vehicle.
Figure 24:
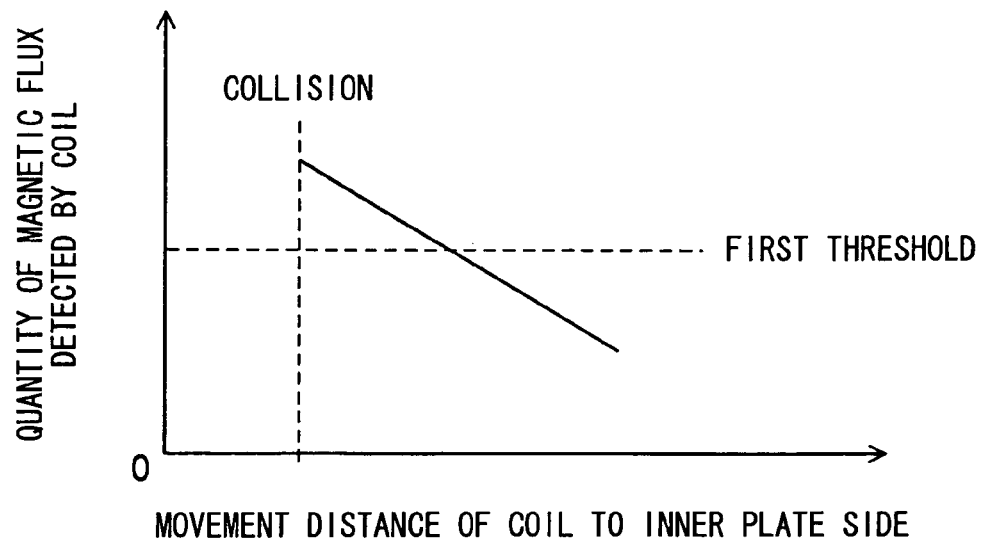
FIG. 24 is a graph to show the quantity of magnetic flux detected by the coil with respect to the distance of travel to the inner plate of the coil.
Figure 25:
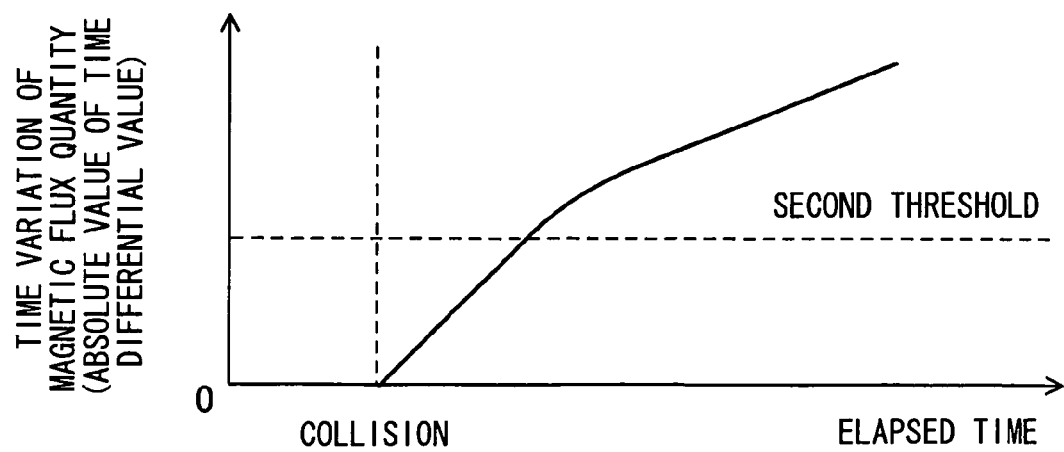
FIG. 25 is a graph to show the absolute value of the quantity of a variation per unit time (time differential value) in the quantity of magnetic flux with respect to the time that elapses after collision occurs.
Figure 26:
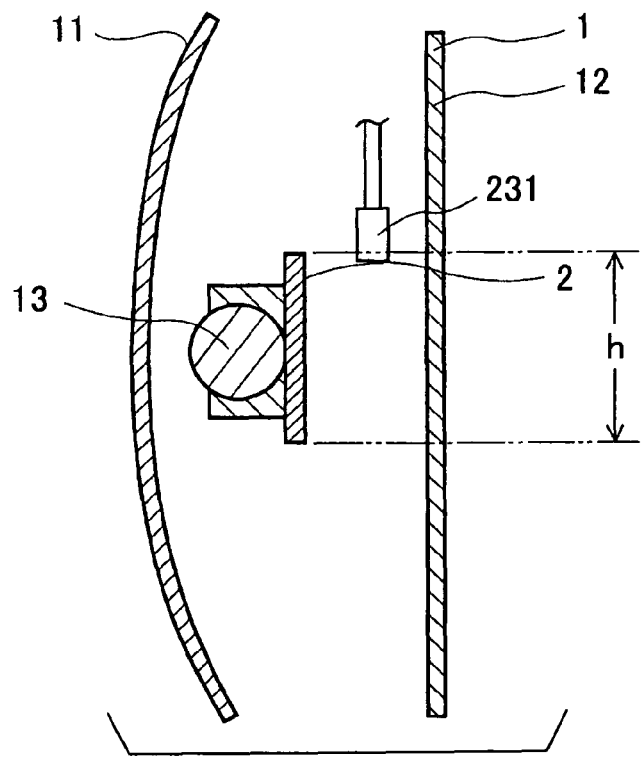
FIG. 26 is a section view to show the relationship between a stay and a coil of the seventh embodiment.

FIG. 19 is a section view (section view taken on a line XIX-XID in FIG. 20) when the side door 1 in FIG. 20 is cut vertically to the left and right direction of the vehicle. Here, in FIG. 19, the upper and lower portions of the side door 1 are omitted for the sake of convenience. FIG. 20 is a perspective view when the side door 1 to which the present invention is applied is viewed from inside the vehicle compartment and shows the side door 1 in a state where a portion of the inner plate 12 is removed for the sake of convenience of description. FIG. 21 is a side view to show the coil member 2. FIG. 22 is a graph to show the relationship of the inductance Ls of the planar coil 21 to the separate distance between the inner plate 12 and the planar coil 21. FIG. 23 is a circuit construction diagram to show the detection device for side collision of a vehicle. FIG. 24 is a graph to show the relationship of the quantity of magnetic flux detected by the coil member 2 to the separate distance between the inner plate 12 and the coil member 2. FIG. 25 is a graph to show the absolute value of the quantity of a variation per unit time (time differential value) of the quantity of magnetic flux to the time that lapses after collision occurs. FIG. 26 is a section view when the side door 1 is cut vertically to the left and right direction of the vehicle and is a diagram to show the position relationship between the coil member 2 and a stay 231.

As shown in FIG. 19 and FIG. 20, the side door 1 has: an outer plate 11 positioned outside the vehicle; and the inner plate 12 arranged inside the vehicle compartment separately from the outer plate 11 and opposite to the outer plate 11 and made of a magnetic material (or metal). Further, the side door 1 has the reinforcing member 13 made of a circular cylindrical bar and positioned on the outer plate 11 side between the outer plate 11 and the inner plate 12 and nearly in the center in the up and down direction of the vehicle so as to extend in the front and rear direction of the vehicle. In other words, the reinforcing member 13 is arranged opposite to and separately from the inner plate 12. This reinforcing member 13 has bending rigidity higher than at least the bending rigidity of the outer plate 11. In short, when an object collides with the outer plate 11, even if the outer plate 11 of lower bending rigidity is deformed, the reinforcing member 13 prevents the entire side door 1 from being deformed. Here, in the seventh embodiment, the inner plate 12 is an inner plate side member in the present invention.

A space allowing a door glass 230 to move up and down is interposed between the reinforcing member 13 and the inner plate 12. Moreover, there is positioned a stay 231 of a power window mechanism (not shown) that is fixed to the lower side of the door glass 230 and which moves up and down the door glass 230. In FIG. 19, a state where the door glass 230 is positioned at an upper portion (state where the window is closed) is shown by a solid line, whereas a state where the door glass 230 is positioned at a lower portion (state where the window is opened) is shown by a one dot and dash line.

Thus, the door glass 230 and the stay 231 are moved up and down between the reinforcing member 13 and the inner plate 12 in FIG. 19 when the window is closed and opened. Further, as shown in FIG. 19 and FIG. 20, a position sensor 232 is arranged below the side door 1 and below the stay 231 so as to be opposite to the stay 231. The position sensor 232 detects the separate distance between the position sensor 231 and the stay 231 and sends distance data to a collision determination element 50 (see FIG. 23). Here, the position sensor 232 may be a sensor for detecting a position in the up and down direction of the vehicle of the door glass 230. When the position sensor 232 detects the position of the door glass 230, the collision determination element 50 computes the position of the stay 231 from the position of the door glass 230.

Moreover, as shown in FIG. 19 and FIG. 20, the planar coil member 2 is arranged on the inner plate 12 side of the reinforcing member 13. The coil member 2 is supplied with an AC voltage from an oscillator (not shown) to produce a magnetic field in the normal direction of the coil member 2 (coil axial direction of the coil member 2), that is, in the direction of the inner plate 12 opposite to the planar coil member 2. Here, the coil member 2 corresponds to a distance sensor in the present invention.

Next, the coil member 2 of this embodiment will be described. The reinforcing member 13 is arranged separately from and opposite to the inner plate 12 and has bending rigidity higher than at least the bending rigidity of the outer plate 11. In short, when an object collides with the outer plate 11, even if the outer plate 11 of lower bending rigidity is deformed, the reinforcing member 13 prevents the entire side door 1 from being deformed. However, when collision to deform the reinforcing member 13 to the inner plate 12 side occurs, the coil member 2 fixed to the reinforcing member 13 is also moved to the inner plate 12 side. Thus, the separate distance between the coil member 2 and the inner plate 12 of the inner plate side member is varied. A variation in the separate distance is detected as a variation in the quantity of magnetic flux of the coil member 2 by a detection circuit (which corresponds to detection means of the present invention).

The coil member 2, as shown in FIG. 21, is formed in a plane shape as a whole. This coil member 2 is constructed of the planar coil 21 and a pair of films 22. The planar coil 21 is formed by pattern printing, for example, a conductive material such as copper so as to wind in a plane shape. The pair of films 22 sandwich the planar coil 21 from both sides to cover the planar coil 21 to prevent the planar coil 21 from being exposed. This film 22 is formed of flexible material such as PET (polyethylene terephthalate) or PEN (polyethylene naphthalate) in the shape of a thin film. In short, the film 22 is freely bent. Moreover, the planar coil 21 itself is also freely bent and deformed. Thus, the entire coil member 2 can be bent and deformed and has very high flexibility. In short, at least the coil member 2 is higher in flexibility than the reinforcing member 13, so that even if the reinforcing member 13 is bent, the coil member 2 can be bent without being broken.

The relationship of the separate distance between the coil member 2 and the inner plate 12 to the magnetic flux of the coil member 2 of this embodiment will be described with reference to FIG. 22. As described above, when an object collides with the outer plate 11 of the side door 1, the outer plate 11 is deformed inside the vehicle compartment. When the collision is large and hence deforms the reinforcing member 13 inside the vehicle compartment, the coil member 2 is also moved to the inner plate 12 side together with the reinforcing member 13. With this, the separate distance between the coil member 2 fixed to the reinforcing member 13 and the inner plate 12 is made shorter. Then, an eddy current is made to flow through the inner plate 12 by the magnetic field produced by the coil member 2, whereby a magnetic field is produced in the inner plate 12. The direction of the magnetic field is a direction in which the inner plate 12 and the coil member 2 are opposite to each other. In short, as the separate distance between the inner plate 12 and the coil member 2 is made shorter, the magnetic field that is produced by the eddy current produced in the inner plate 12 and which interlinks the coil member 2, that is, the magnetic flux passing through the coil member 2 is increased. This magnetic flux acts in such a way as to reduce the magnetic flux of the coil member 2, so that the inductance of the coil member 2 is reduced.

FIG. 22 is a graph to show the relationship of the separate distance between the inner plate 12 and the coil member 2 to the inductance Ls of the coil member 2. In the graph shown in FIG. 22, assuming that, for example, the separate distance between the coil member 2 and the inner plate 12 before collision is d and that the separate distance after the collision becomes d1 that is shorter than d, the inductance Ls of the coil member 2 is decreased from A before the collision to A1 after collision, as shown on the vertical axis. In this manner, the inductance Ls of the coil member 2 is varied according to a variation in the separate distance between the inner plate 12 and the coil member 2. Here, even when an object collides with the outer plate 11 of the side door 1, if the reinforcing member 13 is not deformed, the inductance Ls of the coil member 2 is not varied.

Moreover, the detection device for side collision of a vehicle of this embodiment, as shown in FIG. 23, is constructed of the oscillation circuit 30, the detection circuit 40, the collision detection element 50, and the position sensor 232. The collision detection element 50 corresponds to determination means of the present invention.

The detection circuit 40 has the coil member 2 and a detection resistor Ro. The coil member 2 corresponds to a series circuit having inductance Ls and resistance Rs. The coil member 2 has one end connected to the oscillation circuit 30 and has the other end connected to the detection resistor Ro and the collision determination element 50. The oscillation circuit 30 applies an AC voltage V1 of an oscillation frequency F to the detection circuit 40. Here, when the separate distance between the coil member 2 and the inner plate 12 is made shorter by the collision, as described above, the inductance Ls of the coil member 2 is decreased. When the inductance Ls of the coil member 2 is decreased, the impedance of the coil member 2 is made smaller. Thus, the detection voltage V0 of the detection resistor Ro is made comparatively large. The collision determination element 50 determines whether or not an object collides with the side door 1 on the basis of the detection voltage V0 outputted by the detection circuit 40.

Next, the collision determination means of this embodiment will be described with reference to FIG. 24 and FIG. 25. FIG. 24 is a graph to show the relationship of the separate distance between the coil member 2 and the inner plate 12 to the quantity of magnetic flux detected by the coil member 2. In FIG. 24, a horizontal axis expresses the movement distance to the inner plate 12 side of the coil member 2, whereas a vertical axis expresses the magnitude of magnetic flux interlinking the coil member 2. As shown in FIG. 24, before collision occurs, the separate distance between the coil member 2 and the inner plate 12 is not varied and hence the magnitude of displacement of the magnetic flux is not varied but is constant, but after the collision occurs, the coil member 2 is brought closer to the inner plate 12 by the collision and hence the magnitude of magnetic flux interlinking the coil member 2 is made smaller. In other words, as the movement distance of the coil member 2 is made larger (the coil member 2 is brought closer to the inner plate 12), the magnitude of magnetic flux is made smaller. In this embodiment, when the magnitude of magnetic flux is made smaller than a previously set value (first threshold value shown in FIG. 24), it is determined that collision occurs. Here, the magnitude of magnetic flux of the coil member 2, as described above, is detected as the detection voltage V0 of the detection resistor Ro of the detection circuit 40 shown in FIG. 23. Thus, in the detection circuit of this embodiment, as the movement distance of the coil member 2 is made larger (the coil member 2 is brought closer to the inner plate 12), the magnitude of magnetic flux is made smaller and hence the self inductance Ls of the coil member 2 is made smaller, so that the detection voltage V0 is made larger.

Further, the collision determination means of this embodiment determines whether or not collision occurs also by the following methods. FIG. 25 is a graph to show the quantity of a variation per unit time of the quantity of magnetic flux detected by the coil member 2 computed on the basis of the detection voltage V0. The vertical axis expresses the quantity of a variation per unit time of the quantity of magnetic flux and a horizontal axis expresses time that elapses after collision occurs. As shown in FIG. 25, the quantity of magnetic flux interlinking the coil member 2 is not varied until collision occurs, so that the quantity of a variation per unit time of the quantity of magnetic flux is zero. However, after the collision occurs, the quantity of a variation per unit time of the quantity of magnetic flux becomes large (that is, the coil member 2 is moved to the inner plate 12 side at high speed), and when deformation is finished, the quantity of a variation per unit time of the quantity of magnetic flux again becomes zero. Here, a threshold value (second threshold value shown in FIG. 25) is set for the quantity of a variation per unit time of the quantity of magnetic flux, and when the quantity of a variation per unit time of the quantity of magnetic flux exceeds this threshold value, it is determined that the deformation is caused by the collision.

While this embodiment has two collision determination methods as described above, this embodiment is characterized by selecting one determination method from the two collision determination methods according to the position in the up and down direction of the vehicle (in the vertical direction of the side door 1) of the stay 231. Hereinafter, the collision determination method of this embodiment will be described on the basis of FIG. 19 and FIG. 26.

The stay 231 shown (by a solid line and a single dot and dash line) in FIG. 19 is not within a range (h) in the up and down direction of the coil member 2. In this case, it is defined in the present invention that the stay is arranged at a position other than a position between the coil member and the inner plate side member. On the other hand, as shown in FIG. 26, when even a portion of the stay 231 is within the range (h) in the up and down direction of the coil member 2, it is defined that the stay is positioned between the coil and the inner plate side member. Here, the width (h) in the up and down direction of the coil member 2 is assumed to be the width in the up and down direction of the outermost periphery of coil (winding) wound like the planar coil 21 shown in FIG. 21.

When the stay 231 is not positioned between the coil member 2 and the inner plate 12 of the inner plate side member, a collision determination is made by the use of either of the above-mentioned two collision determination methods. Alternatively, both of the collision determination methods may be used and the collision determination may be made by the use of the method capable of making the collision determination earlier. When both methods are concurrently used and the collision determination is made by the method capable of making the collision determination earlier, the collision determination can be made earlier.

On the other hand, when the stay 231 is positioned between the coil member 2 and the inner plate 12 of the inner plate side member, a collision determination is made by the use of the determination method based on the quantity of a variation per unit time of the quantity of magnetic flux of the above-mentioned two collision determination methods. With this construction, even when the stay 231 is brought into the detection space of the magnetic flux of the coil member 2 and cannot correctly detect a variation in the separate distance between the coil member 2 and the inner plate 12 by the detection of the quantity of the magnetic flux, collision can be correctly detected by the collision determination method based on the quantity of a variation per unit time of the quantity of magnetic flux. Thus, the coil member 2 for detecting collision can be arranged in a wide range. Here, the position in the up and down direction of the vehicle of the stay 231, as shown in FIG. 19 and FIG. 20, is detected by the position sensor 232 arranged below the side door 1 and in the same vertical plane as a vertical plane along which the stay 231 is moved up and down in such a way as to vertically look up the stay 231. The data of the detected position is sent to the collision determination element 50 (FIG. 23).

The position sensor of this seventh embodiment can be also applied to the second embodiment, the third embodiment, the fourth embodiment, the fifth embodiment, and the sixth embodiment.

Eighth Embodiment

A detection device for side collision of a vehicle of an eighth embodiment will be described with reference to FIG. 27.

In the seventh embodiment, of the two collision determination methods, the collision determination method to be used is selected according to the position in the up and down direction of the vehicle (in the vertical direction of the side door 1) of the stay 231. With this, the detection of collision can be made with accuracy and in a wide range. On the other hand, the invention of the eighth embodiment does not select the determination method according to the position of the stay but makes the width in the up and down direction (width in the vertical direction) of the vehicle of the coil larger than the width in the up and down direction (width in the vertical direction) of the vehicle of the stay, thereby reducing the effect produced when the stay is brought into the detection range of the magnetic flux of the coil. Thus, the construction of the detection circuit of this embodiment becomes a circuit in which the position sensor 232 is removed from the circuit construction diagram shown in FIG. 23.

Figure 27:
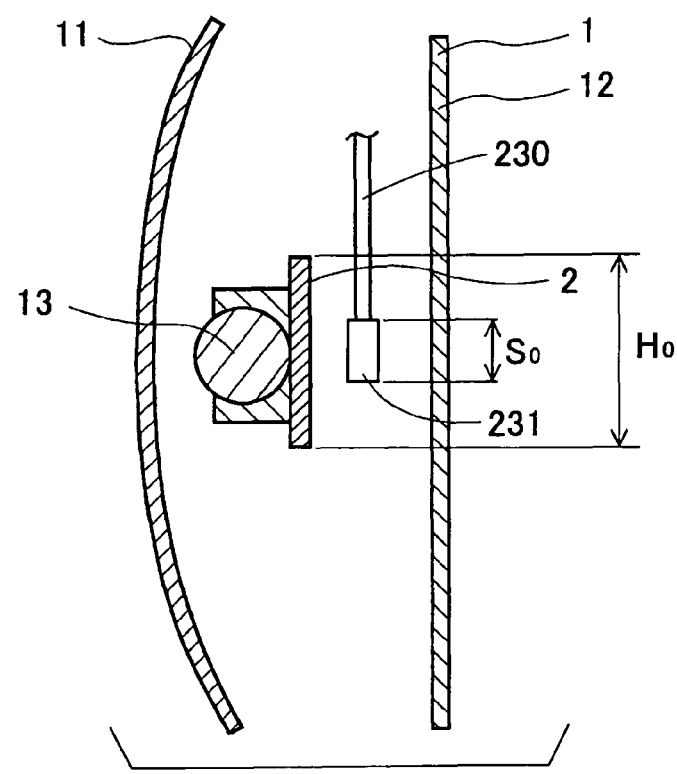
FIG. 27 is a section view when a side door 1 in an eighth embodiment is cut vertically to the left and right direction of the vehicle.

FIG. 27 is a section view when the side door 1 is cut vertically to the left and right direction of the vehicle. As shown in the drawing, the coil member 2 is fixed to the reinforcing member 13. Depending on a state where the door glass 230 is opened or closed, the stay 231 fixed to the door glass 230 and the door glass 230 can be positioned between the coil member 2 and the inner plate 12 (that is, in the detection area of the magnetic flux by the coil member 2). When the stay 231 is positioned in the detection area, the determination method using the magnitude of the quantity of magnetic flux (determination method shown in FIG. 24) of the above-mentioned two determination methods causes a large error. In contrast to this, the present invention makes the width in the up and down direction of the vehicle (width in the vertical direction: HO) of the coil member 2 larger than the width in the up and down direction of the vehicle (width in the vertical direction: SO) of the stay 231, thereby reducing the effect that the stay 231 makes on the detection of the magnitude of the quantity of magnetic flux by the coil. With this construction, the detection device for side collision of a vehicle of this embodiment can use the two determination methods even if the stay 231 is arranged at any position. Moreover, this construction eliminates the need for disposing the position sensor arranged in the seventh embodiment.

Here, the entire size of the coil member 2 makes an effect on the range of detection of collision. In this embodiment, the coil is wound a plurality of turns on the same plane, so that the width HO in the up and down direction of the vehicle of the coil member 2 is assumed to be the width in the up and down direction of the vehicle at the outermost periphery.

Moreover, in the planar coil member 2 wound the plurality of turns on the same plane, the magnetic flux is distributed more intensively toward the inner periphery. The shape on inner periphery side of the coil member 2 makes a large effect on the distribution of the magnetic flux. Thus, the width in the up and down direction of the vehicle at the innermost periphery of the coil member 2 may be the width HO in the up and down direction of the vehicle of the coil member 2. With this, the sensitivity of detection can be more increased.

Ninth Embodiment

Next, a detection device for side collision of a vehicle of a ninth embodiment will be described with reference to FIG. 28 to FIG. 34. The ninth embodiment is a mode in which the planar coil 21 is fixed directly to the inner plate 12 and in which three first coil members 501, 502, and 503 for detecting a variation in the separate distance between the planar coil 21 and the reinforcing member 13 are disposed in the front and rear direction of the vehicle.

Figure 28:
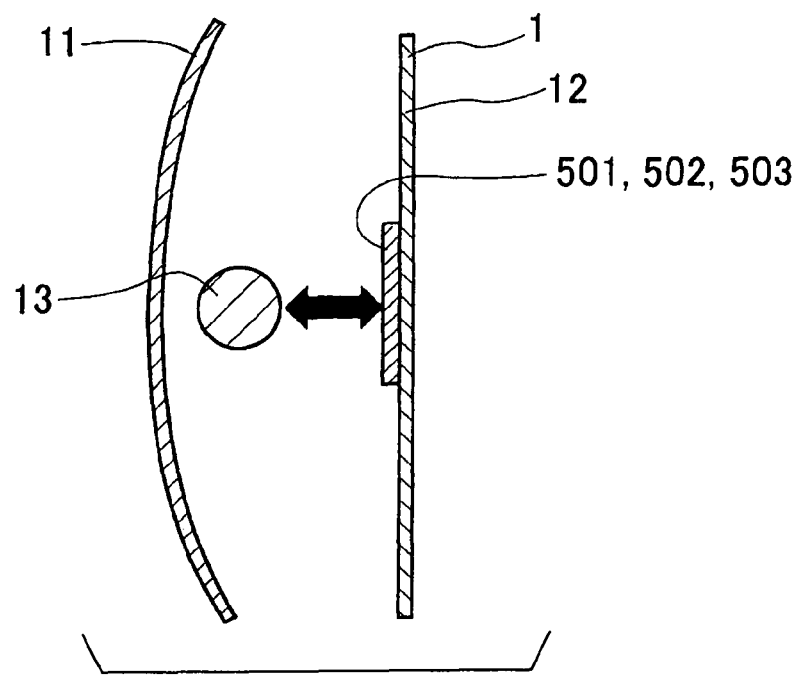
FIG. 28 is a section view when a side door in a ninth embodiment is cut vertically to the left and right direction of the vehicle.
Figure 29:
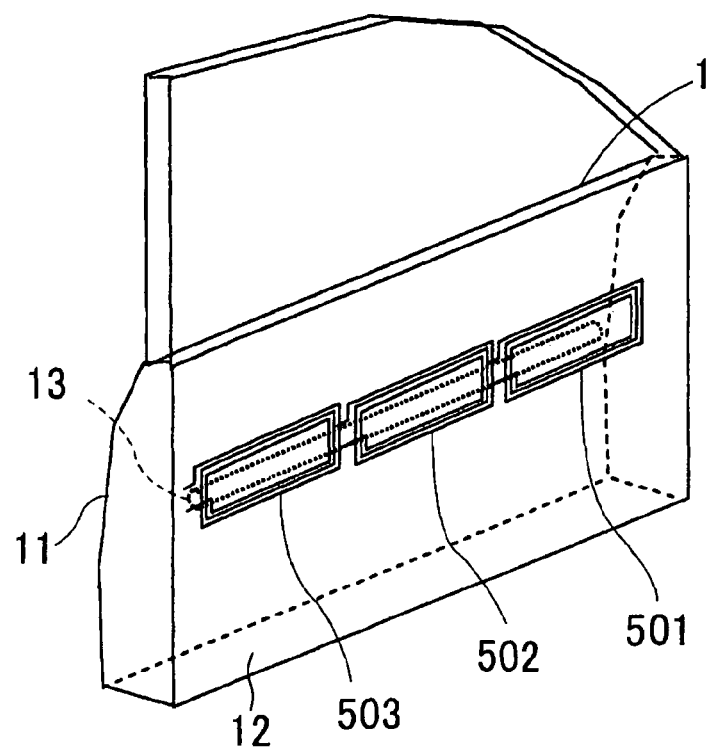
FIG. 29 is a perspective view when the side door in the ninth embodiment is viewed from inside a vehicle compartment.
Figure 30:
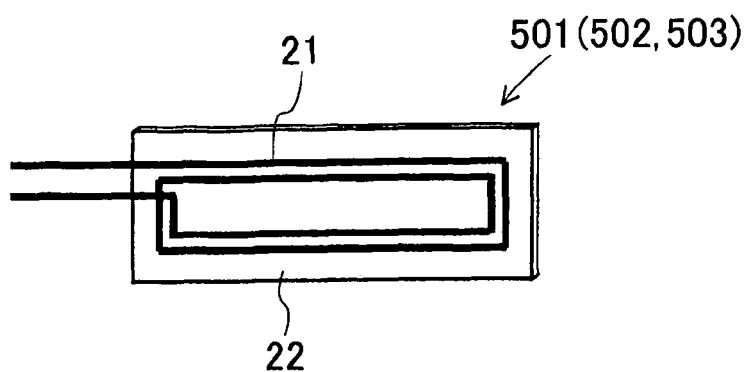
FIG. 30 is a perspective view to show a first coil member in the ninth embodiment.
Figure 31:
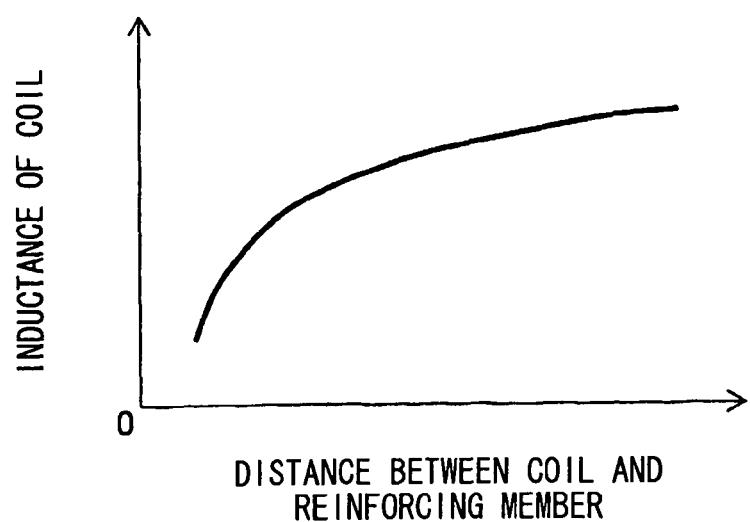
FIG. 31 is a graph to show the relationship of the inductance of a coil with respect to a separate distance between a reinforcing member and each coil.
Figure 32:
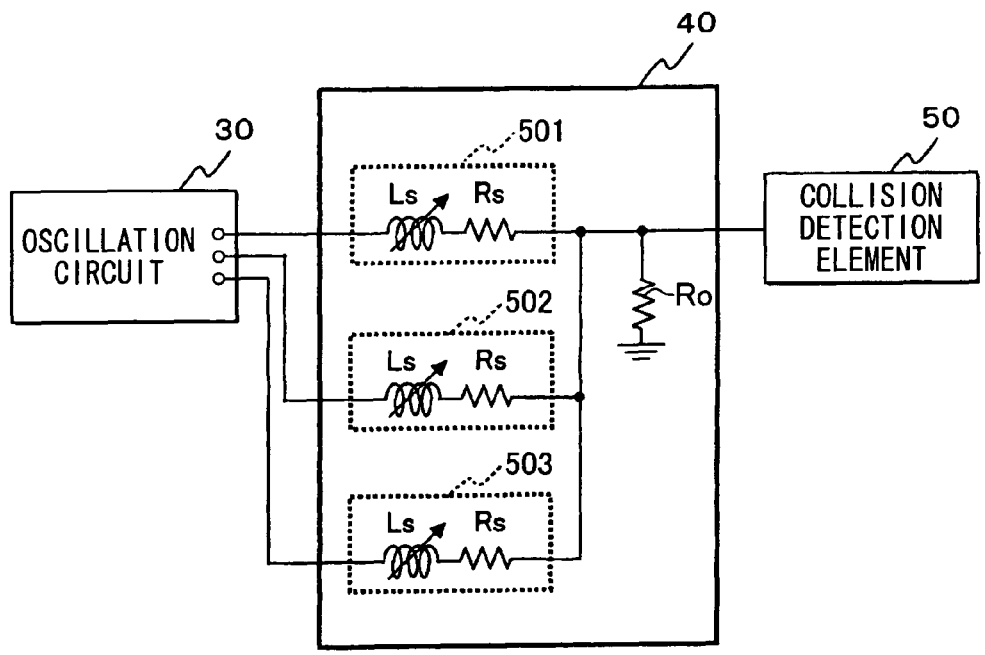
FIG. 32 is a circuit construction diagram to show a detection device for side collision of a vehicle.

FIG. 28 is a section view when the side door 1 is cut vertically to the left and right direction of the vehicle. FIG. 29 is a perspective view when the side door 1 is viewed from inside the vehicle compartment. In FIG. 29, the right side indicates the front side of the vehicle and the left side indicates the rear side of the vehicle. Here, the coil 21 is positioned closer to the outside of the vehicle than the inner plate 12, but the coil 21 is shown by a solid line for the sake of clarity. FIG. 30 is a perspective view to show the first coil member 501. FIG. 31 is a graph to show the relationship of the inductance Ls of the planar coil 21 to the separate distance between the reinforcing member 13 and the respective coils 21. FIG. 32 is a circuit construction diagram to show the detection device for side collision of a vehicle.

As shown in FIG. 28 and FIG. 29, the side door 1 has: an outer plate 11 positioned outside the vehicle; and the inner plate 12 arranged inside the vehicle compartment so as to be separate from and opposite to the outer plate 11. Further, the side door 1 has the reinforcing member 13 that is made of a circular cylindrical bar and which is positioned nearly in the center between the outer plate 11 and the inner plate 12 and nearly in the center in the up and down direction of the vehicle in such a way as to extend in the front and rear direction. In other words, the reinforcing member 13 is arranged opposite to and separately from the inner plate 12. This reinforcing member 13 has bending rigidity higher than at least the bending rigidity of the outer plate 11. In short, when an object collides with the outer plate 11, even if the outer plate 11 of lower bending rigidity is deformed, the reinforcing member 13 prevents the entire side door 1 from being deformed. Here, in the ninth embodiment, the outer plate 11, the inner plate 12, and the reinforcing member 13 are made of metal (ferromagnetic material). However, in this embodiment, it is sufficient that the reinforcing member 13 for measuring the separate distance between the reinforcing member 13 and the coil 21 is made of a ferromagnetic material. Here, the reinforcing member 13 in this embodiment is a first member to be detected in the present invention.

The inner plate 12 has three first coil members 501 to 503 arranged thereon. The first coil member 501, as shown in FIG. 30, is formed in a planar shape as a whole. This first coil member 501 is constructed of the coil 21 and one pair of films 22. The coil 21 is formed of a conductive material, for example, copper wound in the planar shape by pattern printing. The one pair of films 22 sandwich the coil 21 from both sides to cover the coil 21 so as to prevent the coil 21 from being exposed. This film 22 is formed of flexible material such as PET (polyethylene terephthalate) or PEN (polyethylene naphthalate) in the shape of a thin film. In short, the film 22 is freely bent. Moreover, the planar coil 21 itself is also freely bent and deformed. Thus, the first coil member 501 can be bent and deformed as a whole and has very high flexibility. Moreover, the first coil members 502, 503 are also constructed in the same way as the first coil member 501.

These three first coil members 501 to 503, as shown in FIG. 28 and FIG. 29, are fixed to the inner plate 12 so as to be opposite to the reinforcing member 13 of the inner plate 12. In other words, the first coil members 501 to 503 are arranged between the inner plate 12 and the reinforcing member 13. Further, the first coil members 501 to 503 are arranged at different positions in the front and rear direction of the vehicle. Specifically, the first coil member 501 is arranged at a position in the front direction of the vehicle of the inner plate 12. The first coil member 502 is arranged in the central portion in the front and rear direction the vehicle of the inner plate 12. The first coil member 503 is arranged at a position in the rear direction of the vehicle of the inner plate 12. The first coil members 501 to 503 are arranged in such a way that the normal directions of the first coil members 501 to 503, that is, the axial directions of the respective coils 21 coincide with a direction in which the inner plate 12 and the reinforcing member 13 are opposite to each other. Thus, when the respective coils 21 are supplied with current, the coils 21 produce magnetic fields in the direction in which the inner plate 12 and the reinforcing member 13 are opposite to each other.

Here, when an object collides with the outer plate 11, the outer plate 11 is deformed inside the vehicle compartment. When this collision is large, the object deforms the reinforcing member 13 inside the vehicle compartment. In other words, the separate distance between the inner plate 12 and the reinforcing member 13 is made shorter. Then, an eddy current is made to flow through the reinforcing member 13 by the magnetic field produced by the coil 21, whereby a magnetic field is produced in the reinforcing member 13. In short, as the separate distance between the reinforcing member 13 and the coil 21 is made shorter by the collision, the magnetic field produced by the eddy current interlinking the coil 21 is increased. Then, as shown in FIG. 31, as the separate distance between the reinforcing member 13 and the coil 21 is deceased, the inductance Ls of the coil 21 is decreased. In this manner, the inductance Ls of the coil 21 is varied according to a variation in the separate distance between the reinforcing member 13 and the coil 21. Here, even when an object collides with the outer plate 11 of the side door 1, if the reinforcing member 13 is not deformed, the inductance Ls of the coil 21 is not varied.

Next, the detection device for side collision of a vehicle, as shown in FIG. 32, is constructed of the oscillation circuit 30, the detection circuit 40 having the coil 21 as a portion of construction, and the collision determination section 50. The oscillation circuit 30 is a circuit for oscillating an AC voltage.

The detection circuit 40 includes the coils 21 constructing the three first coil members 501 to 503 as portions thereof. The coil 21 corresponds to a series circuit of inductance Ls and resistance Rs. This inductance Ls, as described above, is varied according to the separate distance between the reinforcing member 13 and each of the coils 21. One ends of the respective coils 21 constructing the respective first coil members 501 to 503 are connected to the oscillation circuit 30. The oscillation circuit 30 applies the AC voltage to the one ends of the coils 21 of the respective first coil members 501 to 503 in a time-sharing manner. In other words, when the reinforcing member 13 is deformed so as to come near to the inner plate 12, the inductance Ls of the coil 21 is made smaller and hence the amplitude of the output voltage of the detection circuit 40 is made large.

The collision determination section 50 determines whether or not an object collides with the outer plate 11 to deform the reinforcing member 13 on the basis of the output voltage of the detection circuit 40. A threshold value Th for this determination is previously stored in the collision determination section 50. Specifically, the collision determination section 50 makes a collision determination by whether or not the maximum amplitude of the output voltage of the detection circuit 40 exceeds the collision determination threshold value Th.

Figure 33A:
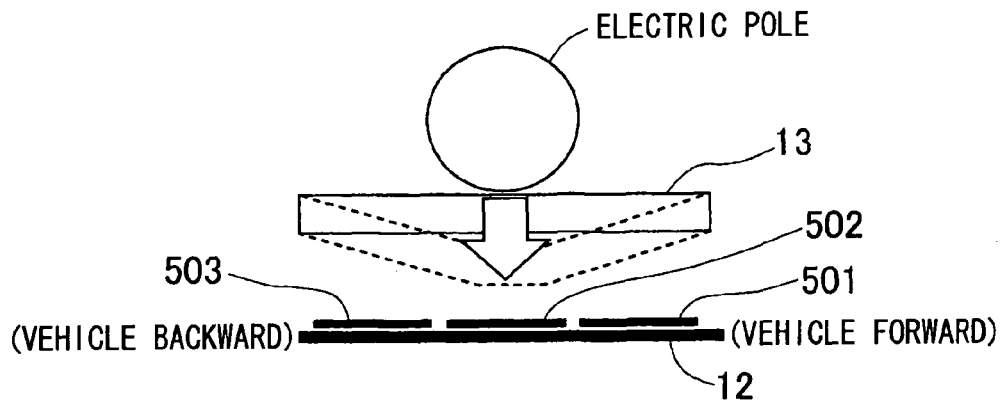
FIGS. 33A to 33C are diagrams relating to a collision object and its position.
Figure 33B:
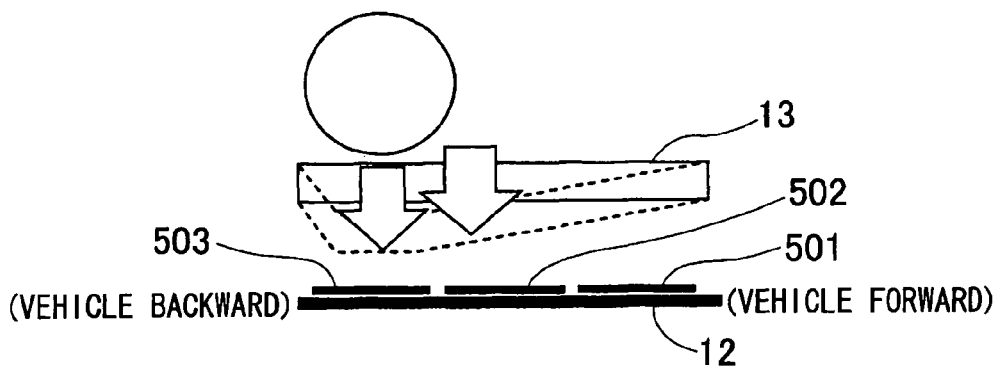
Figure 33C:
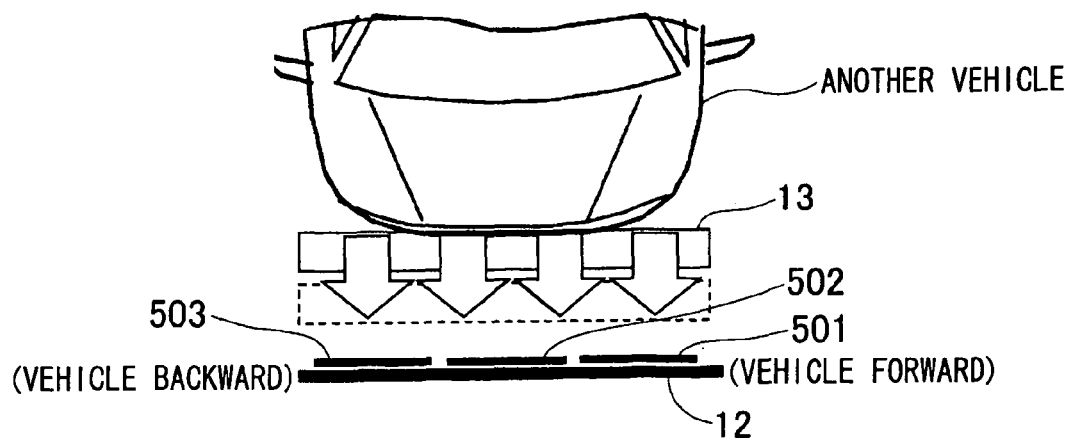
Figure 34A:
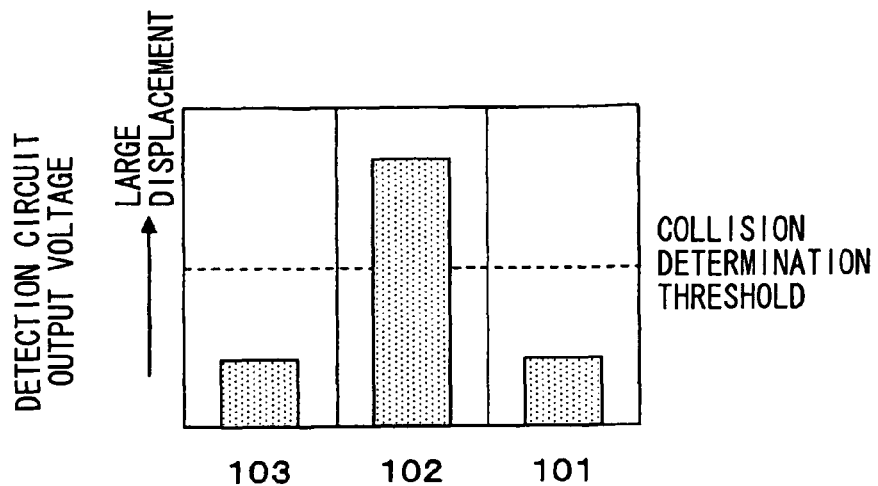
FIGS. 34A to 34C are graphs to show an output voltage from a detection circuit.
Figure 34B:
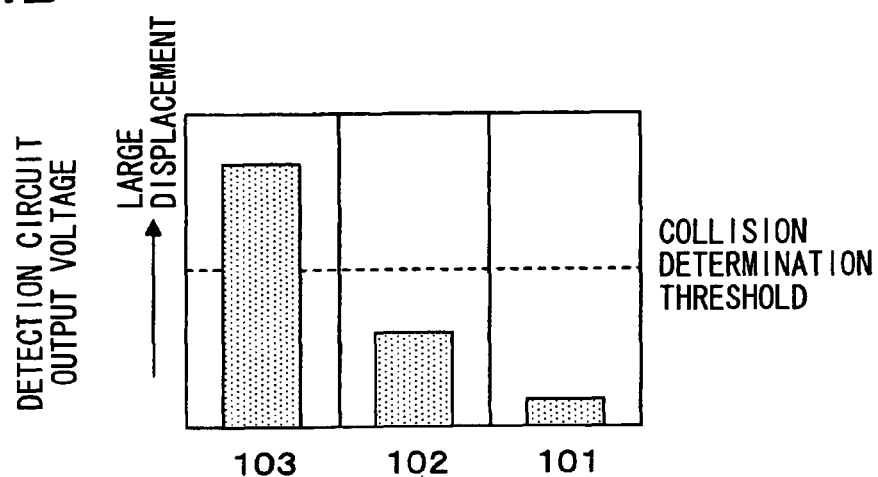
Figure 34C:
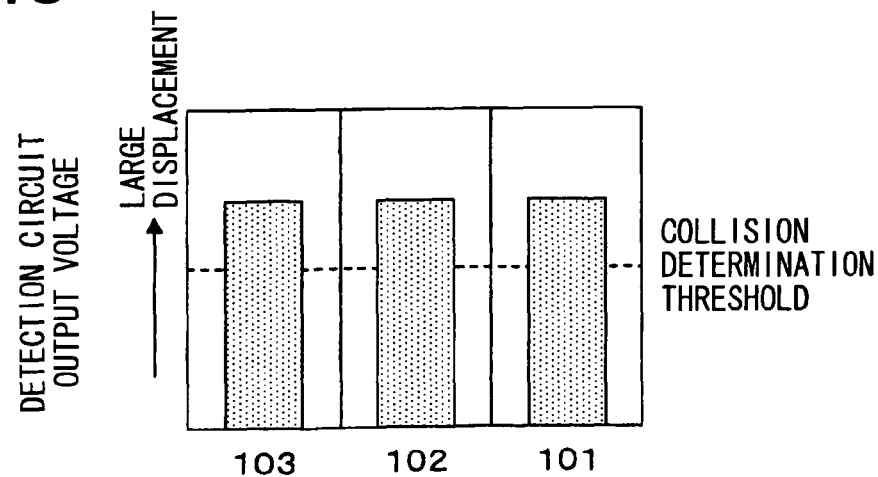

Here, in this embodiment, there are arranged three first coil members 501 to 503. The mode of collision includes a case where an electric pole collides with a vehicle and a case where a vehicle or a building collides with a vehicle. This mode of collision will be described with reference to FIG. 33A to FIG. 34C. FIGS. 33A to 33C are diagrams relating to a collision object and its position. FIGS. 34A to 34C are graphs to show the output voltage from the detection circuit 40.

FIG. 33A shows a case where an electric pole collides with the central portion in the front and rear direction of the vehicle of the side door 1. At this time, the separate distance between the first coil member 502 arranged at the central portion of the vehicle and the reinforcing member 13 is decreased. FIG. 33B shows a case where the electric pole collides with the rear portion of the vehicle of the side door 1. At this time, the separate distance between the first coil member 503 arranged at the rear portion of the vehicle and the reinforcing member 13 is decreased. FIG. 33C shows a case where a vehicle collides with the side door 1. At this time, the distances between all of the first coil members 501 to 503 and the reinforcing member 13 are decreased.

In these modes, the maximum amplitude of the output voltage from the detection circuit 40 is shown in FIG. 34A to FIG. 34C. In other words, in the mode shown in FIG. 33A, as shown in FIG. 34A, only the output voltage when the first coil member 502 at the central portion is connected to the oscillation circuit 30 exceeds the collision determination threshold value Th. Moreover, in the mode shown in FIG. 33B, as shown in FIG. 34B, only the output voltage when the first coil member 503 at the rear portion of the vehicle is connected to the oscillation circuit 30 exceeds the collision determination threshold value Th. Further, in the mode shown in FIG. 33C, as shown in FIG. 34C, the output voltages when the first coil members 501 to 503 are connected to the oscillation circuit 30 exceed the collision determination threshold value Th, respectively.

In this manner, the collision determination section 50 can determine that an object collides with the entire outer plate 11 or that the object collides with a portion of the outer plate 11 by determining that when which of the first coil members 501 to 503 is connected to the oscillation circuit 30, the output voltage of the detection circuit 40 exceeds the collision determination threshold value Th. In short, the collision determination section 50 can determine the kind of the collision object.

Further, the collision determination section 50 can determine a position where the an object collides in the front and rear direction of the outer plate 11 by determining that when which of the first coil members 501 to 503 is connected to the oscillation circuit 30, the output voltage of the detection circuit 40 exceeds the collision determination threshold value Th. Still further, the collision determination section 50 can compute the distribution of deformation in the front and rear direction in the reinforcing member 13.

The determination result acquired in this manner can be used for activating a suitable passenger protection device. For example, in a vehicle having different passenger protection devices for a case where a vehicle collides with the vehicle and for a case where an electric pole collides with the vehicle, the passenger protection device can be activated according to the collision object. Moreover, in the case of local collision, the passenger protection device capable of surely protecting a passenger in that position can be activated. For example, in the case where a plurality of passenger protection devices such as air bags are arranged in the front and rear direction of the vehicle of the side door 1, the air bag arranged at the position of collision can be developed. In this manner, only necessary passenger protection device can be activated.

Figure 35:
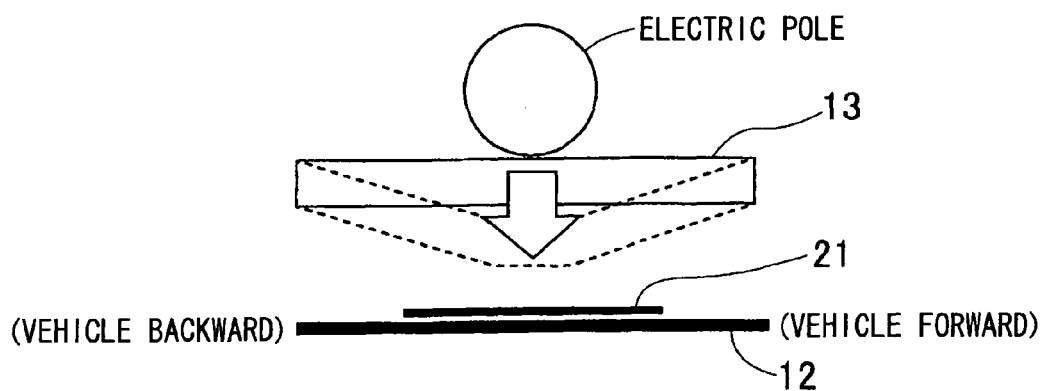
FIG. 35 is a diagram to show a case when only one first coil is arranged.
Figure 36:
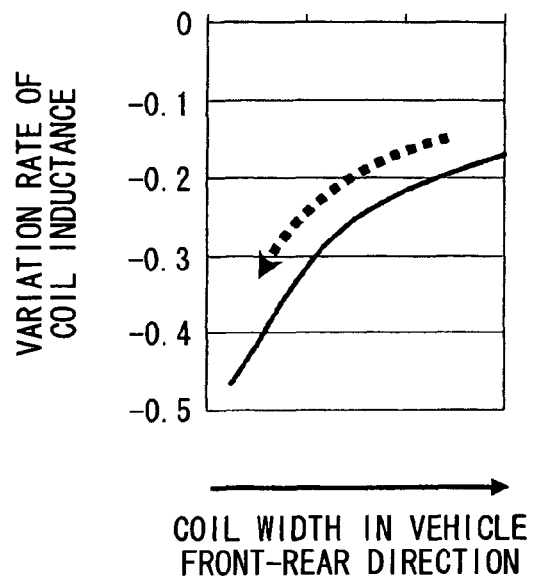
FIG. 36 is a graph to show how the rate of a variation in the inductance of a coil is varied when the width in the front and rear direction of the vehicle of the coil is varied.

Here, in this embodiment, three first coil members 501 to 503 are arranged in the front and rear direction of the vehicle. With this, it is clear that collision can be detected in a wide range. Further, by arranging the plurality of first coil members, it is also possible to detect collision with high accuracy. This will be described with reference to FIG. 35 and FIG. 36. FIG. 35 is a diagram to show a case in which only one first coil member is arranged. FIG. 36 is a graph to show how the rate of a variation in the inductance Ls of the coil 21 is varied when the width in the front and rear direction of the vehicle of the coil is varied. Here, in FIG. 35, a case where an electric pole collides with the side door 1 will be described by way of example.

As shown in FIG. 36, it can be found that as the width in the front and rear direction of the vehicle of the coil 21 is smaller, the rate of a variation in the inductance Ls of the coil 21 is larger. That the rate of a variation in the inductance Ls of the coil 21 is large means that the inductance Ls of the coil 21 is varied by a small variation in the separate distance. In other words, as the rate of a variation in the inductance Ls of the coil 21 is large, the sensitivity of detection of collision of the coil 21 is better. In short, as the width in the front and rear direction of the vehicle is smaller, the sensitivity of detection of collision of the coil 21 is better. As a result, by increasing the width in the front and rear direction of the vehicle of the coil 21, the number of coils 21 can be decreased, but the sensitivity of detection of collision of the coil 21 is decreased by that much. In short, according to the above-mentioned embodiment, by providing the plurality of first coil members 501 to 503, the collision can be detected with high accuracy.

Tenth Embodiment

Next, a detection device for side collision of a vehicle of a tenth embodiment will be described with reference to FIG. 37 to FIG. 39. The tenth embodiment is a mode in which the coil 21 is fixed directly to the inner plate 12 and which includes: a first coil members 502 for detecting a variation in the separate distance between the coil 21 and the reinforcing member 13; and second coil members 602, 702 for detecting a variation in the separate distance between the coil 21 and the outer plate 11. The constructions of the second coil members 602, 702 are the same as that of the first coil member 501 in the ninth embodiment.

Figure 37:
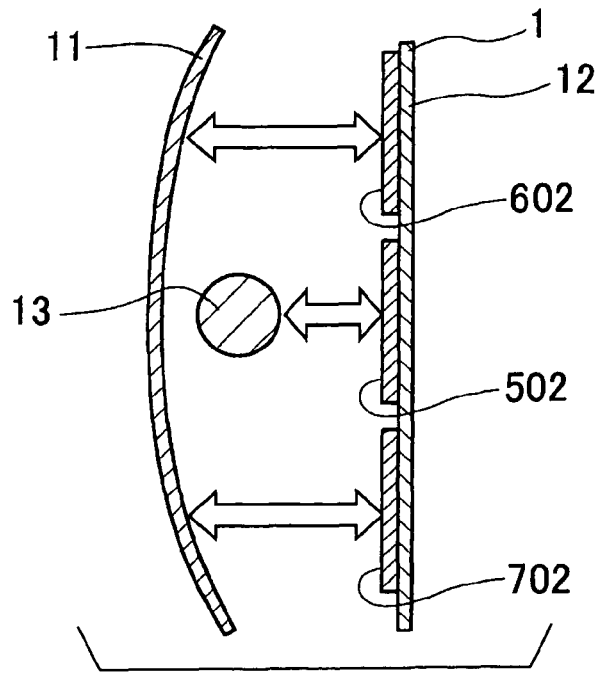
FIG. 37 is a section view when a side door in a tenth embodiment is cut vertically to the left and right direction of the vehicle.

Here, FIG. 37 is a section view when the side door 1 is cut vertically to the left and right direction of the vehicle. FIG. 38 is a perspective view when the side door 1 is viewed from inside the vehicle compartment. In FIG. 38, the right side indicates the front side of the vehicle, and the left side indicates the rear side of the vehicle. Here, the coil 21 is positioned closer to the outside of the vehicle than the inner plate 12, but the coil 21 is shown by a solid line for the sake of clarity. FIG. 39 is a diagram to schematically show the determination processing of the collision determination section 50.

Figure 38:
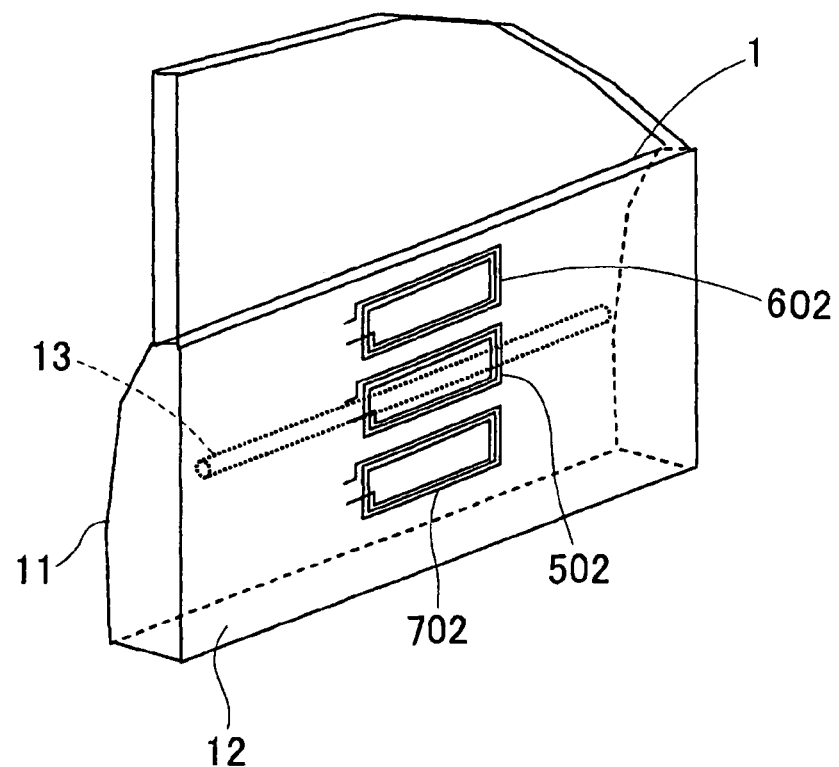
FIG. 38 is a perspective view when the side door in the tenth embodiment is viewed from inside a vehicle compartment.
Figure 39:
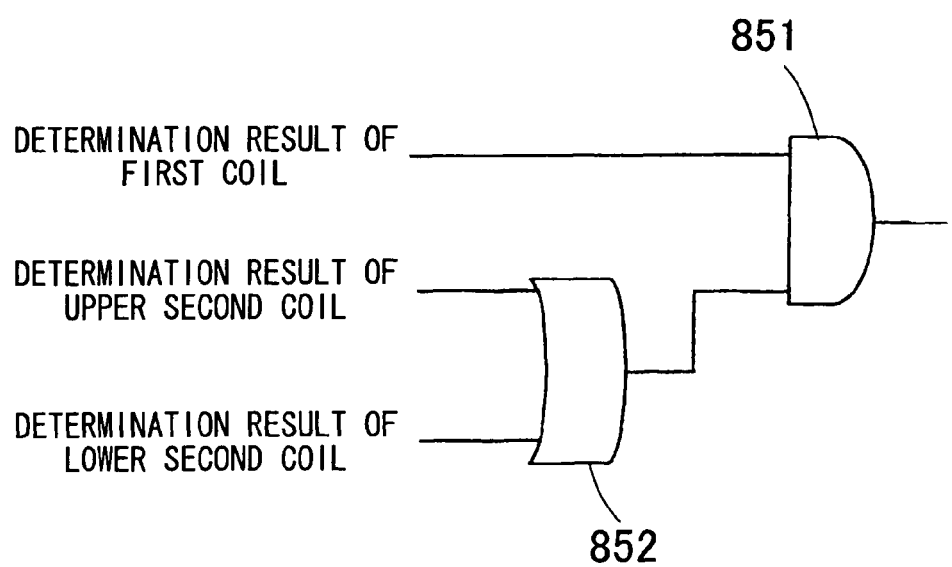
FIG. 39 is a diagram to schematically show a determination processing of a collision determination section in the tenth embodiment.

As shown in FIG. 37 and FIG. 38, the first coil member 502 is fixed to the inner plate 12 so as to be opposite to the reinforcing member 13 of the inner plate 12. The first coil member 502 is arranged in the central portion in the front and rear direction of the vehicle. The upper second coil member 602 is arranged on the inner plate 12 so as to be opposite to the outer plate 11 and in the up direction of the vehicle of the first coil member 502. In other words, the upper second coil member 602 is arranged at the position that is the same position as the first coil member 502 in the front and rear direction of the vehicle and which is a different position from the first coil member 502 in the up and down direction of the vehicle. The lower second coil member 702 is arranged on the inner plate so as to be opposite to the outer plate 11 and in the down direction of the vehicle of the first coil member 502. In other words, the lower second coil member 702 is arranged at the position that is the same position as the first coil member 502 and the upper second coil member 602 in the front and rear direction of the vehicle and which is a different position from the first coil member 502 and the upper second coil member 602 in the up and down direction of the vehicle.

Here, in the tenth embodiment, not only the reinforcing member 13 but also the outer plate 11 needs to be made of a ferromagnetic material. In other words, in this embodiment, the reinforcing member 13 corresponds to a first member to be detected in the present invention, and the outer plate 11 corresponds to a second member to be detected in the present invention.

The upper second coil member 602 and the lower second coil member 702 are arranged opposite to the outer plate 11. Thus, when the outer plate 11 is deformed so as to come near to the inner plate 12, the inductance of the upper second coil member 602 or the lower second coil member 702 is varied so as to be smaller. This variation behavior is a little different from but is substantially same as the variation behavior of the first coil member 502. Thus, the inductances of the upper second coil member 602 and the lower second coil member 702 are those corresponding to the separate distances between the coil members 602, 702 and the portions opposite to them of the outer plate 11, respectively.

In the collision determination section 50, the determination result based on the output signal of the first coil member 502 is outputted to an AND circuit 51, and the determination results based on the output signals of the upper second coil member 602 and the lower second coil member 702 are outputted to an AND circuit 851 via an OR circuit 852. Here, when the maximum amplitude of the output voltage exceeds the collision determination threshold value Th, the determination results become an ON signal, whereas when the maximum amplitude of the output voltage does not exceed the collision determination threshold value Th, the determination results become an OFF signal.

In other words, when the output signal of the first coil member 502 exceeds the collision determination threshold value Th and at least one of the output signals of the upper second coil member 602 and the lower second coil member 702 exceeds the collision determination threshold value Th, the AND circuit 851 outputs a signal. At this time, it is determined that something collides with the outer plate 11. Thus, the first coil member 502 functions as a main sensor, and the upper second coil member 602 and the lower second coil member 702 function as safety sensors.

A part that is first deformed when an object collides with the outer plate 11 is the outer plate 11. Subsequently, when the deformation of the outer plate 11 becomes larger, the reinforcing member 13 is deformed. In other words, if a collision object is a vehicle or an electric pole, when the collision is detected by the first coil member 502, the collision is always detected by the upper second coil member 602 and the lower second coil member 702. Thus, when it is determined that the first coil member 502 and either of the second coil members 602 and 702 detect the collision, it can be said that something surely collides with the vehicle. On the other hand, even if the output voltage of the first coil member 502 is made large by noises or the like, if the output voltages of the second coil members 602 and 702 are not made large, it is not determined as the whole that something collides with the vehicle. In this manner, according to the construction of the tenth embodiment, it is possible to prevent the erroneous detection of collision from being caused by noises or the like.

Eleventh Embodiment

A detection device for side collision of a vehicle of an eleventh embodiment will be described with reference to FIG. 40. The eleventh embodiment is a mode in which the coil 21 is fixed directly to the inner plate 12 and in which three first coil members 501 to 503, each of which detects a variation in the separate distance between the coil 21 and the reinforcing member 13, are arranged in the front and rear direction of the vehicle and in which three second coil members 601 to 603 and three second coil members 701 to 703, each of which detects a variation in the separate distance between the coil 21 and the outer plate 11, are arranged respectively in the front and rear direction of the vehicle. In other words, the detection device for side collision of a vehicle of the eleventh embodiment is a mode having both of the ninth embodiment and the tenth embodiment. Here, the construction of each of the second coil members 601 to 603 and 701 to 703 is the same as that of the first coil member 501 in the ninth embodiment.

Figure 40:
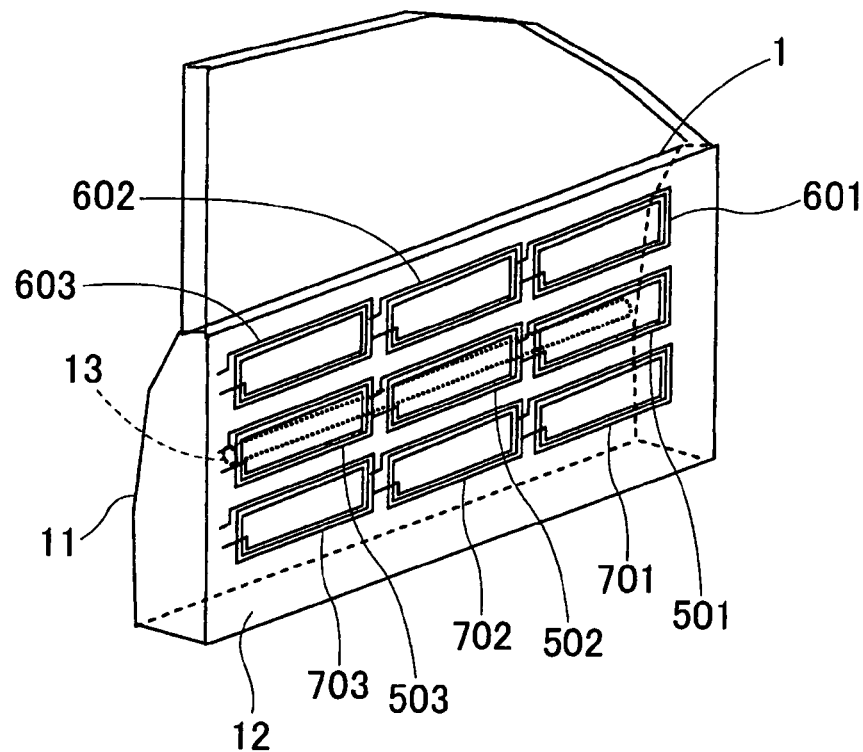
FIG. 40 is a perspective view when a side door in an eleventh embodiment is viewed from inside a vehicle compartment.

Here, FIG. 40 is a perspective view when the side door 1 is viewed from inside the vehicle compartment. In FIG. 40, the right side indicates the front side of the vehicle, whereas the left side indicates the rear side of the vehicle. Here, the coil 21 is positioned closer to the outside of the vehicle than the inner plate 12 but is shown by a solid line for the sake of clarity.

As shown in FIG. 40, the first coil members 501 to 503 are arranged on the inner plate 12 so as to be opposite to the reinforcing member 13 and are fixed respectively at different positions in the front and rear direction of the vehicle. Further, the upper second coil members 601 to 603 are arranged on the inner plate 12 so as to be opposite to the outer plate 11 and are arranged at positions that are the same positions as the respective first coil members 501 to 503 in the front and rear direction of the vehicle and that are different positions from the respective first members 501 to 503 in the up direction of the vehicle. Still further, the lower the second coil members 701 to 703 are arranged on the inner plate 12 so as to be opposite to the outer plate 11 and are arranged at positions that are the same positions as the respective first coil members 501 to 503 in the front and rear direction of the vehicle and that are different positions from the respective first coil members 501 to 503 in the down direction of the vehicle.

In this case, each of the group of coil members 501, 601, and 701, the group of coil members 502, 602, and 702, and the group of coil members 503, 603, and 703 corresponds to the group of coil members of the above-mentioned tenth embodiment, each group being arranged at the same positions in the up and down direction of the vehicle. In other words, when the first coil member 501 determines that collision occurs and at least one of the second coil members 601, 701 determines that collision occurs, the collision determination section 50 determines that an object collides with a portion in the front direction of the vehicle of the side door 11. Further, when the first coil member 502 determines that collision occurs and at least one of the second coil members 602, 702 determines that collision occurs, the collision determination section 50 determines that an object collides with a central portion in the front and rear direction of the vehicle of the side door 11. Still further, when the first coil member 503 determines that collision occurs and at least one of the second coil members 603, 703 determines that collision occurs, the collision determination section 50 determines that an object collides with a portion in the rear direction of the vehicle of the side door 11. In this manner, according to the eleventh embodiment, the collision can be detected in a wide range with high accuracy.

In the respective embodiments described above, the first coil members 501 to 503 are fixed to the inner plate 12. In addition to this, the first coil members 501 to 503 may be fixed to the reinforcing member 13. In this case, the member to be detected by the first coil members 501 to 503 is the inner plate 12, so that the inner plate 12 needs to be made of a ferromagnetic material. On the other hand, the reinforcing member 13 does not need to be made of the ferromagnetic material. Even in this case, the collision can be detected in the same way as described above.

Moreover, the second coil members 601 to 603 and 701 to 703 are fixed to the inner plate 12 but may be fixed to the outer plate 11. In this case, the member to be detected by the second coil members 601 to 603 and 701 to 703 is the inner plate 12, so that the inner plate 12 needs to be made of the ferromagnetic material. On the other hand, the outer plate 11 does not need to be made of the ferromagnetic material. Even in this case, the collision can be detected in the same way as described above.

Twelfth Embodiment

Figure 41:
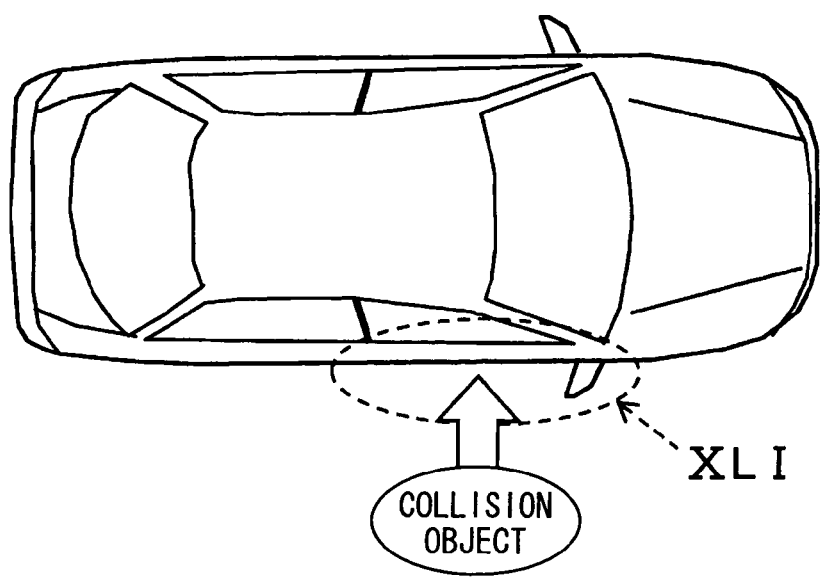
FIG. 41 is a diagram to show the whole of a vehicle.
Figure 42A:
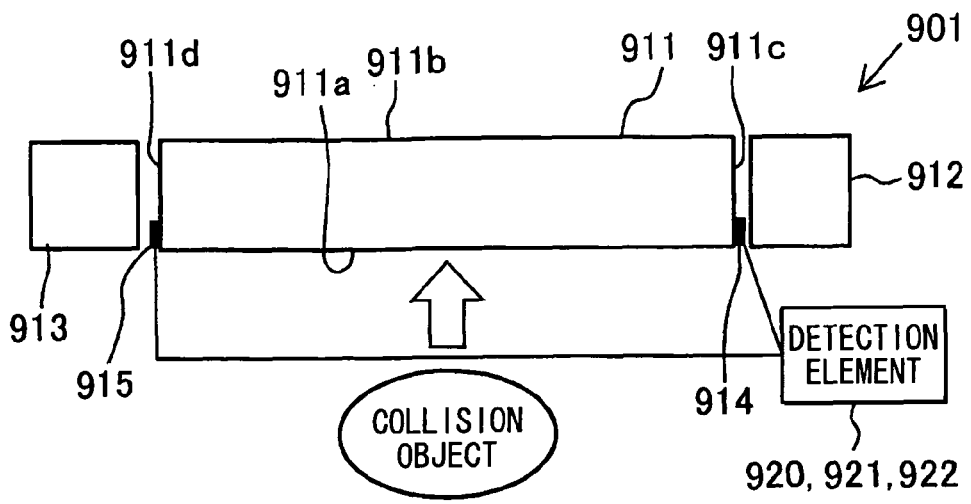
FIGS. 42A and 42B are section views when a portion XLI in FIG. 41 is horizontally cut and views to show the states before and after the collision of a collision object with an outer plate.
Figure 42B:
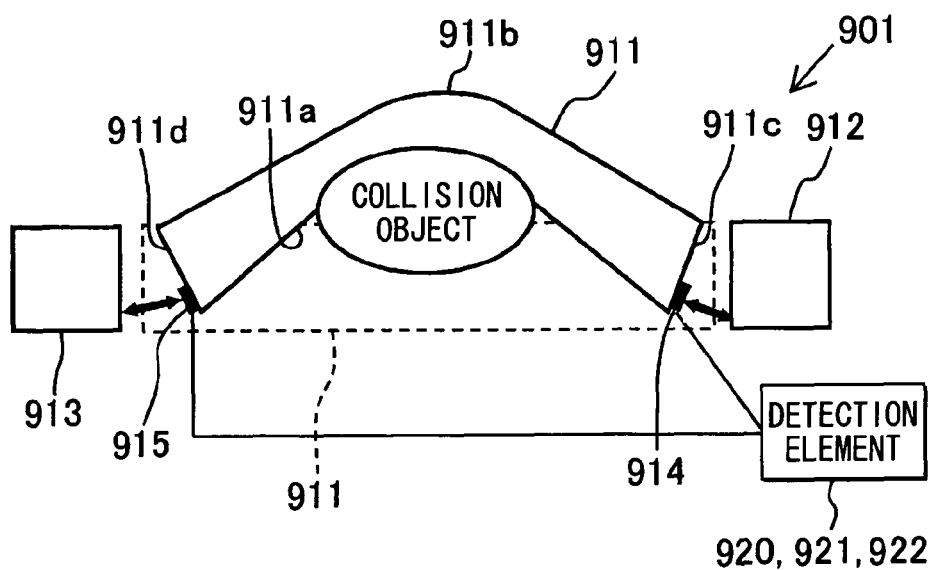
Figure 43:
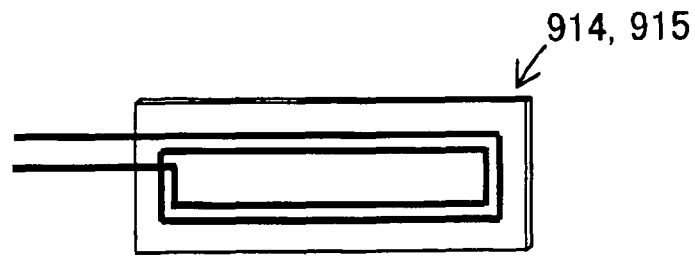
FIG. 43 is a diagram to show a planar coil of a gap detection sensor.
Figure 44:
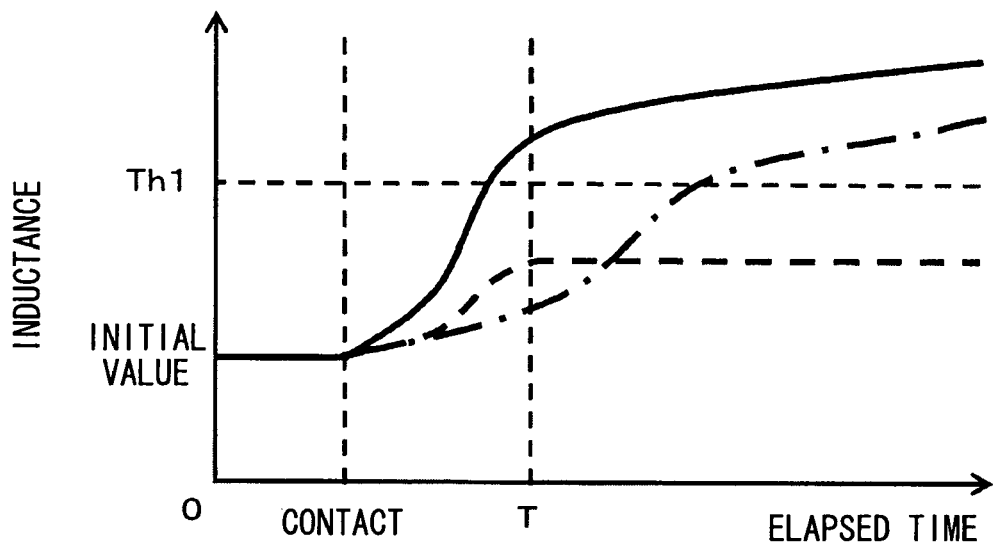
FIG. 44 is a graph to show a variation in the inductance with respect to the time that elapses after the collision object is put into contact with the side face of the vehicle.
Figure 45:
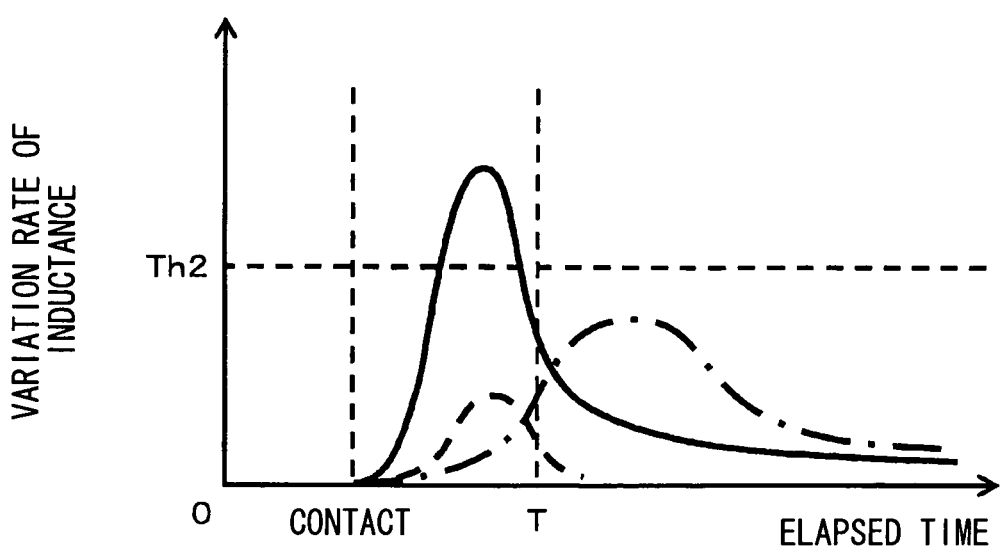
FIG. 45 is a graph to show the rate of the variation in the inductance (differential value of the inductance) with respect to the time that elapses after the collision object is put into contact with the side face of the vehicle.

The construction of a detection device 901 for side collision of a vehicle of this embodiment will be described with reference to FIG. 41 to FIG. 45. Here, in this embodiment, a case in which an object colliding with the side face of the vehicle (hereinafter referred to as "collision object") is a circular cylindrical slender body such as an electric pole will be described by way of example. FIG. 41 is a view when a vehicle is viewed from the top. FIGS. 42A and 42B are sectional views when a portion XLI in FIG. 41 is horizontally cut and show states before and after a collision object colliding with an outer plate 911a, respectively. Specifically, FIG. 42A is a view to show a state before the collision object colliding with the outer plate 911a, whereas FIG. 42B is a view to show a state after the collision object having collided with the outer plate 911a. FIG. 43 is a diagram to show a planar coil that is a gap detection sensor 914 (915). FIG. 44 is a graph to show a variation in the inductance with respect to the time that elapses after the collision object is put into contact with the side face of the vehicle. FIG. 45 is a graph to show the rate of the variation in the inductance L (differential value of the inductance L) with respect to the time that elapses after the collision object is put into contact with the side face of the vehicle.

As shown in FIG. 41 and FIGS. 42A and 42B, the vehicle has side doors arranged on both sides of the vehicle and a vehicle body member that is a rigid member for supporting the side doors. Here, a portion (portion XLI in FIG. 41) including a right front side door 911 of the vehicle and a first pillar 912 and a second pillar 913, which are arranged as the vehicle body members on the front and rear sides of the vehicle of the side door 911, will be described.

The side door 911, as shown in FIGS. 42A and 42B, has: an outer plate 911a positioned outside the vehicle; an inner plate 911b arranged inside the vehicle compartment so as to be opposite to the outer plate 911a; a vehicle front end face 911c that connects an end in the front direction of the vehicle of the outer plate 911a with an end in the front direction of the vehicle of the inner plate 911b; and a vehicle rear end face 911d that connects an end in the rear direction of the vehicle of the outer plate 911a with an end in the rear direction of the vehicle of the inner plate 911b. In other words, the section when the side door 911 is horizontally cut is shaped like a rectangle elongated in the front and rear direction of the vehicle.

The first pillar 912 is a rigid member that is shaped like a pillar and which supports the side door 911 in such a way that the side door can turn to the outside of the vehicle. In other words, when the side door 911 is turned to the outside of the vehicle around a portion to be coupled to the first pillar 912, the side door 911 is brought into an opened state. This first pillar 912 is arranged at a position in the front direction of the vehicle of the side door 911. Specifically, in a state where the side door 911 is closed, the first pillar 912 is arranged opposite to the vehicle front end face 911c of the side door 911 via a small gap. At this time, the face in the rear direction of the vehicle of the first pillar 912 and the vehicle front end face 911c of the side door 911 are positioned nearly parallel to each other.

The second pillar 913 is a rigid member that is shaped like a pillar. This second pillar 913 supports a right rear side door in such a way that the right rear side door can turn to the outside of the vehicle. This second pillar 913 is arranged at a position in the rear direction of the vehicle of the side door 911. Specifically, in a state where the side door 911 is closed, the second pillar 913 is arranged opposite to the vehicle rear end face 911d of the side door 911 via a small gap. At this time, the face in the front direction of the vehicle of the second pillar 913 and the vehicle rear end face 911d of the side door 911 are positioned nearly parallel to each other.

As shown in FIG. 42B, when a collision object collides with a portion positioned nearly in the center in the front and rear direction of the vehicle of the side door 911, the outer plate 911a is bent and deformed inside the vehicle compartment and the inner plate 911b is bent and deformed inside the vehicle compartment nearly in the same manner as the outer plate 911a. The side door 911 is deformed in such a way that in the vehicle front end face 911c, a door outside portion positioned outside in the left and right direction of the vehicle is more separate from the first pillar 912 than a door inside portion positioned inside in the left and right direction of the vehicle. Further, the side door 911 is deformed in such a way that in the vehicle rear end face 911d, a door outside portion positioned outside in the left and right direction of the vehicle is more separate from the second pillar 913 than a door inside portion positioned inside in the left and right direction of the vehicle.

A first gap detection sensor 914 is fixed to the vehicle front end face 911c of the side door 911 and detects the gap between the vehicle front end face 911c of the side door 911 and the first pillar 912. Specifically, the first gap detection sensor 914 is arranged at the door outside portion that is positioned closer to the outside in the left and right direction of the vehicle than the central portion in the left and right direction of the vehicle of the vehicle front end face 911c. In short, the first gap detection sensor 914 detects the gap between this door outside portion and an opposite portion opposite to the door outside portion of the first pillar 912.

A second gap detection sensor 915 is fixed to the vehicle rear end face 911d of the side door 911 and detects the gap between the vehicle rear end face 911d of the side door 911 and the second pillar 913. Specifically, the second gap detection sensor 915 is arranged at a door outside portion that is positioned closer to the outside in the left and right direction of the vehicle than the central portion in the left and right direction of the vehicle of the vehicle rear end face 911d. In short, the second gap detection sensor 915 detects the gap between this door outside portion and an opposite portion opposite to the door outside portion of the second pillar 913.

Each of these gap detection sensors 914, 915 has a planar coil, for example, as shown in FIG. 43. When the separate distance between the gap detection sensor 914 (915) having this planar coil and the first pillar 12 (second pillar 913) opposite to the sensor is increased, the magnetic flux produced in the planar coil is increased by the effect of the magnetic field produced by an eddy current interlinking the planar coil. In other words, when the distances between the side door 911 having the gap detection sensors 914, 915 fixed thereto and the first and second pillars 912, 913 are increased, the inductances L of the planar coils are increased. Thus, when the gap between the vehicle front end face 911c of the side door 911 and the first pillar 912 is increased, the inductance L of the planar coil of the first gap detection sensor 914 is increased. Further, when the gap between the vehicle rear end face 911d of the side door 911 and the second pillar 913 is increased, the inductance L of the planar coil of the second gap detection sensor 915 is increased. The relationship between both (inductance L and gap) is a nearly linear relationship. The responsivity of detection of the gap can be extremely increased by using this planar coil.

Here, the inductance L of the planar coil of the gap detection sensor 914 (915) can be detected by a signal that is outputted from an LC circuit constructed of the planar coil and the capacitor when a signal of the oscillation circuit is outputted to the LC circuit. Of course, any other method can be used if the method can detect the inductance L of the planar coil of the gap detection sensor 914 (915).

Next, the behavior of the inductance L of the planar coil will be described according to the type in which the collision object collides with the side face of the vehicle with reference to FIG. 44 and FIG. 45. FIG. 44 shows a variation in the inductance L with respect to the time that elapses after the collision object is put into contact with the side face of the vehicle, and FIG. 45 shows the rate of the variation in the inductance (differential value of the inductance L) with respect to the time that elapses after the collision object is put into contact with the side face of the vehicle.

Here, a first collision mode is assumed to be collision that is large in a collision load and in a collision speed. A second collision mode is assumed to be collision that is small in the collision load and which is large in the collision speed. A third collision mode is assumed to be collision that is large in the collision load and which is small in the collision speed. In FIG. 44 and FIG. 45, the behavior of the first collision mode is shown by a solid line, and the behavior of the second collision mode is shown by a broken line, and the behavior of the third collision mode is shown by a single dot and dash line.

As shown in FIG. 44, in the case of the first collision mode, the inductance L rapidly increases and exceeds a first threshold value Th1 in the period of time in which a specified time T elapses after the collision object is put into contact with the side face of the vehicle. Further, as shown in FIG. 45, in the case of the first collision mode, the rate of the variation (differential value) in the inductance L exceeds a second threshold value Th2 after the collision object is put into contact with the side face of the vehicle.

Considering this behavior, in the case where the first collision mode occurs, there is brought about the state where the outer plate 911*a* and the inner plate 911*b* of the side door 911 are deformed inside the vehicle compartment. Thus, in this case, an occupant protection device needs to be activated to protect an occupant.

In the case of the second collision mode, as shown in FIG. 44, the inductance L increases immediately after the collision object is put into contact with the side face of the vehicle. However, even when the inductance L reaches a maximum value, the maximum value does not exceed the first threshold value Th1. Further, as shown in FIG. 45, in the case of the second collision mode, even when the rate of the variation in the inductance L reaches a peak value after the collision object is put into contact with the side face of the vehicle, the peak value does not exceed the second threshold value Th2. In this case, the occupant protection device does not need to be activated.

In the case of the third collision mode, as shown in FIG. 44, the inductance L increases gently after the collision object is put into contact with the side face of the vehicle and then exceeds the first threshold value Th1. However, the inductance L does not exceeds the first threshold value Th1 in the period of time in which the specified time T elapses after the collision object is put into contact with the side face of the vehicle. Further, as shown in FIG. 45, in the case of the third collision mode, even when the rate of a variation (differential value) in the inductance L reaches a peak value after the collision object is put into contact with the side face of the vehicle, the peak value does not exceed the second threshold value Th2.

Considering this behavior, in the case where the third collision mode occurs, it can be thought that there is brought about the state in which although the outer plate 911*a* of the side door 911 is deformed inside the vehicle compartment, the inner plate 911*b* is not much deformed inside the vehicle compartment. In this case, the occupant protection device does not need to be activated.

In short, it can be found that it is sufficient for the determination section 920 to differentiate the first collision mode from the other collision modes on the basis of the signal outputted from the gap detection sensors 914, 915. Here, it is sufficient to apply either of the following types of determination sections as the determination section 920.

A first determination section 921 determines whether or not the inductance L itself exceeds the first threshold value Th1 and determines whether or not the rate of a variation (differential value) in the inductance L exceeds the second threshold value Th2. When the inductance L itself exceeds the first threshold value Th1 and the rate of a variation (differential value) in the inductance L exceeds the second threshold value Th2, the first determination section 921 determines that the collision object collides with the side face of the vehicle. In other words, the first determination section 921 can differentiate the first collision mode from the other collision modes, the first collision mode and the other collision having been described in FIG. 44 and FIG. 45.

A second determination section 922 determines whether or not the inductance L itself exceeds the first threshold value Th1 in the period of time in which the specified time T elapses after the collision object is put into contact with the side face of the vehicle. With this, the second determination section 922 can differentiate the first collision mode in FIG. 44 from the other collision modes. In this case, the second determination section 922 needs to determine the timing when the collision object is put into contact with the side face of the vehicle and that the inductance L exceeds the first threshold value Th1. The timing when the collision object is put into contact with the side face of the vehicle can be determined firstly as the timing when the inductances L detected by the gap detection sensors 914, 915 start to vary. However, in this case, to prevent the timing when the collision object is put into contact with the side face of the vehicle from being erroneously determined because of noises, as shown by the respective behaviors in FIG. 44, it is sufficient to determine that on the condition that the inductance L increases continuously, the timing when the inductance L starts to increases is the timing when the collision object is put into contact with the side face of the vehicle. In addition, a contact sensor can be also fixed to the side door 911. However, a separate sensor needs to be disposed in this case, so that the use of the gap sensors 914, 915 can produce the effect of preventing an increase in the number of parts.

In addition to the above-mentioned first and second determination sections 921, 922, depending on the cases, to determine only whether or not the inductance L exceeds the first threshold value Th1 is also applicable. However, in the case of using only this determination, the first collision mode can not be differentiated from the third collision mode, so that it can be determined that the occupant protection device needs to be activated also for the third collision mode. However, this determination produces the effect of being able to eliminate the activation of the occupant protection device when the second collision mode occurs.

In this regard, in the above-mentioned embodiment, the gap detection sensors 914, 915 are arranged on the vehicle front end face 911*c* and the vehicle rear end face 911*d* of the side door 911 and detect the gap between the side door 911 and the first pillar 912 and the gap between the side door 911 and the second pillar 913, respectively. In this manner, by determining the side collision on the basis of the gaps at both end portions in the front and rear direction of the vehicle of the side door 911, the determination of the side collision can be made with more accuracy. However, the determination of the side collision can be also made on the basis of only one of the gaps at both end portions in the front and rear direction of the vehicle of the side door 911. In this case, in particular, it is recommendable to make the side collision determination on the basis of the gap between the second pillar 913, which does not support the side door 911, and the side door 911. When the collision object collides with the side door 911, there is a high possibility that the gap between the second pillar 913, which does not support the side door 911, and the side door 911 will be greatly varied as compared with the gap between the first pillar gap 912 and the side door 911. Thus, by making the determination of the side collision on the basis of the gap between the second pillar 912 and the side door 911, which can be greatly varied, it is possible to determine that the collision object surely collides with the side face of the vehicle.

Further, the gap detection sensors 914, 915 are arranged on the side door 911, but the gap detection sensors 914, 915 may be arranged on the first pillar 912 or the second pillar 913. Still further, the gap detection sensors 914, 915 are constructed so as to have the planar coil, but the constructions of the gap sensors 914, 915 are not limited to this construction. Any other sensor capable of detecting the gap between the side door 911 and the pillars 912, 913 can be employed as the gap detection sensors 914, 915. However, when the sensor having the planar coil is employed, the sensor can produce high response performance.

The above-mentioned disclosure can have the following aspects.

A first aspect is an aspect that detects a separate distance between a reinforcing member and an inner plate or a member fixed to the inner plate. A detection device for side collision of a vehicle is characterized by including: an outer plate of a side door mounted in the vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the inner plate and a member fixed to the inner plate; a sensor detecting a separate distance between the detection subject member and the reinforcing member; and a determination element determining that the vehicle collides with an object based on an output value of the sensor.

In this manner, it is determined on the basis of the separate distance between the inner plate and the reinforcing member or the separate distance between the member fixed to the inner plate and the reinforcing member that the vehicle collides with the other object. Thus, it is possible to make a correct collision determination responsive to the degree of seriousness of the collision.

A second aspect is an aspect in which a coil is fixed to a reinforcing member. A detection device for side collision of a vehicle is characterized by including: an outer plate of a side door mounted in the vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the inner plate and an inner plate-shaped member fixed to the inner plate, and having a portion made of metal or ferromagnetic material; a coil fixed to the reinforcing member, spaced apart from the detection subject member, producing a magnetic field, and having an inductance variable in accordance with a separate distance between the coil and the detection subject member; and a determination element determining that the vehicle collides with an object based on the inductance of the coil.

In the above-mentioned detection device for side collision of a vehicle, the coil is fixed to the reinforcing member and is arranged separately from the member to be detected that is the metal body or the ferromagnetic body. The coil produces the magnetic field in such a way that the magnetic field reaches the member to be detected (for example, in a direction in which the member to be detected and the reinforcing member are opposite to each other). When the object collides with the outer plate to deform the reinforcing member inside the vehicle compartment to move the reinforcing member in such a way that the reinforcing member comes nearer to the inner plate, this movement of the reinforcing member makes the coil produce the magnetic field to thereby make an eddy current flow through the inner plate or the inner plate-shaped member, which is the member to be detected. Alternatively, when the eddy current has been produced before the movement of the reinforcing member, the quantity of the eddy current is varied (increased) by the movement of the reinforcing member. Since the eddy current is produced or increased to produce or increase the magnetic field in this manner, the inductance of the coil is varied so as to decrease. In this manner, the inductance of the coil is varied according to the separate distance between the member to be detected and the coil.

In other words, the range of the magnetic field produced by the coil becomes a range in which the side collision can be detected. In short, the range in which the side collision can be detected by the above-mentioned detection device for side collision of a vehicle can be made wider as compared with the case of the sensor as described in the patent document 1. Even when the range in which the side collision can be detected is made wider, it is sufficient to arrange one or a small number of coils. As a result, it is possible to reduce the space in which the coils are arranged and hence to easily arrange the coils.

Further, the side collision is detected on the basis of the inductance of the coil that varies according to the separate distance between the coil fixed to the reinforcing member and the member to be detected. Thus, even when the outer plate is deformed by the impact of collision, if the impact is such a small level of impact that does not deform the reinforcing member, the separate distance between the coil and the member to be detected is not varied. Thus, it is possible to determine that the side collision does not occur and hence to prevent a passenger protection device from being activated. On the other hand, when such a large level of impact that deforms the reinforcing member is applied to the vehicle to thereby vary the separate distance between the coil and the member to be detected, it can be thought that there is brought about a state in which a passenger needs to be protected. In this case, since the inductance of the coil is surely varied, the side collision can be detected.

As an alternative aspect, the detection device for side collision of a vehicle may further include a shielding member that is made of metal or a ferromagnetic material and which is interposed between the reinforcing member and the coil.

The inductance of the coil undergoes the effect produced by the metal or the ferromagnetic material disposed near the coil. However, when the coil is fixed directly to the reinforcing member, there is a possibility that the inductance of the coil at an early stage in which the coil is fixed to the reinforcing member will be varied by a difference in the shape of the reinforcing member and by a variation in the position where the coil is fixed to the reinforcing member (a variation in the separate distance between the coil and the reinforcing member when the coil is fixed to the reinforcing member). Thus, by interposing the shielding member between the reinforcing member and the coil, the variation in the inductance at the early stage can be reduced. That is, factors of the separate distance between the coil and the shielding member and the state in which the coil is fixed to the shielding member or the shape of the shielding member can be easily adjusted, so that the variation in the inductance at the early stage, which is easily produced when the coil and the shielding member are mounted in the vehicle, can be reduced by previously adjusting these factors. Here, when the shielding member and the coil are formed in the shape of a plane, they can be easily mounted in the door of the vehicle which is narrow in width. In this regard, the shape of a plane means a shape that can be assumed to be substantially a plane and, needless to say, does not mean a completely plane. For example, a shape having slight unevenness, a small number of projections, a through hole, and the like can be said to be the shape of a plane.

Further, when the above-mentioned detection device for side collision of a vehicle includes the shielding member, it is preferable that the coil and the shielding member are fixed to each other or integrally formed. With this, the separate distance between the coil and the shielding member can be kept constant, so that the variation in the inductance of the coil at the early stage can be further reduced. Still further, by integrally forming both of the coil and the shielding member, the integrated member can be easily fixed to the reinforcing member.

Still further, it is preferable that the shielding member is formed in a shape larger than the outside shape of the coil and that the coil is fixed to the shielding member so as not to project from the outer edge of the shielding member, in other words, in such a way that the coil is arranged inside the outer edge of the shielding member when viewed in the axial direction of the coil. If the coil is fixed to the shielding member in a state in which the coil projects from the outer edge of the shielding member, there is a possibility that a variation in the inductance of the coil at the early stage will become large because of the effect of a portion projecting from the shielding member of the coil. Thus, as described above, by fixing the coil to the shielding member so as not to project from the outer edge of the shielding member, the variation in the inductance of the coil at the early stage can be more stably reduced.

Still further, as another alternative aspect, the inner plate may have a through hole formed therein, and the inner plate-shaped member may be fixed to the inner plate so as to close at least a portion of the through hole, and the member to be detected may be the inner plate-shaped member. In this regard, needless to say, the plate-shaped member does not need to be a completely plate-shaped member on the basis of the same discussion as has been made about the above-mentioned the shape of a plane.

It can be thought that the inner plate of the side door has a service hole formed therein, the service hole being formed for the purpose of mounting or adjusting a power window mechanism and a speaker, which are arranged in the side door 1, and for the purpose of mounting or adjusting a coil member 2 fixed to the reinforcing member 13. When the inner plate has the through hole such as the service hole formed therein, there is a case in which the through hole has an effect on a variation in the inductance of the coil. Alternatively, depending on the position of the through hole, there is a case in which it is not suitable to make the inner plate the member to be detected. Thus, in that case, the inner plate itself is not made the member to be detected, but it is suitable to make the inner plate-shaped member, which is a separate member fixed to the inner plate, the member to be detected. In other words, even if the inner plate has the service hole formed therein, the side collision can be surely detected.

Still further, as still another alternative aspect, the inner plate may be made of a resin module, and the member to be detected may be the inner plate-shaped member. For example, in the case where the inner plate is made of the resin module, the inner plate is not made of a ferromagnetic material and hence cannot be made the member to be detected. In this case, by making the inner plate-shaped member, which is made of the resin module and is fixed to the inner plate, the member to be detected, the side collision can be surely detected.

Still further, as still another alternative aspect, it is preferable that the member to be detected is the inner plate. In this case, the inner plate needs to have a portion made of metal or a ferromagnetic material. Generally, the inner plate is formed of iron or the like in many cases, so that the inner plate itself can be easily used as the member to be detected. Furthermore, the inner plate is usually made larger than the outside shape of the coil. In other words, the coil is opposite to the inner plate larger than the coil. Therefore, a variation in the inductance of the coil, which is caused by the coil coming near to the inner plate, is made large. In short, the sensitivity of detection of the side collision can be made better.

In contrast to this, the following aspect may be employed. That is, the member to be detected may be the inner plate-shaped member and may be formed in a shape larger than the outside shape of the coil. When the inner plate is not made of the metal and the ferromagnetic material or when the inner plate has the above-mentioned through hole such as the service hole formed therein, the inner plate-shaped member that is a member separate from the inner plate is made the member to be detected. In this case, when the inner plate-shaped member of the member to be detected is formed in a shape smaller than the outside shape of the coil, there is a possibility that the sensitivity of detection of side collision will be decreased. Thus, when the inner plate-shaped member is made the member to be detected, by making the size of the inner plate-shaped member larger than the outside shape of the coil, a variation in the inductance of the coil can be increased and hence the sensitivity of detection of the side collision can be madder better.

Still further, in the above-mentioned detection device for side collision of a vehicle, the coil is fixed to the reinforcing member. As described above, when the side collision requiring the protection of a passenger occurs, the reinforcing member is deformed. Since the coil is fixed to the reinforcing member, there is a possibility that the coil will be deformed by the deformation of the reinforcing member. Thus, by forming the coil in the shape of a plane and by making the coil higher in flexibility than the reinforcing member, it is possible to prevent the coil from being broken even if the reinforcing member is deformed. In other words, the separate distance between the reinforcing member and the inner plate-shaped member can be surely detected.

A third aspect is an aspect in which a coil is fixed to an inner plate side. A detection device for side collision of a vehicle is characterized by including: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a detection subject member provided by one of the reinforcing member and a reinforcing-member-side plate-shaped member fixed to the reinforcing member, and having a portion made of metal or ferromagnetic material; a coil fixed to the inner plate, spaced apart from the detection subject member, producing a magnetic field, and having an inductance variable in accordance with a distance between the coil and the detection subject member; and a determination element determining that the vehicle collides with an object based on the inductance of the coil.

In the above-mentioned detection device for side collision of a vehicle, the coil is fixed to the inner plate side and is arranged separately from the member to be detected, which is the metal body or the ferromagnetic body. The coil produces the magnetic field in such a way that the magnetic field reaches the member to be detected (for example, in a direction in which the member to be detected and the reinforcing member are opposite to each other). When the object collides with the outer plate to deform the reinforcing member inside the vehicle compartment to move the reinforcing member in such a way that the reinforcing member comes nearer to the inner plate, this movement of the reinforcing member makes the coil produce the magnetic field to thereby make an eddy current flow through the reinforcing member or the reinforcing-member-side plate-shaped member, which is the member to be detected. Alternatively, when the eddy current has been produced before the movement of the reinforcing member, the quantity of the eddy current is varied (increased) by the movement of the reinforcing member. Since the eddy current is produced or increased to produce or increase the magnetic field in this manner, the inductance of the coil is varied so as to decrease. In this manner, the inductance of the coil is varied according to the separate distance between the member to be detected and the coil.

In other words, the range of the magnetic field produced by the coil becomes a range in which the side collision can be detected. In short, the range in which the side collision can be detected by the above-mentioned detection device for side collision of a vehicle can be made wider as compared with the case of the sensor as described in the patent document 1. Even when the range in which the side collision can be detected is made wider, it is sufficient to arrange one or a small number of coils. As a result, it is possible to reduce the space in which the coils are arranged and hence to easily arrange the coils.

Further, the side collision is detected on the basis of the inductance of the coil that varies according to the separate distance between the coil fixed to the inner plate and the member to be detected. Thus, even when the outer plate is deformed by the impact of collision, if the impact is such a small level of impact that does not deform the reinforcing member, the separate distance between the coil and the member to be detected is not varied. Thus, it is possible to determine that the side collision does not occur and hence to prevent a passenger protection device from being activated. On the other hand, when the vehicle receives such a large level of impact that deforms the reinforcing member to thereby vary the separate distance between the coil and the member to be detected, it can be thought that there is brought about a state in which a passenger needs to be protected. In this case, since the inductance of the coil is surely varied, the side collision can be detected.

As an alternative aspect, the detection device for side collision of a vehicle may further include a shielding member that is made of metal or a ferromagnetic material and which is interposed between the face of the inner plate and the coil.

The inductance of the coil undergoes the effect produced by the metal or the ferromagnetic material disposed near the coil. However, when the coil is fixed directly to the inner plate, there is a possibility that the inductance of the coil at an early stage in which the coil is fixed to the inner plate will be varied by a difference in the shape of the inner plate and by a variation in the position where the coil is fixed to the inner plate (a variation in the separate distance between the coil and the inner plate when the coil is fixed to the inner plate). Thus, by interposing the shielding member between the inner plate and the coil, the variation in the inductance at the early stage can be reduced. That is, factors of the separate distance between the coil and the shielding member and the state in which the coil is fixed to the shielding member or the shape of the shielding member can be easily adjusted, so that the variation in the inductance at the early stage, which is easily produced when the coil and the shielding member are mounted in the vehicle, can be reduced by previously adjusting these factors. Here, when the shielding member and the coil are formed in the shape of a plane, they can be easily mounted in the door of the vehicle which is narrow in width.

Further, when the above-mentioned detection device for side collision of a vehicle includes the shielding member, the inner plate may have a through hole and the shielding member may be fixed to the inner plate in such a way as to close at least a portion of the through hole.

When a so-called service hole is formed in the inner plate, in addition to the fact that the coil cannot be easily mounted in the portion of the service hole of the inner plate, there is a possibility that the service hole will make an effect on a variation in the inductance of the coil at the early stage. Thus, when the coil is fixed to the shielding member fixed to the inner plate, as described above, the coil can be easily fixed and a variation in the inductance of the coil at the early stage that is caused by the service hole can be prevented.

Still further, when the above-mentioned detection device for side collision of a vehicle includes the shielding member, it is preferable that the coil and the shielding member are fixed to each other or integrally formed. With this, the separate distance between the coil and the shielding member can be kept nearly constant, so that the variation in the inductance of the coil at the early stage can be further reduced. Moreover, when both of the coil and the shielding member are integrally formed, the integrally formed member can be easily fixed to the inner plate.

Still further, it is preferable that the shielding member is formed in a shape larger than the outside shape of the coil and that the coil is fixed to the shielding member so as not to project from the outside edge of the shielding member (that is, so as to be arranged inside the outer edge of the shielding member when viewed in the axial direction of the coil). If when the coil is fixed to the shielding member in a state in which the coil projects from the outside edge of the shielding member, there is a possibility that the variation in the inductance of the coil at the early stage can be made larger by the effect of a portion projecting from the shielding member of the coil. Thus, when the coil is fixed so as not to project from the outside edge of the shielding member, as described above, the variation in the inductance of the coil at the early stage can be further stably reduced.

Still further, as still another alternative aspect, the reinforcing member may be made of a non-magnetic material, and the member to be detected may be the reinforcing-member-side plate-shaped member. In many cases, the reinforcing member is generally made of the ferromagnetic material such as iron, and in recent years the reinforcing member is made of material other than the iron in some cases. In this case, when the reinforcing-member-side plate-shaped member fixed to the reinforcing member is made the member to be detected, the side collision can be detected with reliability.

Still further, as still another alternative aspect, the member to be detected may be the reinforcing-member-side plate-shaped member and may be formed in a shape larger than the outside shape of the coil. Generally, the reinforcing member is formed in the shape of a bar in many cases. Thus, when the reinforcing-member-side plate-shaped member that is a member separate from the reinforcing member is made the member to be detected, if the reinforcing-member-side plate-shaped member of the member to be detected is smaller than the outside shape of the coil, the sensitivity of detection of the side collision is reduced. Thus, when the reinforcing-member-side plate-shaped member is made the member to be detected, a variation in the inductance of the coil can be increased by making the size of the reinforcing-member-side plate-shaped member larger than the outside shape of the coil, whereby the sensitivity of detection of the side collision can be made better. This can be easily achieved by making the reinforcing-member-side plate-shaped member, which is a member separate from the reinforcing member, the member to be detected.

Still further, as still another alternative aspect, the reinforcing member is formed in the shape of a bar, and the width in a vertical direction of the coil may be set smaller than the width of the bar of the reinforcing member. With this, the coil can be arranged so as to be surely opposite to the reinforcing member. As a result, the effect of a variation in the inductance of the coil caused by the deformation of the reinforcing member is made larger. In other words, the sensitivity of detection of the side collision can be made higher.

In particular, when the coil is wound a plurality of turns on the same plane, the following aspect is preferable. That is, in the present invention, it is preferable that the coil is wound a plurality of turns on the same plane and that the width in the vertical direction at the innermost periphery of the coil is set smaller than the width of the bar of the reinforcing member. In the coil wound the plurality of turns on the same plane, the magnetic flux is distributed more intensively toward the inner periphery. In other words, the effect of the inner peripheral shape of the coil is made larger. Thus, when the width in the vertical direction at the innermost periphery of the coil is set smaller than the width of the bar of the reinforcing member, as described above, the sensitivity of detection of the side collision can be made higher with reliability.

Still further, it is more preferable that the width in the vertical direction at the outermost periphery of the coil is set smaller than the width of the bar of the reinforcing member. That is, the entire coil is made smaller than the width of the bar of the reinforcing member. With this, the effect that the entire coil makes on the variation in the inductance of the coil can be made larger. Thus, the sensitivity of detection of the side collision can be made still higher.

In the detection device for side collision of a vehicle of the above-mentioned second and third aspects, as an alternative aspect, the shielding member may be grounded. With this, the shielding ability of the shielding member (effect of decreasing the variation in the inductance of the coil at the early stage) can be further enhanced.

Still further, in the detection device for side collision of a vehicle of the above-mentioned second and third aspects, as another alternative aspect, when the inductance becomes smaller than a first threshold value, the determination element may determine that the vehicle collides with an object. With this, the side collision can be detected with reliability.

Still further, in the detection device for side collision of a vehicle of the above-mentioned second and third aspects, as an alternative aspect, when the absolute value of the quantity of a variation per unit time in the inductance exceeds a second threshold value, the determination element may determine that the vehicle collides with an object. Also in this case, the side collision can be detected with reliability.

Still further, in the detection device for side collision of a vehicle of the above-mentioned second and third aspects, as an alternative aspect, when the inductance becomes smaller than a first threshold value or the absolute value of the quantity of a variation per unit time in the inductance exceeds a second threshold value, the determination element may determine that the vehicle collides with an object. In other words, the determination element uses not only a variation in the inductance itself but also a variation in the quantity of a variation per unit time in the inductance, and when the determination element detects the side collision by the use of either of the two, the determination element determines that the side collision occurs. Thus, the side collision can be detected earlier.

Still further, in the detection device for side collision of a vehicle of the above-mentioned second and third aspects, as an alternative aspect, the detection device for side collision of a vehicle may further include an LC resonance circuit, and the coil may construct a portion of the LC resonance circuit, and the determination element may determine that the vehicle collides with an object on the basis of a variation in an amplitude outputted from the LC resonance circuit. Here, when the inductance of the coil is varied, the quantity of a variation in the amplitude outputted from the LC circuit is larger than the quantity of a variation in the inductance itself. In other words, the sensitivity of detection of the side collision can be made higher.

In the case of making the side collision on the basis of the amplitude in this manner, as an alternative aspect, when the amplitude exceeds a third threshold value, the determination element may determine that the vehicle collides with an object. With this, the side collision can be detected with reliability.

Still further, in the case of making the side collision on the basis of the amplitude, as another alternative aspect, when the absolute value of the quantity of a variation per unit time in the amplitude exceeds a fourth threshold value, the determination element may determine that the vehicle collides with an object. Also in this case, the side collision can be detected with reliability.

Still further, in the case of making the side collision on the basis of the amplitude, as still another alternative aspect, when the amplitude exceeds a third threshold value or the absolute value of the quantity of a variation per unit time in the amplitude exceeds a fourth threshold value, the determination element may determine that the vehicle collides with an object. In other words, the determination element uses not only a variation in the amplitude itself but also a variation in the quantity of a variation per unit time in the amplitude, and when the determination element detects the side collision by the use of either of the two, the determination element determines that the side collision occurs. Thus, the side collision can be detected earlier.

Still further, it is preferable that the width in a horizontal direction of the coil is set larger than the width in a vertical direction of the coil. As the coil is larger in size, the range of detection of the side collision is made wider. However, as the coil is larger in size, the sensitivity of detection of the side collision is made lower. Here, when the side collision is detected, the range of detection of the side collision in the horizontal direction needs to be made wider. Thus, when the width in the horizontal direction of the coil is set relatively larger and the width in the vertical direction of the coil is set relatively smaller, the range of detection required to detect the side collision can be made wider and a decrease in the sensitivity of detection of the side collision can be prevented.

Here, when the coil is wound a plurality of turns on the same plane, it is preferable that the relationship between the width in the horizontal direction of the coil and the width in the vertical direction of the coil is set in the following manner.

Firstly, it is preferable that the coil is wound a plurality of turns on the same plane and that the width in the horizontal direction at the outermost periphery of the coil is set larger than the width in the vertical direction at the outermost periphery of the coil. The size of the entire coil has an effect on the range of detection of the side collision. Thus, when the widths of the coil are set in the above-mentioned manner, a decrease in the sensitivity of detection of the side collision can be prevented and the range of detection of the side collision can be made wider with reliability.

Further, secondly, it is preferable that the coil is wound a plurality of turns on the same plane and that the width in the horizontal direction at the innermost periphery of the coil is set larger than the width in the vertical direction at the innermost periphery of the coil. In the coil wound the plurality of turns on the same plane, the magnetic flux is distributed more intensively toward the inner periphery. In other words, the effect of the inner peripheral shape of the coil becomes large. Thus, when the widths of the coil are set in the above-mentioned manner, the range in which the sensitivity of detection of the side collision is high can be made wider.

Still further, thirdly, it is preferable that the coil is wound a plurality of turns on the same plane and that the intermediate value of the width in the horizontal direction at the outermost periphery of the coil and the width in the horizontal direction of at the innermost periphery of the coil is set larger than the intermediate value of the width in the vertical direction at the outermost periphery of the coil and the width in the vertical direction at the innermost periphery of the coil. In this case, a decrease in the sensitivity of detection of the side collision can be prevented and the range of detection of the side collision can be made wider.

According to a fourth aspect of this disclosure, a passenger protection system for a vehicle includes: the above-mentioned detection device for side collision of a vehicle; and a passenger protection device functioning when collision occurs, and protecting a passenger of the vehicle from an impact caused by the collision. The passenger protection device functions based on a determination of the detection device for side collision of a vehicle.

The above-mentioned system determines that the vehicle collides with another object on the basis of the separate distance between the inner plate and the reinforcing member or the separate distance between the member fixed to the inner plate and the reinforcing member, so that the system can make a correct side collision determination according to the degree of seriousness of the collision. Further, the result of the collision determination can be used as a trigger when the passenger protection device is activated.

In the above-mentioned system, the result of the collision determination made by the detection device for side collision of a vehicle can be used as a trigger when the passenger protection device is activated. Here, the passenger protection device is a device that operates when the vehicle collides with an object to thereby protect the passenger from the impact of the collision, and an air bag, a seat belt tensioner, and the like can be thought as the passenger protection device.

A fifth aspect is an aspect that switches the method of determining that a vehicle collides with an object according to the position of a stay. A detection device for side collision of a vehicle is characterized by including: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a distance sensor detecting a separate distance between a detection subject member and the reinforcing member, wherein the detection subject member is provided by one of the inner plate and an inner member fixed to the inner plate; a position sensor detecting a position of a door glass of the side door or a position of a stay for moving up and down the door glass, wherein the door glass is inserted between the reinforcing member and the detection subject member; and a determination element determining that the vehicle collides with an object based on an output value of the distance sensor and an output value of the position sensor.

In this detection device for side collision of a vehicle, the distance sensor is arranged separately from the inner plate side member or the reinforcing member, the inner plate side member being at least either of the inner plate and the inner member fixed to the inner plate. The distance sensor detects the separate distance between the inner plate side member and the reinforcing member. Further, the detection device for side collision of a vehicle includes the position sensor, and the position sensor detects the position of the door glass or the position of the stay for securing the door glass and for moving up and down the door glass. The determination element determines whether or not the vehicle collides with an object on the basis of the separate distance detected by the distance sensor. Here, when the stay is interposed between the distance sensor and the inner plate side member or between the distance sensor and the reinforcing member, there is a possibility that the distance sensor cannot detect the separate distance correctly. In other words, there is a possibility that an error will be caused in making the determination that the vehicle collides with the object. However, according to the detection device for side collision of a vehicle of the present invention, the collision determination is made in consideration of the position of the door glass or the stay detected by the position sensor, so that it is possible to prevent an error from being caused in the collision determination. Here, the distance sensor is a sensor that is arranged separately from a member to be detected and which detects the displacement of the member to be detected, so that a sensor using magnetism and a sensor using a light beam such as laser can be thought as the distance sensor.

Here, the determination element of the detection device for side collision of a vehicle is constructed so as to switch a method for determining that the vehicle collides with an object according to the position of the door glass or the position of the stay that is detected by the position sensor. In this manner, when the determination method is switched according to the position of the door glass or the stay, the effect of the stay can be reliably prevented at the time of making the collision determination. In particular, the collision determination can be made at a high speed.

Further, when it is detected by the position sensor that the stay is positioned between the reinforcing member and the inner plate side member, the determination element determines that the vehicle collides with an object on the basis of the quantity of a variation per unit time in the distance detected by the distance sensor, and when it is detected by the position sensor that the stay is positioned other than between the reinforcing member and the inner plate side member, the determination element determines that the vehicle collides with an object on the basis of the separate distance detected by the distance sensor or the quantity of a variation per unit time in the separate distance.

With this construction, the position of the stay is detected by the position sensor and the method for determining that the vehicle collides with an object is switched on the basis of the detected position of the stay. When the stay is positioned between the reinforcing member and the inner plate side member, as described above, the distance sensor detects the separate distance between the reinforcing member and the inner plate side member, so that the distance sensor cannot detect the separate distance correctly. However, when the collision determination is made on the basis of the quantity of a variation per unit time in the separate distance detected by the distance sensor, even if the distance sensor detects the separate distance between the reinforcing member and the stay, independently of the separate distance itself detected by the distance sensor, the side collision can be correctly detected.

Further, when the stay is not positioned between the reinforcing member and the inner plate side member, even if the collision determination is made on the basis of either the separate distance detected by the distance sensor or the quantity of a variation per unit time in the separate distance, a correct determination result can be acquired.

Thus, even when the distance sensor is arranged at a position where the stay can be positioned between the reinforcing member and the inner plate side member according to the state in which the door glass is opened or closed, the collision determination can be correctly made and hence the distance sensor can be arranged in a wide range without being limited by the position of the stay. In this regard, the position of the door glass is detected in order to detect the position in the up and down direction of the vehicle of the stay from the position of the door glass.

As an alternative aspect, it is preferable that: the inner plate side member is made of a metal body or a magnetic body; the distance sensor is a coil that is fixed to the reinforcing member and which produces a magnetic field and which detects a magnetic flux varying with a variation in the separate distance between the inner plate side member and the reinforcing member; and the determination element determines that the vehicle collides with an object on the basis of the magnetic flux of the coil.

Alternatively, as an alternative aspect, it is also preferable that: the reinforcing member is made of a metal body or a magnetic body; the distance sensor is a coil which is fixed to the inner plate side member and which produces a magnetic field and which detects a magnetic flux varying with a variation in a separate distance between the inner plate side member and the reinforcing member; and the determination element determines that the vehicle collides with an object on the basis of the magnetic flux of the coil.

In this construction, the magnetic field produced by the coil of the distance sensor is produced between the inner plate side member and the reinforcing member. When the coil is fixed to the reinforcing member, if an object collides with the outer plate to deform the reinforcing member inside the vehicle compartment to thereby move the reinforcing member in such a way that the reinforcing member comes closer to the inner plate, the magnetic field produced by the coil with the movement of the reinforcing member makes an eddy current flow through the inner plate side member that is the inner plate or the inner member. Alternatively, if the eddy current has been produced before the movement of the reinforcing member, the quantity of the eddy current is varied (increased) with the movement of the reinforcing member. When the eddy current is produced or increased to produce or increase the magnetic field, the magnetic flux is varied so as to decrease. In this manner, the magnetic flux of the coil is varied in response to the separate distance between the inner plate side member and the coil. Further, when the coil is fixed to the inner plate side member, the object collides with the outer plate to deform the reinforcing member inside the vehicle compartment to thereby move the reinforcing member in such a way that the reinforcing member comes closer to the inner plate, the eddy current is made to flow through the reinforcing member by the magnetic field produced by the coil. In other words, according to this aspect in which the range of the magnetic field produced by the coil becomes the range in which the side collision can be detected, the effect of the above-mentioned aspect becomes prominent.

In other words, as for the range in which the side collision can be detected by the detection device for side collision of a vehicle of this aspect, the sensor is not held by a support or the like unlike the sensor described in the patent document 1, and hence the position where the sensor is arranged is not limited, and the effect of the position in the up and down direction of the vehicle of the stay can be also decreased, so that the range in which the side collision can be detected can be made wider. Even when the range in which the side collision can be detected is made wider, it is sufficient to arrange one or a small number of coils. As a result, it is possible to save the space in which the coil is arranged and to facilitate the arrangement of the coil.

Further, the side collision is detected on the basis of the magnetic flux of the coil that varies according to the separate distance between the coil fixed to the reinforcing member and the inner plate side member or on the basis of the magnetic flux of the coil that varies according to the separate distance between the coil fixed to the inner plate side member and the reinforcing member. Thus, even when the outer plate is deformed by an impact caused by the side collision, if the impact is such a small level of impact that does not deform the reinforcing member, the separate distance between the coil and the inner plate side member is not varied, so that it is possible to determine that the side collision does not occur and to prevent the passenger protection device from being activated. On the other hand, when such a large level of impact that deforms the reinforcing member to vary the separate distance between the coil and the inner plate side member is applied to the vehicle, it can be thought that there is brought about a state in which the passenger needs to be protected. In this case, the magnetic flux of the coil is surely varied and hence the side collision can be detected.

Further, it is preferable to apply the present invention to a case in which the stay is made of a metal body or a magnetic body and in which the coil is applied as the distance sensor, as described above. Generally, the stay is made of the metal body or the magnetic body in many cases. In these cases, when the side collision determination is made by the use of the magnetic flux of the coil, the effect that the stay has on the magnetic flux of the coil is very large. Thus, when the determination of the side collision is made according to the position of the stay detected by the position sensor, even if the stay that has a large effect on the magnetic flux of the coil is disposed, the side collision can be determined with reliability.

Still further, as an alternative aspect, the separate distance detected by the distance sensor corresponds to the magnitude of the quantity of the magnetic flux, and the quantity of a variation per unit time in the separate distance detected by the distance sensor corresponds to the quantity of a variation per unit time in the magnetic flux.

In other words, the detection device for side collision of a vehicle of this aspect has the method of detecting the separate distance from the magnitude of the magnetic flux detected by the coil and the method of detecting the separate distance from the quantity of a variation per unit time in the magnetic flux detected by the coil as the element for detecting the collision. Since the detection device for side collision of a vehicle of this aspect selects both methods according to the position of the stay, the detection device can detect the side collision correctly and reliably. Moreover, when the detection device uses both of the methods in combination, the detection device can detect the side collision earlier in addition to the above-mentioned effect.

In other words, when the stay is not positioned between the coil and the inner plate side member or the reinforcing member, the magnitude of the quantity of the magnetic flux detected by the coil correctly reflects the separate distance between the coil and the inner plate side member or the reinforcing member. Thus, even when the side collision determination is made on the basis of either of the magnitude of the quantity of the magnetic flux and the quantity of a variation per unit time in the magnetic flux, the side collision determination is made correctly.

On the other hand, when the stay is positioned between the coil and the inner plate side or the reinforcing member, the stay of the magnetic body has an effect on the quantity of magnetic flux detected by the coil. Thus, the magnitude of the quantity of magnetic flux detected by the coil does not correctly reflect the separate distance between the coil and the inner plate side member. However, when the determination of collision is made on the basis of the quantity of a variation per unit time in the magnetic flux, the quantity of the magnetic flux varies until the separate distance between the coil and the inner plate side member or the reinforcing member becomes zero (the quantity of a variation per unit time in the magnetic flux also becomes zero), so that the collision can be detected.

Still further, as still another alternative aspect, it is preferable that the width in the up and down direction of the vehicle of the coil is set larger than the width in the up and down direction of the vehicle of the stay. When the width in the up and down direction of the vehicle of the coil is set larger than the width in the up and down direction of the vehicle of the stay, even if the stay is positioned between the coil and the inner plate side member according to the state where the door glass is opened or closed, the effect that the stay has on the magnetic flux can be decreased. With this, even when the stay is positioned between the coil and the inner plate side member, the determination method of detecting the separate distance between the coil and the inner plate side member on the basis of the magnetic flux can be used.

Still further, as still another alternative aspect, preferably, the detection device for side collision of a vehicle has the coil wound a plurality of turns on the same plane and has the width in the up and down direction of the vehicle at the innermost periphery of the coil set larger than the width in the up and down direction of the vehicle of the stay. In the coil wound a plurality of turns on the same plane, the magnetic flux is distributed more intensively toward the inner peripheral side. In other words, the effect of the inner peripheral shape of the coil becomes larger. Thus, when the width of the coil and the width of the stay are set in the above-mentioned manner, the effect that the stay has on the magnetic flux detected by the coil can be further reduced.

Alternatively, it is preferable that the coil is wound a plurality of turns on the same plane and that the width in the up and down direction of the vehicle at the outermost periphery of the coil is set larger than the width in the up and down direction of the vehicle of the stay. The magnitude of the entire coil has an effect on the range of detection of the side collision. Thus, when the width of the coil and the width of the stay are set in the above-mentioned manner, a decrease in the sensitivity of detection of the side collision can be prevented and the effect that the stay has on the magnetic flux detected by the coil can be reduced.

As described above, the detection device for side collision of a vehicle of the construction in which the relationship between the width in the up and down direction of the vehicle of the coil and the width in the up and down direction of the vehicle of the stay is set has the method of determining the collision on the basis of the magnitude of the quantity of magnetic flux and the method of determining the collision on the basis of the quantity of a variation per unit time in the magnetic flux and can use either of the two methods.

A sixth aspect is a detection device for side collision of a vehicle in which the width in the up and down direction of the vehicle of the coil is set larger than the width in the up and down direction of the vehicle of the stay. The detection device for side collision of a vehicle includes: an outer plate of a side door mounted in a vehicle; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate; a distance sensor detecting a separate distance between a detection subject member and the reinforcing member, wherein the detection subject member is provided by one of the inner plate and an inner member fixed to the inner plate; a determination element determining that the vehicle collides with an object based on an output value of the distance sensor; and a stay for moving up and down a door glass of the side door. At least one of the reinforcing member and the detection subject member has a metal body or a magnetic body. The distance sensor is a coil, which is fixed to one of the reinforcing member and the detection subject member, generates a magnetic field, and detects a magnetic flux variable with the separate distance between the detection subject member and the reinforcing member. A width of the coil in an up-down direction of the vehicle is larger than a width of the stay in the up-down direction of the vehicle, and the determination element determines that the vehicle collides with an object based on the magnetic flux detected by the coil.

According to the above-mentioned aspect, by setting the width in the up and down direction of the vehicle of the coil larger than the width in the up and down direction of the vehicle of the stay, even when the stay is positioned between the coil and the inner plate side member according to the state where the door glass is opened or closed, the effect that the stay has on the magnetic flux detected by the coil can be reduced. With this, even when the stay is positioned between the coil and the inner plate side member, it is also possible to use a determination method for detecting the separate distance between the coil and the inner plate side member on the basis of the magnetic flux.

As an alternative aspect, it is preferable that the above-mentioned detection device for side collision of a vehicle further has the coil wound a plurality of turns on the same plane and has the width in an up and down direction of the vehicle at the innermost periphery of the coil set larger than the width in the up and down direction of the vehicle of the stay. In the coil wound a plurality of turns on the same plane, the magnetic flux is distributed more intensively toward the inner peripheral side. In other words, the effect of the inner peripheral shape of the coil becomes larger. Thus, when the width of the coil and the width of the stay are set in the above-mentioned manner, the effect that the stay has on the magnetic flux detected by the coil can be further reduced.

Further, it is preferable that the coil is wound a plurality of turns on the same plane and that the width in an up and down direction of the vehicle at the outermost periphery of the coil is set larger than the width in the up and down direction of the vehicle of the stay. The size of the entire coil has an effect on the range of detection of the side collision. Thus, when the width of the coil and the width of the stay are set in the above-mentioned manner, a decrease in the sensitivity of detection of the side collision can be prevented and the effect that the stay has on the magnetic flux detected by the coil can be reduced.

The detection device for side collision of a vehicle of the construction in which the relationship between the width in the up and down direction of the vehicle and the width in the up and down direction of the vehicle of the stay is set in the manner described above has the above-mentioned method of determining collision on the basis of the magnitude of the quantity of magnetic flux and the above-mentioned method of determining collision on the basis of the quantity of a variation per unit time in magnetic flux and can use either of the methods.

According to the fifth aspect and the sixth aspect, in such a detection device for side collision of a vehicle that includes a distance sensor utilizing the magnetic flux and the like of the coil arranged in the side door, it is possible to provide a detection device for side collision of a vehicle that has the distance sensor arranged so as not to interfere in terms of space with a stay moved up and down when a door glass is opened and closed and that is constructed so as to reduce an effect on a coil for detecting the magnetic flux and that can detect the deformation of a vehicle reliably and in a wide range, the deformation being caused by collision and requiring the protection of a passenger.

As a seventh aspect, a detection device for side collision of a vehicle includes: an outer plate of a side door; an inner plate of the side door arranged inside a vehicle compartment of the outer plate so as to be opposite to and spaced apart from the outer plate; a reinforcing member arranged between the outer plate and the inner plate, spaced apart from the inner plate, and having a bending rigidity higher than a bending rigidity of the outer plate, wherein a first detection subject member is provided by one of the inner plate and the reinforcing member and is made of a ferromagnetic material; a first coil positioned between the inner plate and the reinforcing member, fixed to the other of the inner plate and the reinforcing member, spaced apart from the first detection subject member, generating a magnetic field in a direction in which the inner plate and the reinforcing member are opposite to each other, and having an inductance variable with a separate distance between the first coil and the first detection subject member, wherein a second detection subject member is provided by one of the outer plate and the inner plate and is made of a ferromagnetic material; a second coil positioned between the outer plate and the inner plate, fixed to the other of the outer plate and the inner plate, spaced apart from the second detection subject member, generating a magnetic field in a direction in which the outer plate and the inner plate are opposite to each other, and having an inductance variable with a separate distance between the second coil and the second detection subject member; and a determination element determining that the vehicle collides with an object based on a variation of the inductance of the first coil and a variation of the inductance of the second coil.

When an object collides with the side door, the outer plate is deformed so as to be brought closer to the inner plate side, in particular, when an impact is very large, the reinforcing member is further deformed so as to be brought closer to the inner plate side. In the present invention, when the separate distance between the first member to be detected and the first coil or the separate distance between the second member to be detected and the second becomes shorter, the inductance of the first coil or the second coil is varied in response to each of the separate distances.

Here, it is in a case where the reinforcing member or the outer plate is deformed in a range in which the magnetic field is produced by the first coil or the second coil that the inductance of the first coil or the second coil is varied. In other words, a range in which the side collision can be detected is nearly equal to a range corresponding to the size of the first coil or the second coil. Thus, as compared with the sensor described in the patent document 1, even in a case where only one first coil or one second coil is disposed, the range where the side collision can be detected is made sufficiently wide.

However, when the size of the coil is increased, the sensitivity of detection of side collision by the coil is made lower. For example, when the member to be detected is deformed so as to be brought closer to the coil in the entire range of the size of the coil, the inductance of the coil is sufficiently varied. Thus, in this case, the sensitivity of detection of the side collision is made constant irrespective of the size of the coil. However, when the member to be detected is deformed so as to be brought closer to the coil only in a narrow range with respect to the size of the coil, a variation in the inductance of the coil is different according to the size of the coil. Specifically, as the size of the coil is smaller, a variation in the inductance of the coil appears larger. In short, as described above, as the size of the coil is larger, the sensitivity of detection of the side collision by the coil is made lower. Thus, it is necessary to detect the side collision in a wide range without lowering the sensitivity of detection by the coil.

Thus, the detection device for side collision of a vehicle includes the plurality of coils. With this, the detection device can detect the side collision in the wide range and with high sensitivity. The plurality of coils means the plurality of coils of either of the first coils and the second coils, or at least one or more respective coils of the first coils and the second coils. Here, "the plurality of coils of either of the first coils and the second coils", described above, includes "the plurality of only first coils" and "the plurality of only second coils".

As for the positions of the plurality of coils, there are provided the following aspects. As a first modified aspect relating to the positions of the plurality of coils, there is provided a case in which: the reinforcing member is arranged so as to extend in a front and rear direction of the vehicle; the detection device for side collision of a vehicle includes the plurality of first coils; and the respective first coils are arranged at different positions in the front and rear direction of the vehicle.

In other words, this case is a case in which the detection device for side collision of a vehicle includes the plurality of first coils and in which the plurality of first coils are opposite to the reinforcing member extending in the front and rear direction of the vehicle and are arranged at different positions. With this, the deformation of the reinforcing member can be detected in a wide range with high accuracy. Thus, when an object collides with the side door, it is possible to detect with high accuracy that the reinforcing member is deformed so as to be brought closer to the inner plate side at any position.

In the above-mentioned first modified aspect, it is preferable that the detection device for side collision of a vehicle further includes the plurality of second coils and that the plurality of second coils are arranged at positions which are the same positions in the front and rear direction of the vehicle with respect to the respective first coils and which are the different positions in the up and down direction of the vehicle with respect to the respective first coils. In other words, this detection device for side collision of a vehicle includes not only the plurality of first coils but also the plurality of second coils. With this, the device can detect the side collision in a wider range.

Further, in this case, it is preferable that the second coils are arranged at different positions in the up direction of the vehicle and at different positions in the down direction of the vehicle with respect to the respective first coils. With this, the device can detect the side collision in the further wider range also in the up and down direction of the vehicle.

Still further, as a second modified aspect relating to the positions of the plurality of coils, the detection device for side collision of a vehicle includes at least one or more respective coils of the first coils and the second coils and has the second coils arranged at positions that are same positions in the front and rear direction of the vehicle with respect to the first coils and that are different positions in the up and down direction of the vehicle with respect to the first coils. With this, the device can detect the side collision with high accuracy in a wide range in the up and down direction of the vehicle.

In the above-mentioned second modified aspect, it is preferable that the second coils are arranged at different positions in the up direction of the vehicle with respect to the respective first coils and at different positions in the down direction of the vehicle with respect to the respective first coils. With this, the detection device can detect the side collision with high accuracy in a wider range in the up and down direction of the vehicle.

Moreover, the determination element can include the following aspects. As a first modified aspect relating to the determination element, when at least the plurality of first coils are arranged at different positions in the front and rear direction of the vehicle, the determination element determines that the object collides with the entire portion of the side door or that the object collides with a portion of the side door on the basis of a variation in the inductance of each of the first coils.

Here, an object colliding with the entire portion of the side door is, for example, other vehicle, a building or the like. A object colliding with a portion of the side door is, for example, an electric pole or the like. The deformation aspect of the side door is different between a case where the collision object is the other vehicle or the like and a case where the collision object is the electric pole or the like. As a result, the aspect of protecting a passenger is also different between the cases. According to the aspect of the present invention, in a case where collision is detected by all coils arranged at different positions in the front and rear direction of the vehicle, it is possible to determine that the object collides with the entire portion of the side door, whereas in a case where collision is detected by any one of coils arranged at different positions in the front and rear direction of the vehicle, it is possible to determine that the object collides with a portion of the side door. In other words, by the determination element, it is possible to determine the kind of collision, that is, whether the object collides with the entire portion of the side door or collides with a portion of the side door. Thus, it is possible to protect the passenger suitably by the use of the determination result of the determination element.

Further, as a second modified aspect relating to the determination element, in a case where at least the plurality of first coils are arranged at different positions in the front and rear direction of the vehicle, the determination element determines a position in which the object collides in the front and rear direction of the vehicle of the side door on the basis of a variation in the inductance of each of the first coils. In particular, in the case where the collision object is the electric pole or the like, it is possible to determine whether the position where the collision object collides with the side door is positioned in the front direction of the vehicle or in the rear direction of the vehicle of the side door. With this, it is possible to protect the passenger suitably. For example, in a case where air bags are arranged at respective colliding positions, it is sufficient to develop only necessary air bag.

Still further, as a third modified aspect relating to the determination element, in a case where at least the plurality of first coils are arranged at different positions in the front and rear direction of the vehicle, the determination element computes a deformation distribution in the front and rear direction of the vehicle in the reinforcing member on the basis of a variation in the inductance of each of the first coils. In this manner, by computing the deformation distribution in the front and rear direction in the reinforcing member, it is possible to protect the passenger suitably.

Still further, as a fourth modified aspect relating to the determination element, in a case where the first coils and the second coils are arranged at the same positions in the front and rear direction of the vehicle, only when both of the first coils and the second coils which are arranged at same positions in the front and rear direction of the vehicle detect that the object collides with the side door on the basis of a variation in the inductance of each of the first coils and the second coils, the determination element determines that the vehicle collides with the object. With this, it is possible to treat the first coil for detecting the deformation of the reinforcing member as a main sensor and to treat the second coil for detecting the deformation of the outer plate as a safety sensor. Thus, it is possible to prevent an erroneous detection.

Still further, as a fifth modified aspect relating to the determination element, in a case where the second coils are arranged respectively in the up direction of the vehicle and in the down direction of the vehicle of the first coils at a same position in the front and rear direction of the vehicle, when a specified one of the first coils detects that the object collides with the vehicle and when any one of the plurality of second coils, which are arranged at same positions in the front and rear direction of the vehicle as the specified one of the first coils and in the up direction of the vehicle and in the down direction of the vehicle of the specified one of the first coils, detects that the object has collided with the vehicle, the determination element determines that the object collides with the vehicle at the position in which the specified one of the first coils is arranged in the front and rear direction of the vehicle of the side door.

With this, it is possible to treat the first coil for detecting the deformation of the reinforcing member as a main sensor and to treat the second coil for detecting the deformation of the outer plate as a safety sensor. Further, it is sufficient that in the plurality of second coils as the safety sensors, only either of the second coil arranged in the up direction of the vehicle and the second coil arranged in the down direction of the vehicle of the plurality of second coils detects that the object has collided with the vehicle. With this, it is possible to prevent an erroneous detection.

As an eighth aspect, a detection device for side collision of a vehicle is characterized by including: a side door arranged on a side of the vehicle; a vehicle body member arranged on the side door in a front direction of the vehicle or in a rear direction of the vehicle; a gap detection sensor arranged on the side door or on the vehicle body member, and detecting a gap between an end face of the side door and the vehicle body member, wherein the end face is arranged on the side door in the front direction or in the rear direction of the vehicle; and a determination element determining that an object collides with the side of the vehicle based on the gap detected by the gap detection sensor.

Here, when the object collides with the side door, at least the outer plate of the side door is deformed so as to enter inside the vehicle compartment. With this deformation, the end faces in the front and rear direction of the vehicle of the side door are deformed in directions to separate from the vehicle body member to which the end faces are arranged originally close. In other words, when the object collides with the side door, the end face in the front direction of the vehicle of the side door is deformed in such a way that a front gap between the end face in the front direction of the vehicle of the side door and the vehicle body member is made wider and the end face in the rear direction of the vehicle of the side door is deformed in such a way that a rear gap between the end face in the rear direction of the vehicle of the side door and the vehicle body member is made wider.

According to the above-mentioned aspect, the gap detection sensor detects that the front gap or the rear gap is made wider, and the determination element determines that the object collides with the side of the vehicle on the basis of the gap. In short, it is possible to reliably detect that the object collides with the side of the vehicle. Here, the gas detection sensor constructing the detection device for side collision of a vehicle of the present invention is arranged on the outside face of the side door or on the vehicle body. In other words, the gap detection sensor is not arranged in the interior of the side door (in a space between the outer plate and the inner plate) as usual. In this manner, the sensor is not arranged in the interior of the side door in which a space needs to be ensured, but it is possible to reliably detect that the object collides with the side door.

As an alternative aspect, the vehicle body member includes: a first pillar that rotatably supports the side door; and a second pillar that is arranged on the opposite side of the first pillar in the front and rear direction of the side door, and the gap detection sensor detects a gap between an end face on a side in which the second pillar is arranged of the side door and the second pillar.

Here, the pillar is a support member that is formed in the shape of a pillar having high rigidity and which supports the vehicle body. That the first pillar rotatably supports the side door means that the first pillar is coupled to the side door. For this reason, when the object collides with the side door, the end face of the side door is less easily deformed so as to separate from the first pillar. In contrast to this, when the object collides with the side door, the gap between the second pillar, which does not support the side door, and the end face of the side door does not undergo any effect but is made wider. According to the above-mentioned aspect, the gap detection sensor detects the gap between the end face on the side in which the second pillar is arranged of the side door and the second pillar, so that the side collision can be detected with more reliability.

Further, in this aspect, it is preferable that the gap detection sensor further detects a gap between the end face on a side in which the first pillar is arranged of the side door and the first pillar. As described above, the first pillar rotatably supports the side door, so even when the object collides with the side door, the end face of the side door is less easily deformed so as to separate from the first pillar. However, even if the quantity of deformation is small, the end face is deformed surely.

Thus, when the collision determination is made on the basis of not only the gap between the second pillar, which does not to support the side door, and the side door but also the gap between the first pillar, which supports the side door, and the side door, the collision determination can be made with higher accuracy.

Still further, another alternative aspect, the gap detection sensor detects a gap between a door outside portion, which is positioned outward in a left and right direction of the vehicle of a central portion in the left and right direction, of the side door and an opposite portion, which is positioned opposite to the door outside portion in a state where the side door is closed, of the vehicle body member.

When the object collides with the side door, the outer plate of the side door is deformed so as to enter inside the vehicle compartment. In other words, of the end faces in the front and rear direction of the vehicle of the side door, an outside portion that is positioned outside in the left and right direction of the vehicle of the central portion in the left and right direction of the vehicle becomes larger in a quantity separate from the vehicle body than an inside portion that is positioned inside in the left and right direction of the vehicle of the central portion. Thus, when the gap between the door outside portion and the opposite portion is detected and the collision of the object is detected on the basis of the gap, just as with the above-described aspect, the collision of the object can be detected with more reliability.

Still further, as another alternative aspect, the determination element determines whether or not the object collides with the side face of the vehicle on the basis of whether or not the gap exceeds a first threshold value. Here, when the gap itself becomes wider and exceeds the first threshold, there is a high possibility that an object will collide with the side face of the vehicle. Thus, when the information of whether or not the gap exceeds the first threshold value is used for making the determination of collision of the object, the collision of the object can be detected with reliability.

In the case of making the above-mentioned determination, it is preferable that the determination element further determines whether or not the object collides with the side face of the vehicle on the basis of whether or not the rate of a variation in the gap exceeds a second threshold value. In other words, when the gap itself exceeds the first threshold value and the rate of a variation in the gap exceeds the second threshold value, the determination element determines that the object collides with the side of the vehicle. Here, when a large impact is applied to the vehicle by the collision of the object, the rate of a variation in the gap is large, whereas when such a small level of impact that puts the object into contact with the side of the vehicle is applied, the rate of a variation in the gap is not much large. However, in some cases, even when the impact is small, there is a possibility that the gap itself will be large. Even when the gap itself exceeds the first threshold value, there is a possibility that there will be not brought about a state where the inner plate of the side door abuts against the passenger. This state is a state in which although the outer plate of the side door is deformed inside the vehicle compartment, the inner plate of the side door is not much deformed inside the vehicle compartment. In this case, there is a case where the passenger protection device does not need to be activated. Thus, as described above, when the determination element determines that the object collides with the side of the vehicle in the case where the gap itself exceeds the first threshold value and where the rate of a variation in the gap exceeds the second threshold value, only the state of collision in which the passenger needs to be protected can be detected with reliability.

Of course, it is also possible to some extent to determine that the object collides with the side of the vehicle only by the fact that the gap itself exceeds the first threshold value. However, as described above, when the rate of a variation in the gap is used, the state of collision in which the passenger needs to be protected can be detected with more accuracy.

Further, it is also possible to employ the following aspect without using the rate of a variation in the gap. That is, the determination element determines whether or not the object collides with the side of the vehicle on the basis of whether or not the gap exceeds the first threshold value within a period of time in which a specified time elapses after the object is put into contact with the side of the vehicle.

When the rate of a variation in the gap is large, it can be thought that there is brought about a state where when a comparatively short time elapses after the object is put into contact with the side of the vehicle, the gap itself exceeds the first threshold value. On the other hand, when the rate of a variation in the gap is small, it can be thought that there is brought about a state where when a comparatively long time elapses after the object is put into contact with the side of the vehicle, the gap itself exceeds the first threshold value. Thus, a specified time for differentiating both states is previously set and when the gap itself exceeds the first threshold value in the period of time in which the specified time elapses after the object is put into contact with the side of the vehicle, it is determined that the object collides with the side of the vehicle. With this, the state of collision in which the passenger needs to be protected can be detected with high accuracy.

In this case, it is preferable that the determination element determines timing when the object collides with the side of the vehicle on the basis of a variation in the gap detected by the gap detection sensor. In addition to this, the determination of the timing when the object collides with the side of the vehicle can be also made separately by the use of a contact sensor. However, the gap detection sensor is used as the sensor, so when this gap detection sensor doubles as a sensor used for making the determination that the object collides with the side of the vehicle body, an increase in the number of sensors can be prevented.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A detection device for side collision of a vehicle comprising:
    an outer plate of a side door mounted in the vehicle;
    an inner plate of the side door arranged inside a vehicle compartment of the outer plate so as to be opposite to and spaced apart from the outer plate;
    a reinforcing member arranged between the outer plate and the inner plate, spaced apart from the inner plate, and having a bending rigidity higher than a bending rigidity of the outer plate;
    a detection subject member provided by one of the inner plate and a member fixed to the inner plate;
    a sensor detecting a separate distance between the detection subject member and the reinforcing member; and
    a determination element determining that the vehicle collides with an object based on an output value of the sensor.

2. A detection device for side collision of a vehicle comprising:
    an outer plate of a side door mounted in the vehicle;
    an inner plate of the side door arranged inside a vehicle compartment of the outer plate so as to be opposite to and spaced apart from the outer plate;
    a reinforcing member arranged between the outer plate and the inner plate, spaced apart from the inner plate, and having a bending rigidity higher than a bending rigidity of the outer plate;
    a detection subject member provided by one of the inner plate and an inner plate-shaped member fixed to the inner plate, and having a portion made of metal or ferromagnetic material;
    a coil fixed to the reinforcing member, spaced apart from the detection subject member, producing a magnetic field, and having an inductance variable in accordance with a separate distance between the coil and the detection subject member; and
    a determination element determining that the vehicle collides with an object based on the inductance of the coil.

3. The detection device for side collision of a vehicle according to claim 2, further comprising:
    a shielding member made of metal or ferromagnetic material, and disposed between the reinforcing member and the coil.

4. The detection device for side collision of a vehicle according to claim 3,
    wherein the shielding member has a plane shape.

5. The detection device for side collision of a vehicle according to claim 3,
    wherein the coil has a plane shape.

6. The detection device for side collision of a vehicle according to claim 3,
    wherein the coil and the shielding member are fixed to each other.

7. The detection device for side collision of a vehicle according to claim 6,
    wherein the coil and the shielding member are integrated.

8. The detection device for side collision of a vehicle according to claim 3,
    wherein the shielding member has dimensions larger than an outside shape of the coil, and
    wherein the coil is arranged inside an outer edge of the shielding member in an axial direction of the coil.

9. The detection device for side collision of a vehicle according to claim 2,
    wherein the inner plate has a through hole,
    wherein the inner plate-shaped member is fixed to the inner plate in such a manner that the inner plate-shaped member covers at least a part of the through hole, and
    wherein the detection subject member is the inner plate-shaped member.

10. The detection device for side collision of a vehicle according to claim 2,
    wherein the inner plate is made of a resin module, and
    wherein the detection subject member is the inner plate-shaped member.

11. The detection device for side collision of a vehicle according to claim 2,
    wherein the detection subject member is the inner plate-shaped member, and
    wherein the inner plate-shaped member has dimensions larger than an outside shape of the coil.

12. The detection device for side collision of a vehicle according to claim 2,
wherein the coil has a plane shape, and
wherein the coil has flexibility higher than the reinforcing member.

13. A detection device for side collision of a vehicle comprising:
an outer plate of a side door mounted in a vehicle;
an inner plate of the side door arranged inside a vehicle compartment of the outer plate so as to be opposite to and spaced apart from the outer plate;
a reinforcing member arranged between the outer plate and the inner plate, spaced apart from the inner plate, and having a bending rigidity higher than a bending rigidity of the outer plate;
a detection subject member provided by one of the reinforcing member and a reinforcing-member-side plate-shaped member fixed to the reinforcing member, and having a portion made of metal or ferromagnetic material;
a coil fixed to the inner plate, spaced apart from the detection subject member, producing a magnetic field, and having an inductance variable in accordance with a distance between the coil and the detection subject member; and
a determination element determining that the vehicle collides with an object based on the inductance of the coil.

14. The detection device for side collision of a vehicle according to claim 13, further comprising:
a shielding member made of metal or ferromagnetic material, and disposed between a face of the inner plate and the coil.

15. The detection device for side collision of a vehicle according to claim 14,
wherein the inner plate has a through hole,
wherein the shielding member is fixed to the inner plate in such a manner that the shielding member covers at least a portion of the through hole.

16. The detection device for side collision of a vehicle according to claim 14,
wherein the coil and the shielding member are fixed to each other, or the coil and the shielding member are integrated.

17. The detection device for side collision of a vehicle according to claim 14,
wherein the shielding member has dimensions larger than an outside shape of the coil, and
wherein the coil is arranged inside an outer edge of the shielding member in an axial direction of the coil.

18. The detection device for side collision of a vehicle according to claim 13,
wherein the reinforcing member is made of non-magnetic material, and
wherein the detection subject member is the reinforcing-member-side plate-shaped member.

19. The detection device for side collision of a vehicle according to claim 13,
wherein the detection subject member is the reinforcing-member-side plate-shaped member, and
wherein the detection subject member has dimensions larger than an outside shape of the coil.

20. The detection device for side collision of a vehicle according to claim 13,
wherein the reinforcing member has a bar shape, and
wherein the coil has a width in a vertical direction of the coil smaller than a width of the bar shape of the reinforcing member.

21. The detection device for side collision of a vehicle according to claim 20,
wherein the coil has a plurality of turns wound on a same plane, and
wherein the width of the coil at an innermost periphery of the coil in the vertical direction is smaller than the width of the bar shape of the reinforcing member.

22. The detection device for side collision of a vehicle according to claim 20,
wherein the width of the coil at an outermost periphery of the coil in the vertical direction is smaller than the width of the bar shape of the reinforcing member.

23. The detection device for side collision of a vehicle according to claim 3,
wherein the shielding member are grounded.

24. The detection device for side collision of a vehicle according to claim 2,
wherein, when the inductance is smaller than a first threshold value, the determination element determines that the vehicle collides with an object.

25. The detection device for side collision of a vehicle according to claim 2,
wherein, when an absolute value of a variation quantity of the inductance per unit time exceeds a second threshold value, the determination element determines that the vehicle collides with an object.

26. The detection device for side collision of a vehicle according to claim 2,
wherein, when the inductance is smaller than a first threshold value, or when an absolute value of a variation quantity of the inductance per unit time exceeds a second threshold value, the determination element determines that the vehicle collides with an object.

27. The detection device for side collision of a vehicle according to claim 2, further comprising:
an LC resonance circuit,
wherein the coil provides a portion of the LC resonance circuit, and
wherein the determination element determines that the vehicle collides with an object based on a variation of amplitude outputted from the LC resonance circuit.

28. The detection device for side collision of a vehicle according to claim 27,
wherein, when the amplitude exceeds a third threshold value, the determination element determines that the vehicle collides with an object.

29. The detection device for side collision of a vehicle according to claim 27,
wherein, when an absolute value of a variation quantity of the amplitude per unit time exceeds a fourth threshold value, the determination element determines that the vehicle collides with an object.

30. The detection device for side collision of a vehicle according to claim 27,
wherein, when the amplitude exceeds a third threshold value, or an absolute value of a variation quantity of the amplitude per unit time exceeds a fourth threshold value, the determination element determines that the vehicle collides with an object.

31. The detection device for side collision of a vehicle according to claim 2,
wherein the coil has a width in a horizontal direction of the coil is larger than a width of the coil in a vertical direction of the coil.

32. The detection device for side collision of a vehicle according to claim 31,
   wherein the coil has a plurality of turns wound on a same plane, and
   wherein the width of the coil at an outermost periphery of the coil in the horizontal direction is larger than the width of the coil at the outermost periphery of the coil in the vertical direction.

33. The detection device for side collision of a vehicle according to claim 31,
   wherein the coil has a plurality of turns wound on a same plane, and
   wherein the width of the coil at an innermost periphery of the coil in the horizontal direction is larger than the width of the coil at the innermost periphery of the coil in the vertical direction.

34. The detection device for side collision of a vehicle according to claim 31,
   wherein the coil has a plurality of turns wound on a same plane, and
   wherein an intermediate value between the width of the coil at an outermost periphery of the coil in the horizontal direction and the width of the coil at an innermost periphery of the coil in the horizontal direction is larger than an intermediate value between the width of the coil at the outermost periphery of the coil in the vertical direction and the width of the coil at the innermost periphery of the coil in the vertical direction.

35. A passenger protection system for a vehicle comprising:
   the detection device for side collision of a vehicle according to claim 1; and
   a passenger protection device functioning when collision occurs, and protecting a passenger of the vehicle from an impact caused by the collision,
   wherein the passenger protection device functions based on a determination of the detection device for side collision of a vehicle.

36. A detection device for side collision of a vehicle comprising:
   an outer plate of a side door mounted in a vehicle;
   an inner plate of the side door arranged inside a vehicle compartment of the outer plate so as to be opposite to and spaced apart from the outer plate;
   a reinforcing member arranged between the outer plate and the inner plate, spaced apart from the inner plate, and having a bending rigidity higher than a bending rigidity of the outer plate;
   a distance sensor detecting a separate distance between a detection subject member and the reinforcing member, wherein the detection subject member is provided by one of the inner plate and an inner member fixed to the inner plate;
   a position sensor detecting a position of a door glass of the side door or a position of a stay for moving up and down the door glass, wherein the door glass is inserted between the reinforcing member and the detection subject member; and
   a determination element determining that the vehicle collides with an object based on an output value of the distance sensor and an output value of the position sensor.

37. The detection device for side collision of a vehicle according to claim 36,
   wherein the determination element switches a determination condition for determining that the vehicle collides with an object according to the position of the door glass or the position of the stay that is detected by the position sensor.

38. The detection device for side collision of a vehicle according to claim 37,
   wherein, when the position sensor detects that the stay is positioned between the reinforcing member and the detection subject member, the determination element determines that the vehicle collides with an object based on a variation quantity of the separate distance per unit time detected by the distance sensor, and
   wherein, when the position sensor detects that the stay is not positioned between the reinforcing member and the detection subject member, the determination element determines that the vehicle collides with an object based on the separate distance detected by the distance sensor or a variation quantity of the separate distance per unit time.

39. The detection device for side collision of a vehicle according to claim 36,
   wherein at least a portion of the inner plate and a portion of the detection subject member are made of metal or magnetic material,
   wherein the distance sensor includes a coil, which is fixed to the reinforcing member, generates a magnetic field, and detects a magnetic flux variable with a separate distance between the detection subject member and the reinforcing member, and
   wherein the determination element determines that the vehicle collides with an object based on the magnetic flux detected by the coil.

40. The detection device for side collision of a vehicle according to claim 36,
   wherein the reinforcing member is made of metal or magnetic material,
wherein the distance sensor has a coil, which is fixed to the detection subject member, generates a magnetic field, and detects a magnetic flux variable with a separate distance between the detection subject member and the reinforcing member, and
   wherein the determination element determines that the vehicle collides with an object based on the magnetic flux detected by the coil.

41. The detection device for side collision of a vehicle according to claim 39,
   wherein the stay is made of metal or a magnetic material.

42. The detection device for side collision of a vehicle according to claim 39,
   wherein the separate distance detected by the distance sensor corresponds to a magnitude of the magnetic flux, and
   wherein a variation quantity of the separate distance per unit time detected by the distance sensor corresponds to a variation quantity of the magnetic flux per unit time.

43. The detection device for side collision of a vehicle according to claim 39,
   wherein a width of the coil in an up-down direction of the vehicle is larger than a width of the stay in the up-down direction of the vehicle.

44. The detection device for side collision of a vehicle according to claim 43,
   wherein the coil has a plurality of turns wound on a same plane, and
   wherein a width of the coil at an innermost periphery of the coil in the up-down direction of the vehicle is larger than a width of the stay in the up and down direction of the vehicle.

45. The detection device for side collision of a vehicle according to claim 43,
wherein a width of the coil at an outermost periphery of the coil in the up-down direction of the vehicle is larger than a width of the stay in the up and down direction of the vehicle.

46. A detection device for side collision of a vehicle comprising:
an outer plate of a side door mounted in a vehicle;
an inner plate of the side door arranged inside a vehicle compartment of the outer plate so as to be opposite to and spaced apart from the outer plate;
a reinforcing member arranged between the outer plate and the inner plate, spaced apart from the inner plate, and having a bending rigidity higher than a bending rigidity of the outer plate;
a distance sensor detecting a separate distance between a detection subject member and the reinforcing member, wherein the detection subject member is provided by one of the inner plate and an inner member fixed to the inner plate;
a determination element determining that the vehicle collides with an object based on an output value of the distance sensor; and
a stay for moving up and down a door glass of the side door,
wherein at least one of the reinforcing member and the detection subject member has a metal body or a magnetic body,
wherein the distance sensor is a coil, which is fixed to one of the reinforcing member and the detection subject member, generates a magnetic field, and detects a magnetic flux variable with the separate distance between the detection subject member and the reinforcing member,
wherein a width of the coil in an up-down direction of the vehicle is larger than a width of the stay in the up-down direction of the vehicle, and
wherein the determination element determines that the vehicle collides with an object based on the magnetic flux detected by the coil.

47. The detection device for side collision of a vehicle according to claim 46,
wherein the coil has a plurality of turns wound on a same plane,
wherein a width of the coil at an innermost periphery of the coil in the up-down direction of the vehicle is larger than a width of the stay in the up-down direction of the vehicle.

48. The detection device for side collision of a vehicle according to claim 46,
wherein a width of the coil at an outermost periphery of the coil in the up-down direction of the vehicle is larger than a width of the stay in the up-down direction of the vehicle.

49. A passenger protection system for a vehicle comprising:
the detection device for side collision of a vehicle according to claim 36; and
a passenger protection device functioning based on a determination of the detection device for side collision of a vehicle, and protecting a passenger of the vehicle from an impact caused by collision.

50. A detection device for side collision of a vehicle comprising:
an outer plate of a side door;
an inner plate of the side door arranged inside a vehicle compartment of the outer plate so as to be opposite to and spaced apart from the outer plate;
a reinforcing member arranged between the outer plate and the inner plate, spaced apart from the inner plate, and having a bending rigidity higher than a bending rigidity of the outer plate, wherein a first detection subject member is provided by one of the inner plate and the reinforcing member and is made of a ferromagnetic material;
a first coil positioned between the inner plate and the reinforcing member, fixed to the other of the inner plate and the reinforcing member, spaced apart from the first detection subject member, generating a magnetic field in a direction in which the inner plate and the reinforcing member are opposite to each other, and having an inductance variable with a separate distance between the first coil and the first detection subject member, wherein a second detection subject member is provided by one of the outer plate and the inner plate and is made of a ferromagnetic material;
a second coil positioned between the outer plate and the inner plate, fixed to the other of the outer plate and the inner plate, spaced apart from the second detection subject member, generating a magnetic field in a direction in which the outer plate and the inner plate are opposite to each other, and having an inductance variable with a separate distance between the second coil and the second detection subject member; and
a determination element determining that the vehicle collides with an object based on a variation of the inductance of the first coil and a variation of the inductance of the second coil.

51. The detection device for side collision of a vehicle according to claim 50, further comprising:
one or a plurality of first coils,
wherein the reinforcing member is arranged so as to extend in a front-rear direction of the vehicle, and
wherein the respective first coils are arranged at different positions in the front-rear direction of the vehicle.

52. The detection device for side collision of a vehicle according to claim 51, further comprising:
one or a plurality of second coils,
wherein the second coils are arranged at positions that are same as the respective first coils in the front-rear direction of the vehicle and that are different from the respective first coils in an up-down direction of the vehicle.

53. The detection device for side collision of a vehicle according to claim 52,
wherein the plurality of second coils are arranged at different positions from the respective first coils in an up direction of the vehicle and at different positions from the respective first coils in a down direction of the vehicle.

54. The detection device for side collision of a vehicle according to claim 50,
wherein the second coil is arranged at a position that is same as the first coil in a front-rear direction of the vehicle and that is different from the first coil in an up-down direction of the vehicle.

55. The detection device for side collision of a vehicle according to claim 54, further comprising:
one or a plurality of second coils,
wherein the second coils are arranged at positions that are different from the first coils in an up direction of the vehicle and in a down direction of the vehicle.

56. The detection device for side collision of a vehicle according to claim 51,
wherein the determination element determines whether the object collides with an entire portion of the side door or a portion of the side door based on a variation of the inductance of each of the first coils.

57. The detection device for side collision of a vehicle according to claim 51,
wherein the determination element determines a position of the side door in the front-rear direction of the vehicle based on a variation of the inductance of each of the first coils, the position at which the object collides with the side door.

58. The detection device for side collision of a vehicle according to claim 51,
wherein the determination element computes a deformation distribution of the reinforcing member in the front-rear direction of the vehicle based on a variation of the inductance of each of the first coils.

59. The detection device for side collision of a vehicle according to claim 52,
wherein, only when both of the first coils and the second coils arranged at same positions in the front-rear direction of the vehicle detect that the vehicle collides with the object based on a variation of the inductance of each of the first coils and the second coils, the determination element determines that the vehicle collides with the object.

60. The detection device for side collision of a vehicle according to claim 53,
wherein, when one of the first coils detects that the vehicle collides with the object, and when at least one of the second coils, which are arranged at a same position as the one of the first coils in the front-rear direction of the vehicle and arranged on an up side or a down side of the one of the first coils, detects that the vehicle collides with the object, the determination element determines that the vehicle collides with the object at a position of the door, at which the one of the first coils is arranged in the front-rear direction of the vehicle.

61. A detection device for side collision of a vehicle comprising:
an outer plate of a side door;
an inner plate of the side door arranged inside a vehicle compartment of the outer plate so as to be opposite to and spaced apart from the outer plate;
a reinforcing member arranged between the outer plate and the inner plate, spaced apart from the inner plate, and having a bending rigidity higher than a bending rigidity of the outer plate, wherein a first detection subject member is provided by one of the inner plate and the reinforcing member and is made of a ferromagnetic material;
a plurality of first coils positioned between the inner plate and the reinforcing member, fixed to the other of the inner plate and the reinforcing member, spaced apart from the first detection subject member, and generating a magnetic field in a direction in which the inner plate and the reinforcing member are opposite to each other, wherein each of the plurality of first coils has an inductance variable with a separate distance between a respective first coil and the first detection subject member; and
a determination element determining that the vehicle collides with an object based on a variation of the inductance of each of the plurality of first coils.

62. A detection device for side collision of a vehicle comprising:
an outer plate of a side door;
an inner plate of the side door arranged inside a vehicle compartment of the outer plate so as to be opposite to and spaced apart from the outer plate;
a reinforcing member arranged between the outer plate and the inner plate, spaced apart from the inner plate, and having a bending rigidity higher than a bending rigidity of the outer plate, wherein a second detection subject member is provided by one of the outer plate and the inner plate and is made of a ferromagnetic material;
a plurality of second coils positioned between the outer plate and the inner plate, fixed to the other of the outer plate and the inner plate, spaced apart from the second detection subject member, and generating a magnetic field in a direction in which the outer plate and the inner plate are opposite to each other, wherein each of the plurality of second coils has an inductance variable with a separate distance between a respective second coil and the second detection subject member; and
a determination element determining that the vehicle collides with an object based on a variation of the inductance of each of the plurality of second coils.

63. A detection device for side collision of a vehicle comprising:
a side door arranged on a side of the vehicle;
a vehicle body member arranged on the side door in a front direction of the vehicle or in a rear direction of the vehicle;
a gap detection sensor arranged on the side door or on the vehicle body member, and detecting a gap between an end face of the side door and the vehicle body member, wherein the end face is arranged on the side door in the front direction or in the rear direction of the vehicle; and
a determination element determining that an object collides with the side of the vehicle based on the gap detected by the gap detection sensor.

64. The detection device for side collision of a vehicle according to claim 63,
wherein the vehicle body member includes:
a first pillar that rotatably supports the side door; and
a second pillar that is arranged on the side door at an opposite side of the first pillar in a front-rear direction of the vehicle, and
wherein the gap detection sensor detects a gap between a body end face of the side door and the second pillar, the body end face being on a side of the side door on which the second pillar is arranged.

65. The detection device for side collision of a vehicle according to claim 64,
wherein the gap detection sensor further detects a gap between a body end face of the side door and the first pillar, the body end face being on a side of the side door on which the first pillar is arranged.

66. The detection device for side collision of a vehicle according to claim 63,
wherein the gap detection sensor detects a gap between a door outside portion of the side door, which is positioned on an outside from a central portion of the side door in a left-right direction of the vehicle, and an opposite portion of the vehicle body member, which is positioned opposite to the door outside portion in a case where the side door is closed.

67. The detection device for side collision of a vehicle according to claim 63,
wherein the determination element determines whether the object collides with a side of the vehicle based on a fact that the gap exceeds a first threshold value.

68. The detection device for side collision of a vehicle according to claim 67,
  wherein the determination element determines whether the object collides with the side face of the vehicle based on a fact that a variation rate of the gap exceeds a second threshold value.

69. The detection device for side collision of a vehicle according to claim 67,
  wherein the determination element determines whether the object collides with the side face of the vehicle based on a fact that the gap exceeds the first threshold value within a predetermined time elapsed from a time when the object contacts the side of the vehicle.

70. The detection device for side collision of a vehicle according to claim 69,
  wherein the determination element determines a time when the object contacts the side of the vehicle based on a variation of the gap detected by the gap detection sensor.

* * * * *